United States Patent
Constantinou et al.

(10) Patent No.: US 10,974,447 B2
(45) Date of Patent: Apr. 13, 2021

(54) METHODS OF MANUFACTURING ARTICLES UTILIZING FOAM PARTICLES

(71) Applicant: NIKE, Inc., Beaverton, OR (US)

(72) Inventors: Jay Constantinou, Beaverton, OR (US); Harleigh Doremus, Portland, OR (US); Luis Folgar, Beaverton, OR (US); Brandon Kvamme, Beaverton, OR (US); Denis Schiller, Vancouver, WA (US); Krissy Yetman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 120 days.

(21) Appl. No.: 15/995,587

(22) Filed: Jun. 1, 2018

(65) Prior Publication Data

US 2018/0345575 A1    Dec. 6, 2018

Related U.S. Application Data

(60) Provisional application No. 62/626,358, filed on Feb. 5, 2018, provisional application No. 62/513,959, filed on Jun. 1, 2017.

(51) Int. Cl.
*B29C 64/153*   (2017.01)
*A43B 13/18*    (2006.01)
(Continued)

(52) U.S. Cl.
CPC ............ *B29C 64/153* (2017.08); *A43B 13/02* (2013.01); *A43B 13/04* (2013.01); *A43B 13/188* (2013.01);
(Continued)

(58) Field of Classification Search
CPC ... B29C 64/153; B29C 64/268; B29C 67/205; B29C 2035/0833; B29C 2035/0838; A43B 13/188; A43B 13/026; B29D 35/142
See application file for complete search history.

(56) References Cited

U.S. PATENT DOCUMENTS 3,503,840 A    3/1970 Parrish
4,252,910 A    2/1981 Schaefer
(Continued)

FOREIGN PATENT DOCUMENTS

CN    2888936 Y    4/2007
DE    3605662 C1   6/1987
(Continued)

OTHER PUBLICATIONS

International Search Report issued for PCT/US2016/030656 dated Mar. 8, 2016.
(Continued)

*Primary Examiner* — Jacob T Minskey
*Assistant Examiner* — Adrien J Bernard
(74) *Attorney, Agent, or Firm* — Thomas|Horstemeyer, LLP

(57) ABSTRACT

Methods for manufacturing articles of footwear are provided. In various aspects, the methods comprise utilizing additive manufacturing methods with foam particles. In some aspects, the additive manufacturing methods comprise increasing the temperature of a plurality of foam particles with actinic radiation under conditions effective to fuse a portion of the plurality of foam particles comprising one or more thermoplastic elastomers. Increasing the temperature of the foam particles can be carried out for one or multiple iterations. The disclosed methods can be used to manufacturer articles with sub-regions that exhibit differing degrees (Continued)

of fusion between the foam particles, thereby resulting in sub-regions with different properties such as density, resilience, and/or flexural modulus. This abstract is intended as a scanning tool for purposes of searching in the particular art and is not intended to be limiting of the present disclosure.

19 Claims, 11 Drawing Sheets

(51) Int. Cl.
| | |
|---|---|
| *B29D 35/12* | (2010.01) |
| *B29C 67/20* | (2006.01) |
| *B33Y 80/00* | (2015.01) |
| *C08J 9/12* | (2006.01) |
| *C08J 9/232* | (2006.01) |
| *C08J 9/16* | (2006.01) |
| *A43B 13/04* | (2006.01) |
| *B29C 64/176* | (2017.01) |
| *B29C 64/182* | (2017.01) |
| *B29C 64/268* | (2017.01) |
| *A43B 13/02* | (2006.01) |
| *B29C 64/171* | (2017.01) |
| *B29C 64/165* | (2017.01) |
| *B29K 25/00* | (2006.01) |
| *B29C 35/08* | (2006.01) |
| *B29K 77/00* | (2006.01) |
| *B29K 105/24* | (2006.01) |
| *B29K 79/00* | (2006.01) |
| *B29K 21/00* | (2006.01) |
| *B29K 105/00* | (2006.01) |
| *B29K 75/00* | (2006.01) |
| *B29L 31/50* | (2006.01) |
| *B33Y 10/00* | (2015.01) |
| *B33Y 40/00* | (2020.01) |
| *B33Y 70/00* | (2020.01) |
| *B29C 71/00* | (2006.01) |
| *B29K 67/00* | (2006.01) |
| *B29K 71/00* | (2006.01) |
| *B29K 105/04* | (2006.01) |

(52) U.S. Cl.
CPC .......... *B29C 64/165* (2017.08); *B29C 64/171* (2017.08); *B29C 64/176* (2017.08); *B29C 64/182* (2017.08); *B29C 64/268* (2017.08); *B29C 67/20* (2013.01); *B29C 67/205* (2013.01); *B29D 35/122* (2013.01); *B33Y 80/00* (2014.12); *C08J 9/122* (2013.01); *C08J 9/16* (2013.01); *C08J 9/232* (2013.01); *B29C 35/0805* (2013.01); *B29C 2035/0822* (2013.01); *B29C 2035/0833* (2013.01); *B29C 2035/0838* (2013.01); *B29C 2035/0855* (2013.01); *B29C 2071/0027* (2013.01); *B29K 2021/003* (2013.01); *B29K 2025/06* (2013.01); *B29K 2067/006* (2013.01); *B29K 2071/00* (2013.01); *B29K 2075/00* (2013.01); *B29K 2077/00* (2013.01); *B29K 2079/08* (2013.01); *B29K 2105/04* (2013.01); *B29K 2105/24* (2013.01); *B29K 2105/251* (2013.01); *B29K 2995/007* (2013.01); *B29K 2995/0063* (2013.01); *B29K 2995/0091* (2013.01); *B29K 2995/0094* (2013.01); *B29L 2031/504* (2013.01); *B33Y 10/00* (2014.12); *B33Y 40/00* (2014.12); *B33Y 70/00* (2014.12); *C08J 2201/03* (2013.01); *C08J 2203/06* (2013.01); *C08J 2203/08* (2013.01); *C08J 2207/00* (2013.01); *C08J 2300/22* (2013.01); *C08J 2300/26* (2013.01); *C08J 2367/02* (2013.01)

(56) References Cited

U.S. PATENT DOCUMENTS

| | | |
|---|---|---|
| 5,007,111 A | 4/1991 | Adams |
| 6,219,939 B1 | 4/2001 | Kita et al. |
| 6,300,386 B1 | 10/2001 | Karukaya et al. |
| 7,202,284 B1 | 4/2007 | Limerkens et al. |
| 7,207,125 B2 | 4/2007 | Jeppesen et al. |
| 7,797,856 B2 | 9/2010 | Andrews et al. |
| 8,327,559 B2 | 12/2012 | Berger et al. |
| 8,414,811 B1* | 4/2013 | De Santis ............ B29D 35/148 264/250 |
| 2002/0045040 A1 | 4/2002 | Kanada |
| 2002/0093115 A1 | 7/2002 | Jang et al. |
| 2004/0140078 A1 | 7/2004 | Liu et al. |
| 2004/0162358 A1 | 8/2004 | Yamamoto et al. |
| 2004/0265504 A1 | 12/2004 | Magnin |
| 2005/0049322 A1 | 3/2005 | Kanada et al. |
| 2006/0026863 A1 | 2/2006 | Liu |
| 2006/0061000 A1 | 3/2006 | Chun et al. |
| 2007/0182070 A1 | 8/2007 | Monsheimer et al. |
| 2007/0238056 A1 | 10/2007 | Baumann et al. |
| 2007/0295451 A1 | 12/2007 | Willis |
| 2008/0161438 A1 | 7/2008 | Wang et al. |
| 2009/0145004 A1 | 6/2009 | Jones |
| 2009/0277047 A1 | 11/2009 | Polegato Moretti |
| 2009/0313853 A1 | 12/2009 | Tadin |
| 2010/0047550 A1 | 2/2010 | Prissok et al. |
| 2010/0178488 A1 | 7/2010 | Yasuda et al. |
| 2010/0222442 A1 | 9/2010 | Prissok et al. |
| 2010/0287795 A1 | 11/2010 | Van Niekerk |
| 2011/0047720 A1* | 3/2011 | Maranan .............. B29D 35/122 12/146 B |
| 2011/0266717 A1 | 11/2011 | Nehls et al. |
| 2011/0283560 A1 | 11/2011 | Binzer Craig et al. |
| 2012/0302655 A1 | 11/2012 | Kanada et al. |
| 2013/0017391 A1 | 1/2013 | Kato et al. |
| 2013/0227861 A1 | 9/2013 | Prissok et al. |
| 2014/0096882 A1 | 4/2014 | Kitano et al. |
| 2014/0115925 A1 | 5/2014 | Hurd et al. |
| 2014/0223783 A1 | 8/2014 | Wardlaw et al. |
| 2014/0259801 A1 | 9/2014 | Grondin |
| 2014/0272379 A1 | 9/2014 | Watkins et al. |
| 2015/0258707 A1 | 9/2015 | Hirata |
| 2015/0273572 A1 | 10/2015 | Ederer et al. |
| 2015/0290877 A1 | 10/2015 | Darland |
| 2015/0290893 A1 | 10/2015 | Darland |
| 2016/0067916 A1 | 3/2016 | Hirata et al. |
| 2016/0075113 A1 | 3/2016 | Chang et al. |
| 2016/0144573 A1 | 5/2016 | Hirata et al. |
| 2016/0227876 A1 | 8/2016 | Le et al. |
| 2016/0325495 A1 | 11/2016 | Kuhn et al. |
| 2016/0353833 A1 | 12/2016 | Hesterberg et al. |
| 2017/0072599 A1 | 3/2017 | Huang et al. |
| 2018/0035755 A1 | 2/2018 | Reinhardt et al. |
| 2018/0162048 A1 | 6/2018 | Gibson et al. |
| 2019/0126541 A1 | 5/2019 | Chaffins et al. |

FOREIGN PATENT DOCUMENTS

| | | |
|---|---|---|
| DE | 102010041521 A1 | 3/2012 |
| DE | 102011108744 A1 | 1/2013 |
| EP | 1852242 A1 | 11/2007 |
| EP | 1979401 A1 | 10/2008 |
| EP | 2649896 A2 | 10/2013 |
| EP | 3132703 A1 | 2/2017 |
| JP | 2002361749 A1 | 12/2002 |
| WO | 3906501 A1 | 7/1989 |
| WO | 9606881 A2 | 3/1996 |
| WO | 9929203 A1 | 6/1999 |
| WO | 02061011 | 8/2002 |
| WO | 2006015440 A1 | 2/2006 |
| WO | 2007025690 A1 | 3/2007 |
| WO | 2009055451 A1 | 4/2009 |

(56) References Cited

FOREIGN PATENT DOCUMENTS

| WO | 2009095935 A1 | 8/2009 |
|----|---------------|--------|
| WO | 2009146368 A  | 12/2009 |
| WO | 2012065926 A  | 5/2012 |
| WO | 2013013784 A1 | 1/2013 |
| WO | 2014126799 A1 | 8/2014 |
| WO | 2014150122 A2 | 9/2014 |
| WO | 2016146537 A1 | 9/2016 |
| WO | 2016186837    | 11/2016 |

OTHER PUBLICATIONS

International Search Report issued for PCT/US2018/035554 dated Sep. 17, 2018.
BASF, Infinergy. The first expanded TPU—as elastic as rubber but lighter, Jan. 1, 2003.
International Search Report issued for PCT/US2018/035561 dated Sep. 17, 2018.
International Preliminary Examining Authority issued for PCT/US2018/035554, dated Jun. 5, 2019.
International Search Report issued for PCT/US2019/062249, dated Feb. 5, 2020.
International Search Report issued for PCT/US2019/062275, dated Feb. 11, 2020.
Hartmann, M., Jan. 31, 2013, machine translation of DE102011108744 (Year: 2013).
International Preliminary Report on Patentability for PCT/2018/035561 dated Aug. 16, 2019.
Written Opinion for PCT/2018/035561 dated May 31, 2019.
International Search Report and Written Opinion for PCT/2016/030656 dated Mar. 8, 2016.
Chengbiao Ge et. al, "Steam-chest molding of expanded thermoplastic polyu-rethane bead foams and their mechanical properties", published in Chemical Engineering Science 174 (2017) 337-346 on Sep 8, 2017.
Written Opinion of the International Preliminary Examining Authority for PCTUS2019062249 dated Jun. 22, 2020.
International Preliminary Report on Patentability for PCTUS2019062275 dated Jun. 26, 2020.

\* cited by examiner

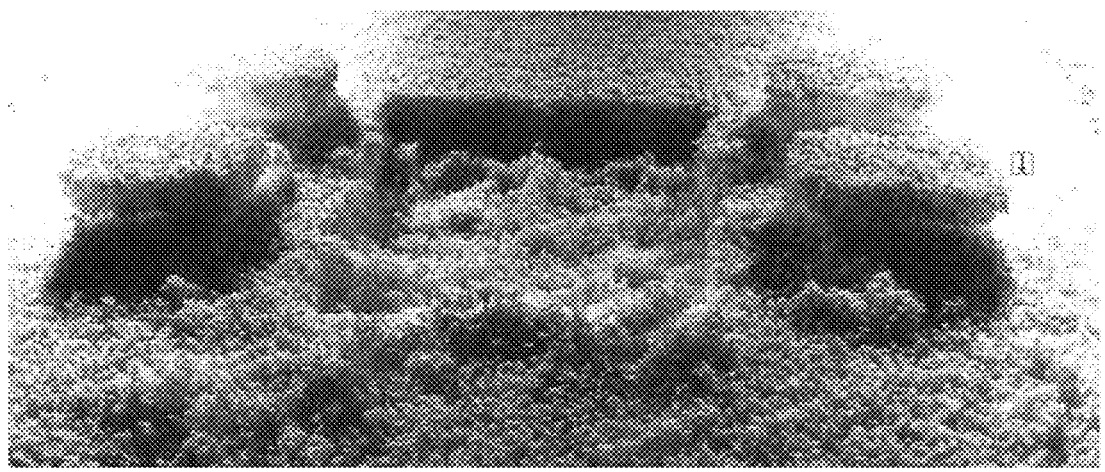
FIG. 14
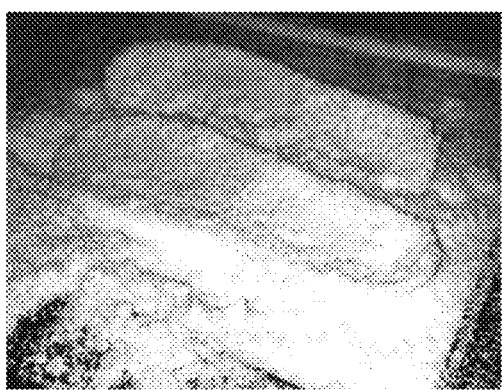 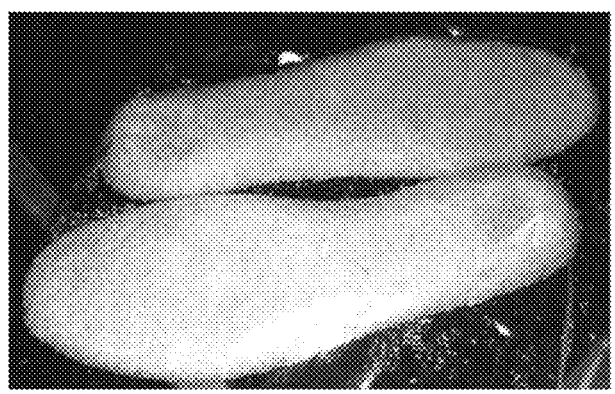
FIG. 15     FIG. 16
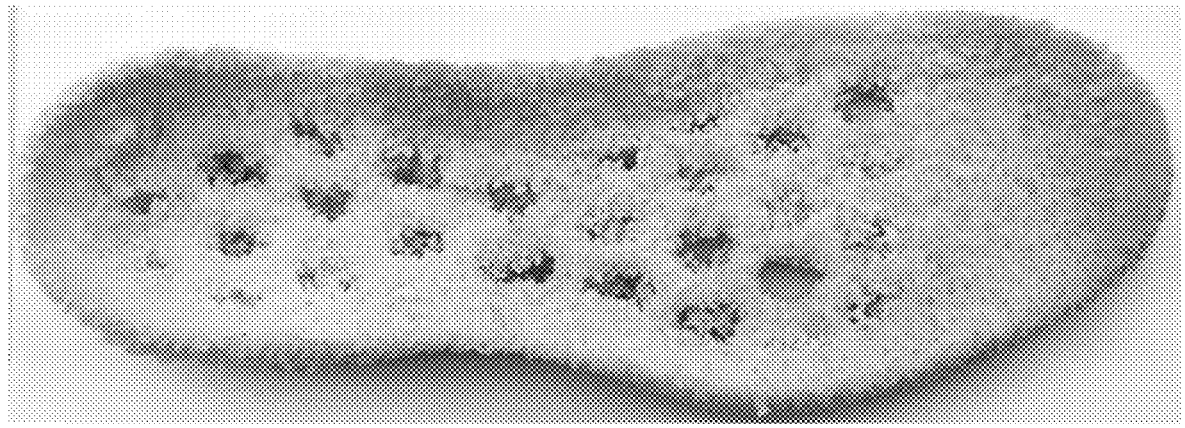
FIG. 17

METHODS OF MANUFACTURING ARTICLES UTILIZING FOAM PARTICLES

CROSS-REFERENCE TO RELATED APPLICATIONS

This Application claims the benefit of U.S. Provisional Application No. 62/513,959, filed on Jun. 1, 2017, and 62/626,358, filed on Feb. 5, 2018, each of which is incorporated herein by reference in its entirety.

TECHNICAL FIELD

The present disclosure generally relates to methods of manufacturing articles utilizing foam particles in an additive manufacturing method, and in particular, utilizing foam particles in a method comprising selective laser sintering techniques.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

FIG. 14 shows an image of a representative article prepared using the disclosed methods.

FIG. 15 shows an image of a representative midsole on a production platform with non-fused particles surrounding the midsole.

FIG. 16 shows an image of the representative midsole shown in FIG. 15 following clean-up and removal of non-fused particles.

FIG. 17 shows an image of a representative midsole prepared using the disclosed methods. The representative midsole was dyed following fusing of the foam particles by dipping the midsole into an aqueous dye solution comprising one or more of acid dyes and/or reactive dyes in isopropyl alcohol heated to 60 degrees Celsius.

DETAILED DESCRIPTION

Figure 1:
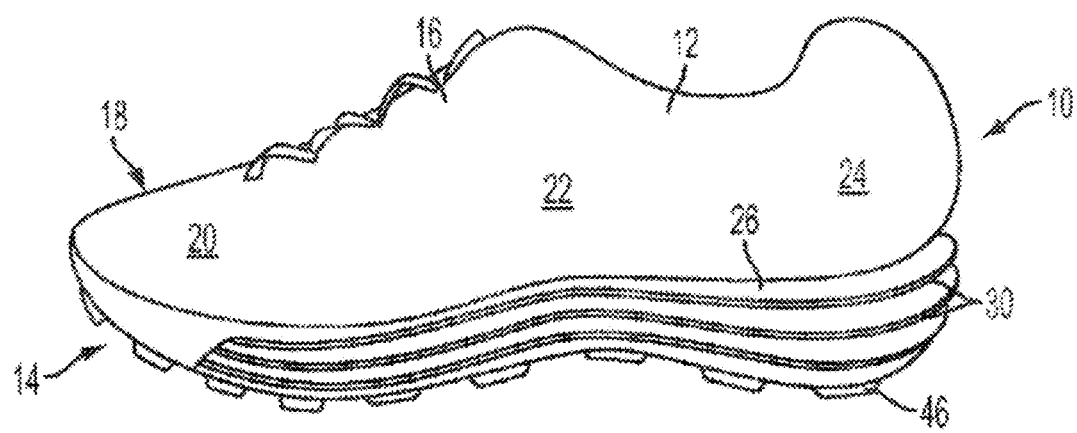
FIG. 1 is an elevation view of an article of footwear with a sole component according to an aspect of the invention.

The present disclosure pertains to methods for manufacture of articles utilizing foam particles in an additive manufacturing method. Additive manufacturing methods, e.g., selective laser sintering, are highly desirable for manufacturing many types of articles due the speed, customizability, and flexibility of these methods. In particular, the additive manufacturing methods are useful for manufacture of articles that may be manufactured by traditional molding, casting, or machining methods at great expense or with great difficulty. In some cases, the desired article may not even be suitable to manufacture by traditional molding, casting, or machining methods. Additive manufacturing methods typically involve a step comprising directing an energy beam in an x-y plane comprising a material in a manner that permits modulating the energy beam at each point in the x-y plane, e.g., modulating the amount of energy directed by the energy beam to each point in the x-y plane, the amount of time the energy beam is directed to each point in the x-y plane, or both the amount of time and amount of energy that the energy beam is directed to each point in the x-y plane. As such, the material at each point in the x-y plane can be subjected to varied degrees of heating and melting, thereby allowing the operator to vary material property differences for sub-regions of the x-y plane. Additive manufacturing methods can also permit the layering or mixing of materials with different compositions and/or properties used at each step.

In has been found that additive manufacturing methods can be used with foam particles comprising thermoplastic elastomers. The ability to use foam particles in additive manufacturing methods permits for the first time methods to manufacture articles with properties, e.g., bulk density, that are not possible using polymeric powders. In addition to fusing a plurality of foam particles to each other to form a structure, the disclosed methods can further comprise fusing the plurality of foam particles to a surface of a component such as a textile element or a solid resin element. The disclosed methods can further comprise the use of conventional laser sintering powders (e.g., non-elastomeric thermoplastic powders) in combination with foam particles, e.g., such as providing an exterior layer or finish to the article manufactured using the disclosed methods. That is, an article can be manufactured using the disclosed methods with foam particles, and then arranging a layer of a conventional laser sintering powder on at least one surface of the article formed of foam particles. Increasing the temperature of the laser sintering powder above its melting point can fuse the laser sintering powder, or can allow the laser sintering powder in the melted state to flow on and into the surface of the article comprising foam particles.

Moreover, it has been found that the disclosed methods permit the manufacture of articles that combines the useful performance and material properties found with foamed polymeric materials in processes with the flexibility, customizability, and rapid throughput of an additive manufacturing method. In particular, it has been found that the disclosed additive manufacturing methods using foam particles can be used to manufacture components used in the manufacture of footwear, such as pre-forms, midsoles, outsoles, sockliners, and heal-cushioning pads. It has been found that the disclosed methods decrease article build time by at least one-third while permitting the fabrication of components with a plurality of sub-regions comprising differentially fused foam particles. The plurality of sub-regions can be discrete regions comprising desired geometries and/or shapes. Alternatively, the article can comprise a gradient of differentially fused foam particles. It has been found that the method can provide an article with a regions of highly fused foam particles such as an article exterior edge or an interior edge delineating a sub-region within which are completely un-fused foam particles.

In has also been found that additive manufacturing methods can be used with solid (i.e., unfoamed) resin particles comprising thermoplastic elastomers, such as resin particles having a number average particle size of about 0.04 millimeters to about 10 millimeters, including resin particles which are substantially ellipsoid or spherical in shape. That is, an article can be manufactured using the disclosed methods with resin particles alone or in combination with foam particles. In addition to fusing a plurality of the resin particles to each other to form a structure, the disclosed methods can further comprise fusing the plurality of resin particles to a surface of a component such as a textile or a solid resin element. Increasing the temperature of the resin particles above the melting point or softening point of the thermoplastic elastomer(s) forming the resin particles can be used to fuse the resin particles to other elements or resin particles. Increasing the temperature of the resin particles above the melting point or softening point of the thermoplastic elastomers can be used to fuse the resin particles to foam particles. Increasing the temperature of the resin particles above the melting point of the thermoplastic elastomers can allow the melted material of the resin particles to flow on and into the surface of the foam particles, either to affix the foam particles to each other to form a structure, or to form regions of highly fused resin particles within a structure, such as an exterior edge or interior edge of the structure, or to both affix resin or foam particles to form the structure and provide a highly fused region within the structure.

In a first aspect, the present disclosure is directed to a method of forming an article, the method comprising: arranging a plurality of foam particles, wherein the plurality of foam particles comprise a thermoplastic elastomer, wherein the plurality of foam particles has a number average particle size of about 0.04 millimeters to about 10 millimeters in a longest dimension; and increasing a temperature of at least a portion of the plurality of foam particles with actinic radiation under conditions effective to fuse the target area of the plurality of foam particles, wherein the increasing the temperature is carried out for at least one iteration.

In a second aspect, the present disclosure is directed to a method of forming an article, the method comprising: arranging a plurality of foam particles, wherein the plurality of foam particles comprise a thermoplastic elastomer, wherein the plurality of foam particles has a number average particle size of about 0.1 millimeters to about 10 millimeters in a longest dimension; and increasing a temperature of at least a portion of the plurality of foam particles with actinic radiation under conditions effective to fuse the target area of the plurality of foam particles, wherein the increasing the temperature is carried out for at least one iteration.

In a third aspect, the present disclosure is directed to a method of making an article, the method comprising: arranging a plurality of foam particles such that the plurality of foam particles comprise a first particle having a first surface in contact with a second surface of an adjacent particle, wherein the plurality of foam particles has a number average particle size of about 0.04 millimeters to about 10 millimeters in the longest dimension; and increasing a temperature of at least a portion of the plurality of foam particles with actinic radiation under conditions effective to fuse the first surface of the first particle to the second surface of the adjacent particle, wherein the increasing the temperature is carried out for at least one iteration.

In a fourth aspect, the present disclosure is directed to a method of making an article, the method comprising: arranging a plurality of foam particles such that the plurality of foam particles comprise a first particle having a first surface in contact with a second surface of an adjacent particle, wherein the plurality of foam particles has a number average particle size of about 0.1 millimeters to about 10 millimeters in the longest dimension; and increasing a temperature of at least a portion of the plurality of foam particles with actinic radiation under conditions effective to fuse the first surface of the first particle to the second surface of the adjacent particle, wherein the increasing the temperature is carried out for at least one iteration.

In a fifth aspect, the present disclosure is directed to a method of making an article, the method comprising: forming a layer of a plurality of foam particles, wherein the plurality of foam particles comprise a thermoplastic elastomer, wherein the plurality of foam particles has a number average diameter of about 0.04 millimeters to about 10 millimeters; directing an energy beam at a target area of the layer of a plurality of foam particles for a period of time, wherein a selected portion of the layer of a plurality of foam particles is heated by the energy beam thereby melting a portion of one or more surfaces on the plurality of foam particles located therein; and repeating the forming and the directing energy steps to form the article in layerwise fashion.

In a sixth aspect, the present disclosure is directed to a method of making an article, the method comprising: forming a layer of a plurality of foam particles, wherein the plurality of foam particles comprise a thermoplastic elastomer, wherein the plurality of foam particles has a number average diameter of about 0.1 millimeters to about 10 millimeters; directing an energy beam at a target area of the layer of a plurality of foam particles for a period of time, wherein a selected portion of the layer of a plurality of foam particles is heated by the energy beam thereby melting a portion of one or more surfaces on the plurality of foam particles located therein; and repeating the forming and the directing energy steps to form the article in layerwise fashion.

In a seventh aspect, the present disclosure is directed to a method of making an article, the method comprising: forming a layer of a plurality of spheroid-shaped foam particles, wherein the plurality of foam particles comprise a thermoplastic elastomer, wherein the plurality of foam particles has a number average diameter of about 0.04 millimeters to about 10 millimeters; directing a laser beam at a target area of the layer of a plurality of foam particles for a period of time, wherein a selected portion of the layer of a plurality of foam particles is heated by the laser beam thereby melting a portion of one or more surfaces on the plurality of foam particles located therein; and repeating the forming and the directing energy steps to form the article in layerwise fashion.

In an eighth aspect, the present disclosure is directed to a method of making an article, the method comprising: forming a layer of a plurality of spheroid-shaped foam particles, wherein the plurality of foam particles comprise a thermoplastic elastomer, wherein the plurality of foam particles has a number average diameter of about 0.1 millimeters to about 10 millimeters; directing a laser beam at a target area of the layer of a plurality of foam particles for a period of time, wherein a selected portion of the layer of a plurality of foam particles is heated by the laser beam thereby melting a portion of one or more surfaces on the plurality of foam particles located therein; and repeating the forming and the directing energy steps to form the article in layerwise fashion.

In a ninth aspect, the present disclosure is directed to a method of making an article, the method comprising: forming a layer of a plurality of spheroid-shaped foam particles, wherein the plurality of foam particles comprise a thermoplastic elastomer, wherein the plurality of foam particles has a number average diameter of about 0.04 millimeters to about 10 millimeters; directing a laser beam at a target area of the layer of a plurality of foam particles for a period of time, wherein a portion of the layer of a plurality of foam particles is sintered using selective laser sintering; and repeating the forming and the directing energy steps to form the article in layerwise fashion.

In a tenth aspect, the present disclosure is directed to a method of making an article, the method comprising: forming a layer of a plurality of spheroid-shaped foam particles, wherein the plurality of foam particles comprise a thermoplastic elastomer, wherein the plurality of foam particles has a number average diameter of about 0.1 millimeters to about 10 millimeters; directing a laser beam at a target area of the layer of a plurality of foam particles for a period of time, wherein a portion of the layer of a plurality of foam particles is sintered using selective laser sintering; and repeating the forming and the directing energy steps to form the article in layerwise fashion.

In an eleventh aspect, the present disclosure is directed to an article made by a method of forming an article, the method comprising: arranging a plurality of foam particles, wherein the plurality of foam particles comprise a thermoplastic elastomer, wherein the plurality of foam particles has a number average particle size of about 0.04 millimeters to about 10 millimeters in a longest dimension; and heating a target area of the plurality of foam particles with a directed energy beam under conditions effective to fuse the target area of the plurality of foam particles, wherein the heating is carried out for at least one iteration.

In a twelfth aspect, the present disclosure is directed to an article made by a method of forming an article, the method comprising: arranging a plurality of foam particles, wherein the plurality of foam particles comprise a thermoplastic elastomer, wherein the plurality of foam particles has a number average particle size of about 0.1 millimeters to about 10 millimeters in a longest dimension; and heating a target area of the plurality of foam particles with a directed energy beam under conditions effective to fuse the target area of the plurality of foam particles, wherein the heating is carried out for at least one iteration.

In a thirteenth aspect, the present disclosure is directed to an article made by a method of forming an article, the method comprising: arranging a plurality of foam particles such that the plurality of foam particles comprise a first particle having a first surface in contact with a second surface of an adjacent particle, wherein the plurality of foam particles has a number average particle size of about 0.04 millimeters to about 10 millimeters in the longest dimension; and heating a target area of the plurality of foam particles with a directed energy beam under conditions effective to fuse the first surface of the first particle to the second surface of the adjacent particle, wherein the heating is carried out for at least one iteration.

In a fourteenth aspect, the present disclosure is directed to an article made by a method of forming an article, the method comprising: arranging a plurality of foam particles such that the plurality of foam particles comprise a first particle having a first surface in contact with a second surface of an adjacent particle, wherein the plurality of foam particles has a number average particle size of about 0.1 millimeters to about 10 millimeters in the longest dimension; and heating a target area of the plurality of foam particles with a directed energy beam under conditions effective to fuse the first surface of the first particle to the second surface of the adjacent particle, wherein the heating is carried out for at least one iteration.

In a fifteenth aspect, the present disclosure is directed to an article made by a method of forming an article, the method comprising: forming a layer of a plurality of foam particles, wherein the plurality of foam particles comprise a thermoplastic elastomer, wherein the plurality of foam particles has a number average diameter of about 0.04 millimeters to about 10 millimeters; directing an energy beam at a target area of the layer of a plurality of foam particles for a period of time, wherein a selected portion of the layer of a plurality of foam particles is heated by the energy beam thereby melting a portion of one or more surfaces on the plurality of foam particles located therein; and repeating the forming and the directing energy steps to form the article in layerwise fashion.

In sixteenth aspect, the present disclosure is directed to an article made by a method of forming an article, the method comprising: forming a layer of a plurality of foam particles, wherein the plurality of foam particles comprise a thermoplastic elastomer, wherein the plurality of foam particles has a number average diameter of about 0.1 millimeters to about 10 millimeters; directing an energy beam at a target area of the layer of a plurality of foam particles for a period of time, wherein a selected portion of the layer of a plurality of foam particles is heated by the energy beam thereby melting a portion of one or more surfaces on the plurality of foam particles located therein; and repeating the forming and the directing energy steps to form the article in layerwise fashion.

In a seventeenth aspect, the present disclosure is directed to an article made by a method of forming an article, the method comprising: forming a layer of a plurality of spheroid-shaped foam particles, wherein the plurality of foam particles comprise a thermoplastic elastomer, wherein the plurality of foam particles has a number average diameter of about 0.04 millimeters to about 10 millimeters; directing a laser beam at a target area of the layer of a plurality of foam particles for a period of time, wherein a selected portion of the layer of a plurality of foam particles is heated by the laser beam thereby melting a portion of one or more surfaces on the plurality of foam particles located therein; and repeating the forming and the directing energy steps to form the article in layerwise fashion.

In an eighteenth aspect, the present disclosure is directed to an article made by a method of forming an article, the method comprising: forming a layer of a plurality of spheroid-shaped foam particles, wherein the plurality of foam particles comprise a thermoplastic elastomer, wherein the plurality of foam particles has a number average diameter of about 0.1 millimeters to about 10 millimeters; directing a laser beam at a target area of the layer of a plurality of foam particles for a period of time, wherein a selected portion of the layer of a plurality of foam particles is heated by the laser beam thereby melting a portion of one or more surfaces on the plurality of foam particles located therein; and repeating the forming and the directing energy steps to form the article in layerwise fashion.

In a nineteenth aspect, the present disclosure is directed to an article made by a method of forming an article, the method comprising: forming a layer of a plurality of spheroid-shaped foam particles, wherein the plurality of foam particles comprise a thermoplastic elastomer, wherein the plurality of foam particles has a number average diameter of about 0.04 millimeters to about 10 millimeters; directing a laser beam at a target area of the layer of a plurality of foam particles for a period of time, wherein a portion of the layer of a plurality of foam particles is sintered using selective laser sintering; and repeating the forming and the directing energy steps to form the article in layerwise fashion.

In a twentieth aspect, the present disclosure is directed to an article made by a method of forming an article, the method comprising: forming a layer of a plurality of spheroid-shaped foam particles, wherein the plurality of foam particles comprise a thermoplastic elastomer, wherein the plurality of foam particles has a number average diameter of about 0.1 millimeters to about 10 millimeters; directing a laser beam at a target area of the layer of a plurality of foam particles for a period of time, wherein a portion of the layer of a plurality of foam particles is sintered using selective laser sintering; and repeating the forming and the directing energy steps to form the article in layerwise fashion.

In a twenty-first aspect, the present disclosure is directed to a method of forming an article, the method comprising: arranging a plurality of resin particles, wherein the plurality of resin particles comprise a thermoplastic elastomer, wherein the plurality of resin particles has a number average particle size of about 0.04 millimeters to about 10 millimeters in a longest dimension; and increasing a temperature of at least a portion of the plurality of resin particles with actinic radiation under conditions effective to fuse the target area of the plurality of resin particles, wherein the increasing the temperature is carried out for at least one iteration.

Articles Manufactured Using the Disclosed Methods.

Footwear 10 is an exemplary article of athletic footwear that comprises one or more components article made using the methods of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of an article made using the disclosed methods as described herein, or a multi-component assembly formed of a plurality of monolithic components, where at least one of the monolithic components is formed entirely of the article made using the disclosed methods as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

In some aspects, the component is a sole component, such as a sole component 14 depicted in FIGS. 1-5, that includes article made using the disclosed methods as described herein. In some aspects, the component is an insert such as insert 36 or insert 60 depicted in FIGS. 4-5 that includes article made using the disclosed methods as described herein. The sole components and inserts for sole components can be made partially or entirely of article made using the disclosed methods as described herein. Any portion of a sole component or an insert for a sole component can be made of article made using the disclosed methods as described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include article made using the disclosed methods as described herein.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12.

In some aspects, the sole component is an insole or sockliner or is a multi-component assembly including an insole or sockliner, can further include an insole or sockliner located within the upper, where the insole or sockliner is formed entirely or partially of article made using the disclosed methods as described herein. Articles of footwear described herein can include an insole or sockliner formed entirely or partially of article made using the disclosed methods as described herein.

Figure 2:
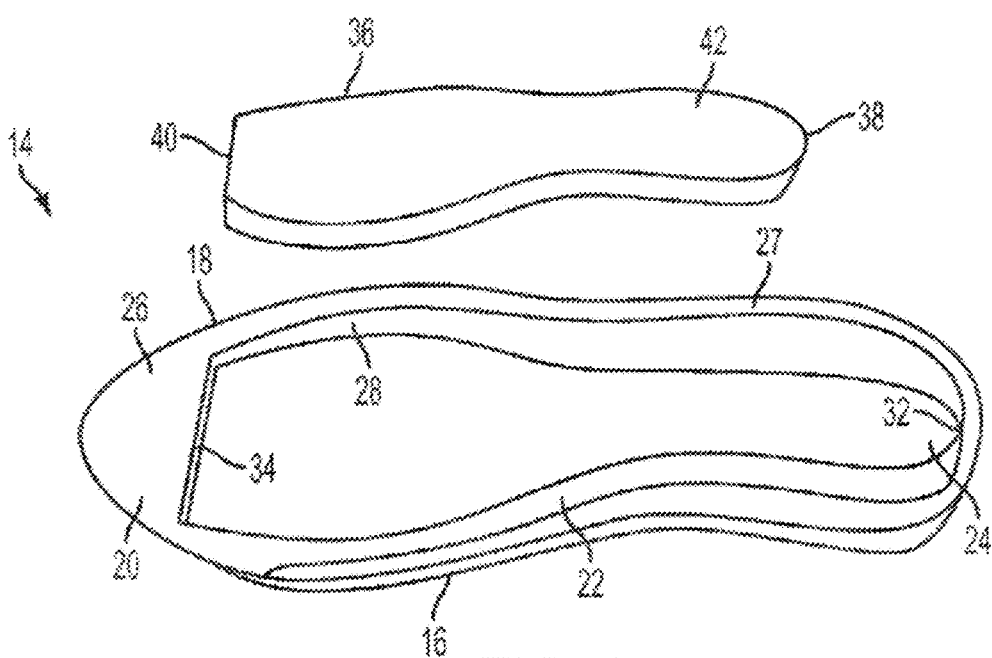
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear.

In some aspects, the article is an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher density and/or hardness as compared to insert 36 such as, for example, non-foam materials including rubber and thermoplastic polyurethane, as well as foam materials. In certain aspects, insert 36 can be formed of article made using the disclosed methods as described herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
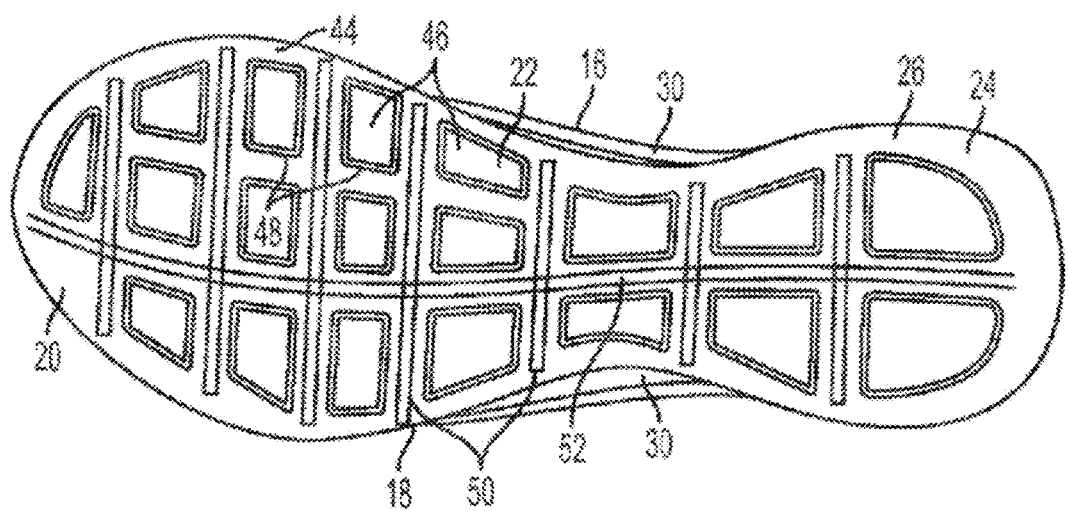
FIG. 3 is a plan view of the bottom of the sole component of the article of footwear of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
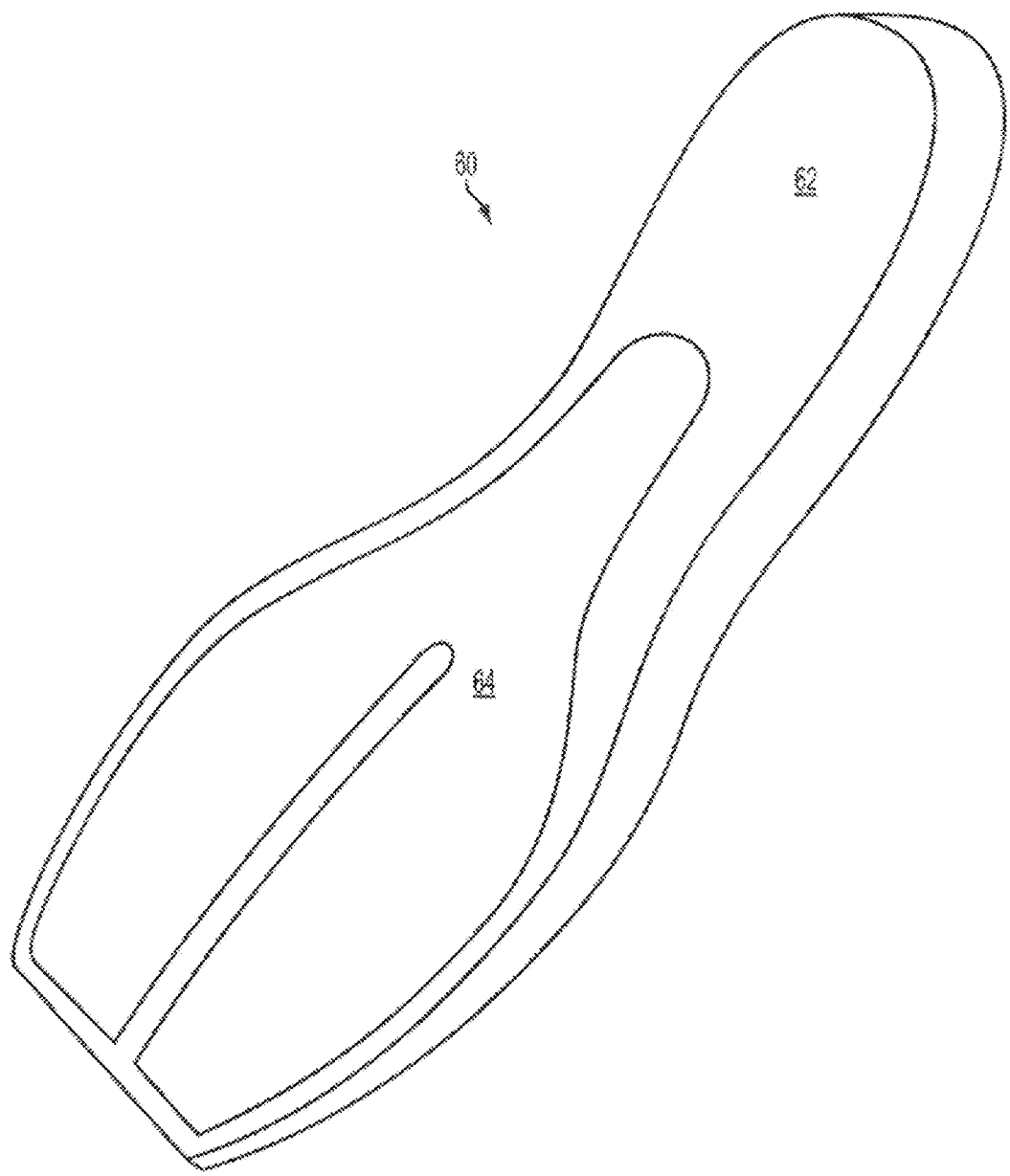
FIG. 4 is a bottom view of an insert for use in a sole component of an article of footwear.
Figure 5:
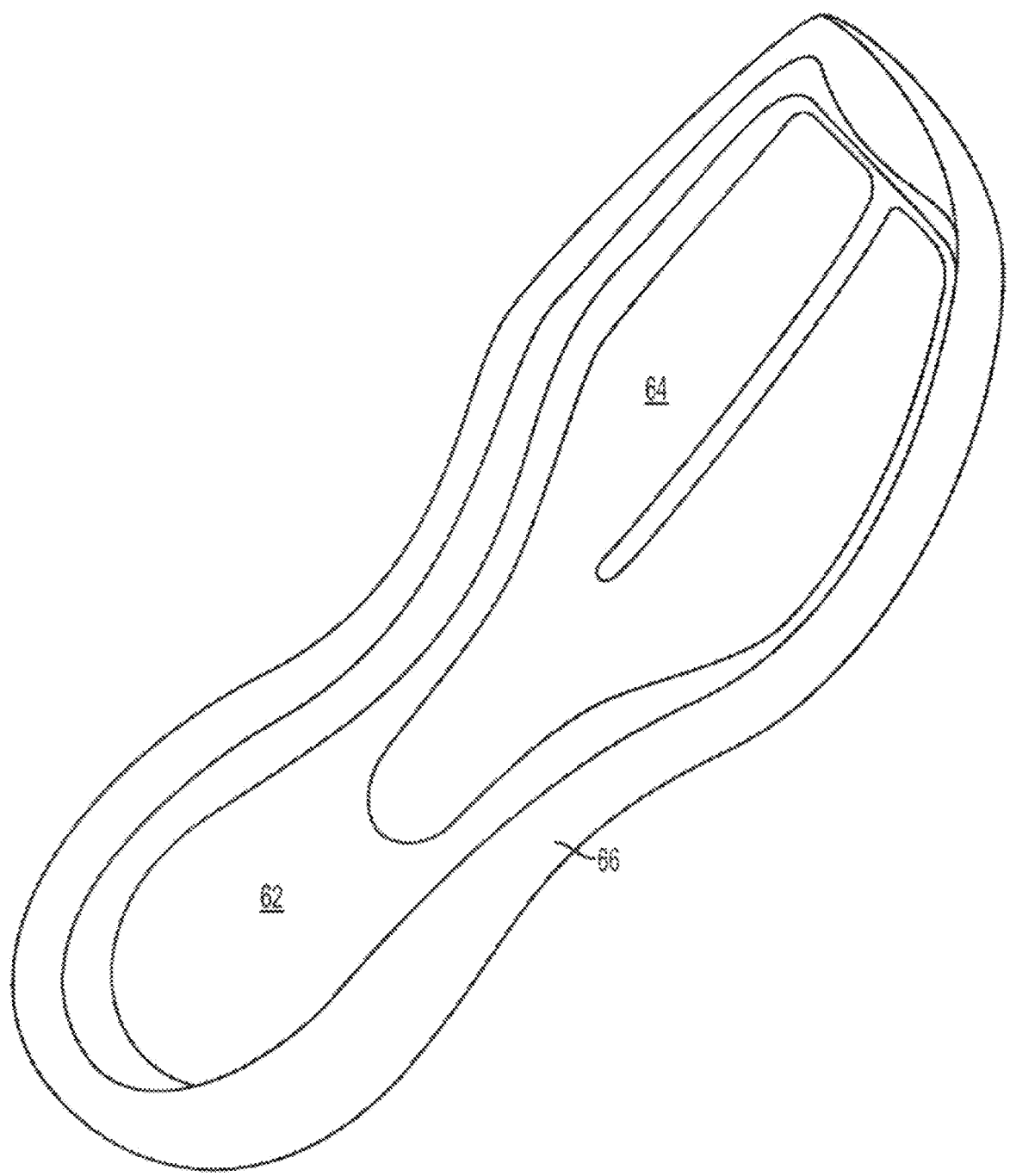
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is article made using the disclosed methods as described herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is article made using the disclosed methods as described herein, can also be used. In the example illustrated in FIGS. 4 and 5, a portion of a first material 62 can be used in the heel region of the insert, and a portion of a second material 64 can be used in the toe region of the insert. A higher density material can be used to support the heel region, while a lower density material can be used to support the toe region. For example, the density of the first material can be at least 0.02 grams per cubic centimeter greater than the density of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

Figure 6:
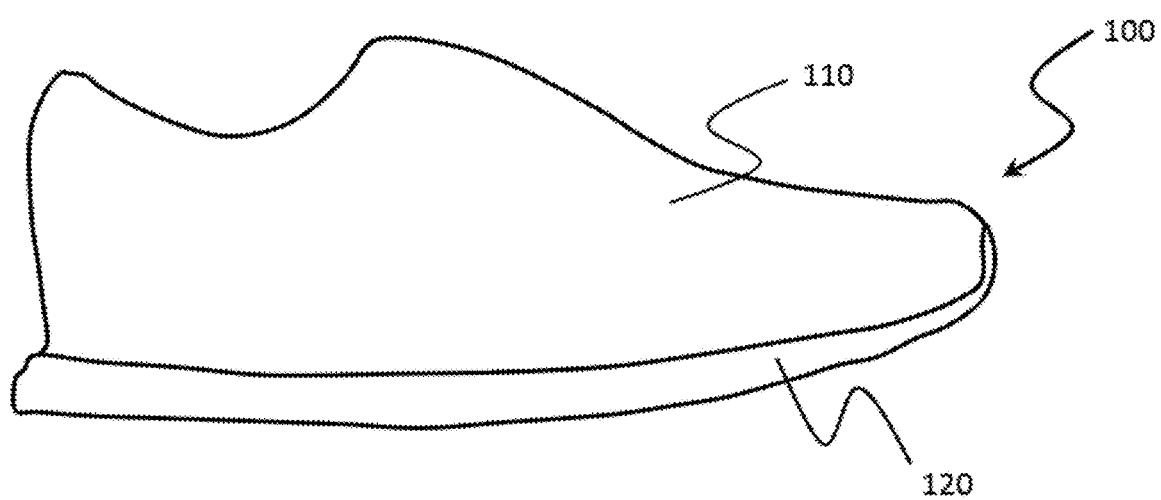
FIG. 6 is a lateral view of an article of footwear showing a shoe upper and outsole.
Figure 7:
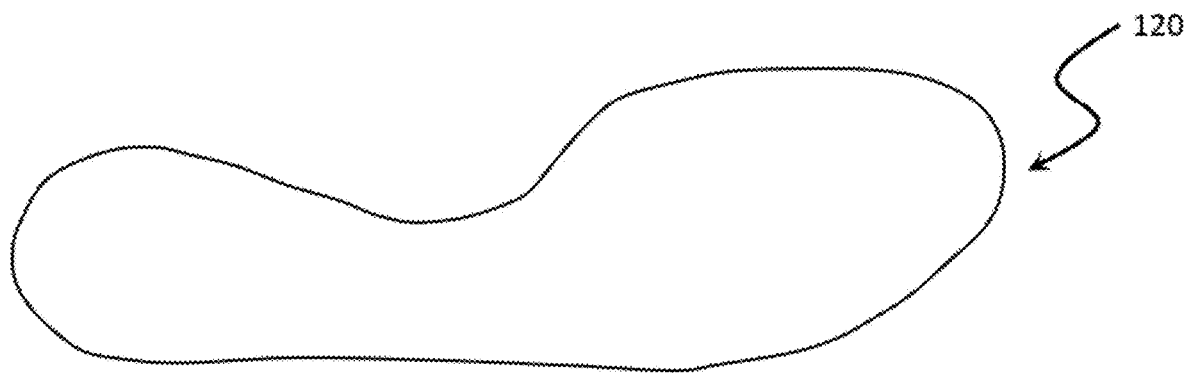
FIG. 7 is a plan view of the bottom of an outsole component.

FIG. 6 shows a lateral view of an article of footwear 100, such as an article of athletic footwear, having an upper 110 and an outsole 120. The article of footwear 100 may further comprise other components typical of footwear or athletic footwear, e.g., midsole, sockliner, padded collar, and the like. However, for ease of discussion herein, only the upper 110 and the outsole 120 are specifically shown in the figure. In various aspect, the disclosed article can be an outsole 120 with a lateral shape as shown in FIG. 6, or other lateral shapes as determined by the requirements of a particular article of footwear. FIG. 7 shows a corresponding plan view of an outsole 120 for which the corresponding lateral view is shown in FIG. 6. In various aspects, the disclosed article can be an outsole 120 with a plan view shape as shown in FIG. 7, or other plan view shapes as determined by the requirements of a particular article of footwear.

Figure 8:
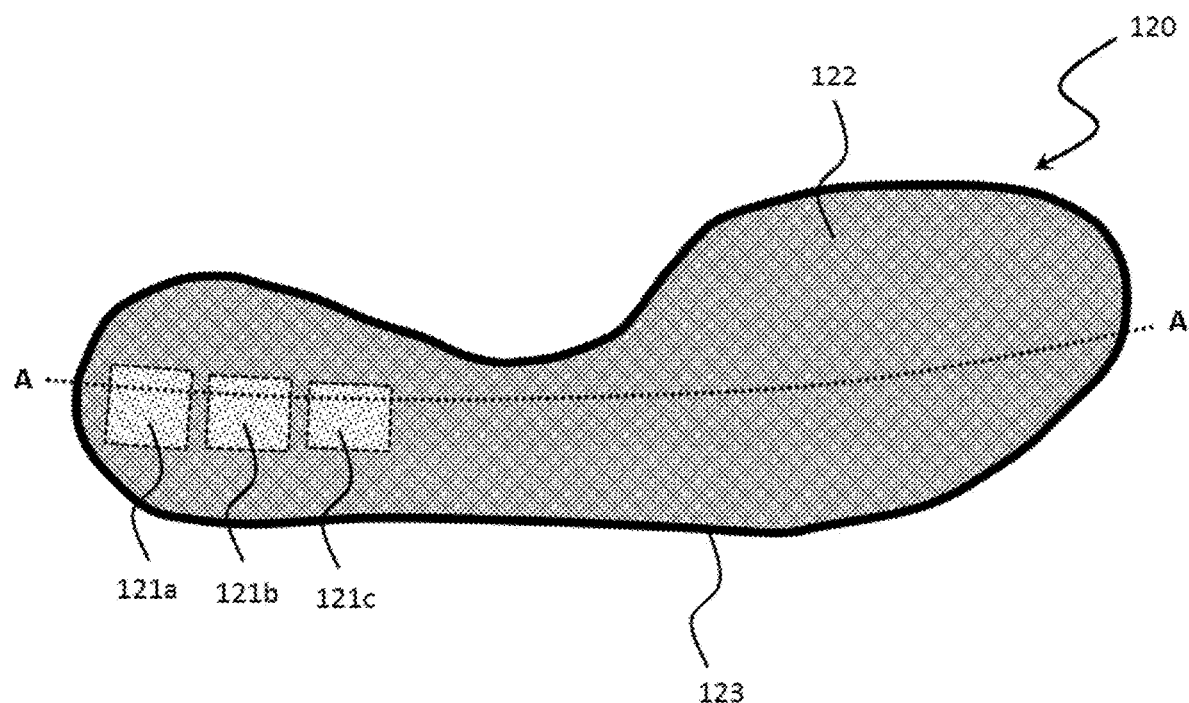
FIG. 8 is a bottom cross-sectional view of the outsole component shown in FIG. 7 depicting sub-regions of varied foam particle fusion.

FIG. 8 shows a plan view of an outsole 120 comprising three sub-regions of differing properties prepared using the disclosed methods described herein. In various aspects, an outsole 120 can comprise two or more sub-regions with different properties such as density, flexural modulus, resilience, and the like that can be associated with differing levels of heating each sub-regions is subjected to in the method. For example, sub-regions 121a, 121b, and 121c have a defined plan view geometry located roughly within the heel portion of the outsole. Although these sub-regions, 121a, 121b, and 121c, are shown with a rectangular geometry, one skilled in the art can appreciate that any number of geometries are possible and are contemplated in the present disclosure. Moreover, the arrangement of these sub-regions, 121a, 121b, and 121c, can be varied to provide the desired performance characteristics for the outsole based on geometry, size, and location of a desired sub-region with a desired density.

In some aspects, the foam particles within these sub-regions, 121a, 121b, and 121c, may be completely non-fused. That is, an energy beam, as it passed over the x-y coordinates within 121a, 121b, and 121c, can pause the energy beam emission within these sub-regions. Accordingly, the density of these sub-regions, 121a, 121 b, and 121c, can be less than other sub-regions that are exposed to one or more iterations of an energy beam. In an alternative aspect, the foam particles within these sub-regions, 121a, 121b, and 121c, are subjected to only a single iteration of exposure to an energy beam. In a further alternative aspect, the foam particles within these sub-regions, 121a, 121 b, and 121c, are subjected to 2-7 iterations of exposure to an energy beam, but fewer iterations of exposure to the energy beam than sub-regions 122 or 123.

In contrast, sub-region 122 in FIG. 8 comprises fused foam particles with approximately the same properties, e.g., density. That is, the foam particles in sub-region 122 were exposed to the same intensity and duration of an energy beam. The sub-region 123 is essentially the edge of the outsole 120 in the plan view that is shown. The foam particles in this sub-region are characterized as being highly fused. In some aspects, the density of sub-regions 122 and 123 is greater than the density of the sub-regions 121a, 121b, and 121c. In some aspects, the density of sub-region 123 is greater than the density of sub-region 122.

Figure 9:
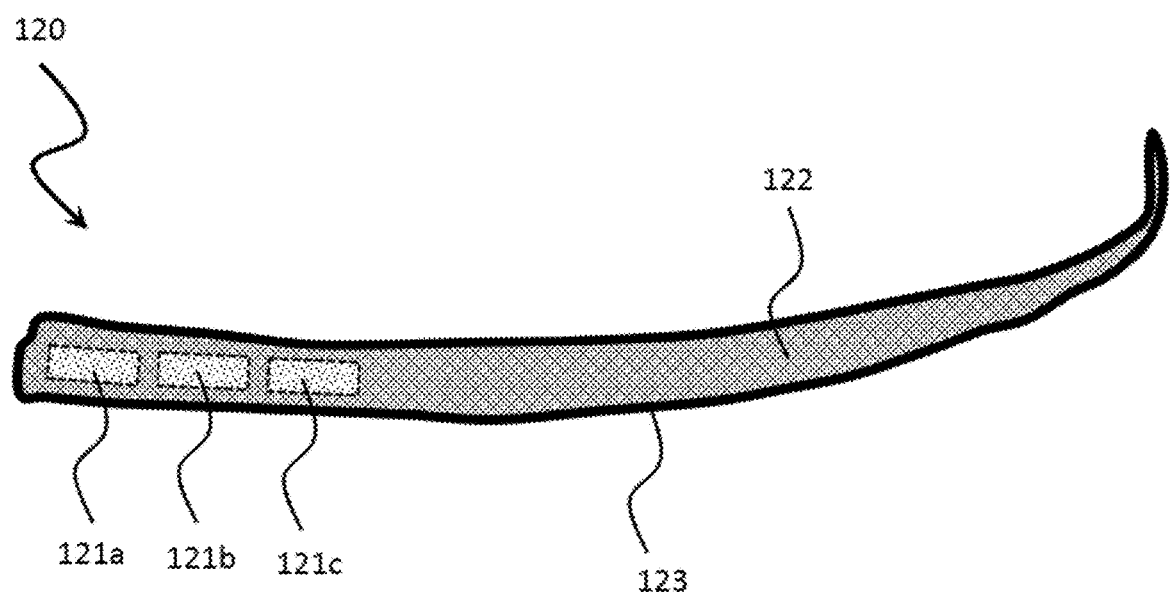
FIG. 9 is a lateral cross-sectional view of the outsole component shown in FIG. 8 along line A-A depicting sub-regions of varied foam particle fusion.

FIG. 9 shows a cross-sectional view of an outsole 120 shown in FIG. 8 along line A-A. The cross-sectional view shows that sub-regions 121a, 121b, and 121c can have not only defined plan view geometries, but also extend along different portions of the depth (or z-axis) of the outsole 120.

Figure 10:
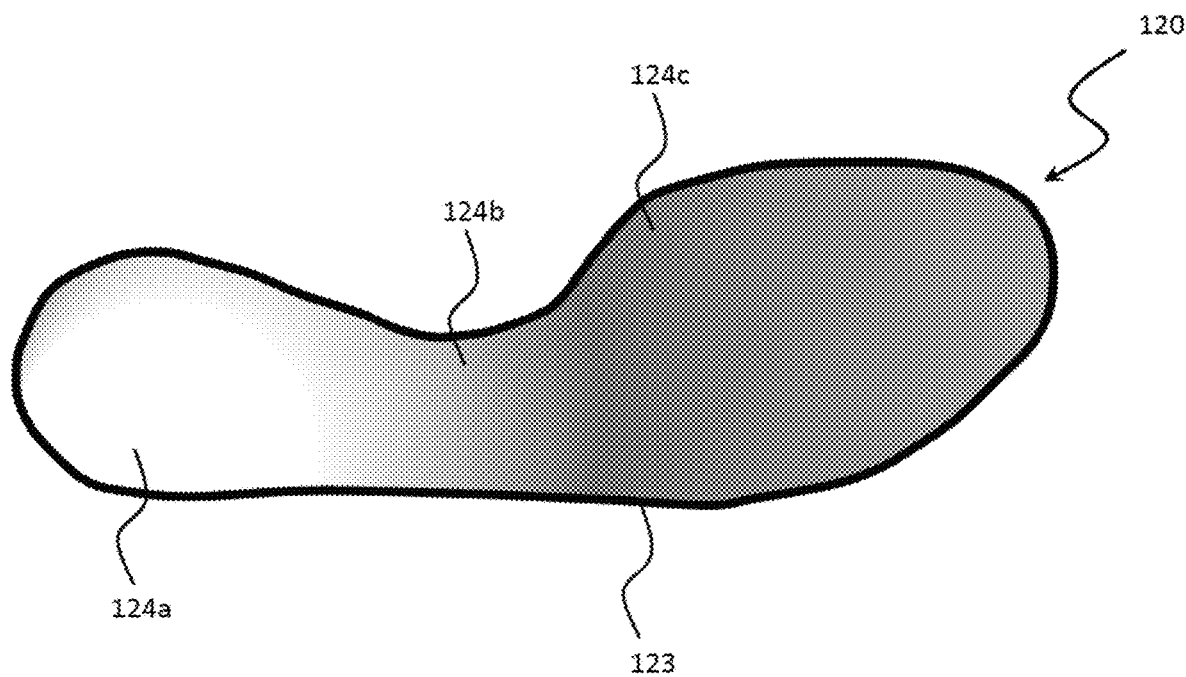
FIG. 10 is a bottom cross-sectional view of the outsole component shown in FIG. 7 depicting sub-regions of varied foam particle fusion.

FIG. 10 shows a plan view of an outsole 120 comprising a gradient change in fusion of the foam particles contained therein. For example, the variables of energy beam output and exposure time can be changed in very small x-y dimensional steps such that the level of fusion of foam particles has a gradient characteristic from sub-region 124a sub-region to 124b to sub-region 124c. Accordingly, a property associated with the level of fusions, e.g., density of the sub-region, can vary in a gradient manner from one sub-region to another sub-region. In FIG. 10, the level of fusion of the foam particles is denoted by the grayscale shown, with lighter regions having a lower level of fusion of foam particles and darker regions having a higher level of fusion of foam particles. As shown in FIG. 10, the outsole 120 comprises a further sub-region, 123, that defines a highly fused outer edge of the outsole 120.

While the disclosed methods described herein can be used for making any of a variety of components, including a variety of components for an article of footwear, in particular aspects the components include a midsole, an outsole, a sock-liner, a heal-cushioning pad, an insole, or an insert. Additional articles can include a tongue padding, a collar padding, and a combination thereof. As described above and detailed more completely below, the articles made using the disclosed methods described herein can exhibit sub-regions having different properties such as, but not limited to, bulk density, resiliency, or flexural modulus. The sub-regions can be discrete regions having a property distributed more or less uniformly within the sub-region. In other aspects, the article manufactured by the disclosed methods may be characterized by a gradient distribution of the property along an x-axis, y-axis, and/or z-axis of the article.

In some aspects, the article can be a padding component in shinguards, shoulder pads, chest protectors, masks, helmets or other headgear, knee protectors, and other protective equipment; a component placed in an article of clothing between textile layers; or may be used for other known padding applications for protection or comfort, especially those for which weight of the padding is a concern.

In various aspects, the present disclosure relates to an article made by a disclosed method as described herein. In some aspects, the article is used in the manufacture of an article of footwear. In a further aspect, the article used in the manufacture of an article of footwear is a pre-form, a midsole, an outsole, a sock-liner, or a heal-cushioning pad. In some aspects, the article is padding component used in a sports helmet, a backpack, apparel, sports uniform padding, or combat gear.

In various aspects, the article is characterized by a plurality of sub-regions comprising a first sub-region characterized by a first property and a second sub-region characterized by a second property, wherein the first property is not equal to the second property, and wherein the first property and the second property are flexural modulus, stiffness, bulk density, or resilience.

In various aspects, the article is characterized by a plurality of cross-sectional sub-regions comprising a first sub-region characterized by a first flexural modulus and a second sub-region characterized by a second flexural modulus, wherein the first flexural modulus is not equal to the second flexural modulus.

In various aspects, the article is characterized by a plurality of cross-sectional sub-regions comprising a first sub-region characterized by a first bulk density and a second sub-region characterized by a second bulk density, wherein the first bulk density is not equal to the second bulk density.

In various aspects, the article is characterized by a plurality of cross-sectional sub-regions comprising a first sub-region characterized by a first stiffness and a second sub-region characterized by a second stiffness, wherein the first stiffness is not equal to the second stiffness.

In various aspects, the article is characterized by a plurality of cross-sectional sub-regions comprising a first sub-region characterized by a first resilience and a second sub-region characterized by a second resilience, wherein the first resilience is not equal to the second resilience.

Methods of Manufacturing an Article Using Foam Particles.

In various aspects, the present disclosure pertains to methods comprising additive manufacturing methods. In a further aspect, the disclosed methods comprise heating a target area with comprising a plurality of foam particles with a directed energy beam under conditions effective to fuse a portion of the plurality of foam particles comprising one or more thermoplastic elastomers. Heating of a target area can be carried out for one or multiple iterations. In some aspects, heating a target area with a directed energy beam comprises selective laser sintering of the foam particles.

The methods described herein comprise various disclosed steps, each of which can be repeated, and as used herein, "iteration" is understood to refer to a repetition of a step or collection of steps. For example, a disclosed method can comprise steps of: arranging a plurality of foam particles formed of a first thermoplastic elastomer material; increasing a temperature of at least a portion of the plurality of foam particles with actinic radiation under conditions effective to melt or soften a portion of the first thermoplastic elastomer material of the of the plurality of foam particles; and decreasing the temperature of the melted or softened portion of the first thermoplastic elastomer material, thereby solidifying the melted or softened portion of the first thermoplastic elastomer material and forming a plurality of fused foam particles. Accordingly, it is understood that the present disclosure encompasses one or more iteration of each step independently of the other steps. For example, the arranging step can be repeated for one or more iterations, such that each iteration is the arranging step carried out. In a similar manner, the increasing the temperature can be repeated for one or more iterations independently of iterations of the arranging step or decreasing the temperature step in the foregoing example. Likewise, the decreasing the temperature step can be repeated for one or more iterations independently of iterations of the arranging step or increasing the temperature step in the foregoing example.

In further aspects, an iteration can comprise one or more repetitions of an ensemble or group of steps. For example, in the preceding example, the steps of arranging, increasing the temperature, and decreasing the temperature can be carried out as a sequence of steps from arranging to the increasing the temperature to the decreasing the temperature, and this sequence of steps would comprise a cycle of the method. Accordingly, a cycle, comprising a sequence of steps, can be repeated for one or more iterations. The number of iterations can be from 1 to about 500 iterations, from 1 to about 400 iterations, from 1 to about 300 iterations, from 1 to about 250 iterations, from 1 to about 200 iterations, from 1 to about 150 iterations, from 1 to about 100 iterations, from 1 to about 90 iterations, from 1 to about 80 iterations, from 1 to about 70 iterations, from 1 to about 60 iterations, from 1 to about 50 iterations, from 1 to about 40 iterations, from 1 to about 30 iterations, from 1 to about 20 iterations, from 1 to about 10 iterations, from 1 to about 9 iterations, from 1 to about 8 iterations, from 1 to about 7 iterations, from 1 to about 6 iterations, from 1 to about 5 iterations, from 1 to about 4 iterations, from 1 to about 3 iterations, from 1 to about 2 iterations, any subrange within the foregoing ranges, or any set of values within the foregoing ranges.

A target area is understood to comprise any region comprising a plurality of foam particles into which actinic radiation is directed. The target area can comprise an external surface of a region or sub-region, as well as underlying portions that are contiguous or in communication with the external surface of a region or sub-region. In this example, the target area comprises not only the exterior surfaces of the plurality of foam particles, but those portions of the plurality of foam particles accessible to the actinic radiation used to soften and melt the foam particles. For example, a target area can be a portion of a layer of a plurality of foam particles. In some instances, actinic radiation can be provided via a directed energy beam that is used to increase the temperature of a subset of a plurality of foam particles in certain portions of the layer of the plurality of foam particles. Alternatively, the actinic radiation can be provided to all or substantially all of a plurality of foam particles if the desired target area comprises all of the foam particles.

In an aspect, the disclosure pertains to a method of forming an article, the method comprising: arranging a plurality of foam particles, wherein the plurality of foam particles comprise a thermoplastic elastomer, wherein the plurality of foam particles has a number average particle size of about 0.04 millimeters to about 10 millimeters in a longest dimension; and heating a target area of the plurality of foam particles with a directed energy beam under conditions effective to fuse the target area of the plurality of foam particles, wherein the heating is carried out for at least one iteration.

In an aspect, the disclosure pertains to a method of forming an article, the method comprising: arranging a plurality of foam particles, wherein the plurality of foam particles comprise a thermoplastic elastomer, wherein the plurality of foam particles has a number average particle size of about 0.1 millimeters to about 10 millimeters in a longest dimension; and heating a target area of the plurality of foam particles with a directed energy beam under conditions effective to fuse the target area of the plurality of foam particles, wherein the heating is carried out for at least one iteration.

In an aspect, the disclosure pertains to a method of forming an article, the method comprising: arranging a plurality of foam particles such that the plurality of foam particles comprise a first particle having a first surface in contact with a second surface of an adjacent particle, wherein the plurality of foam particles has a number average particle size of about 0.04 millimeters to about 10 millimeters in the longest dimension; and heating a target area of the plurality of foam particles with a directed energy beam under conditions effective to fuse the first surface of the first particle to the second surface of the adjacent particle, wherein the heating is carried out for at least one iteration.

In an aspect, the disclosure pertains to a method of forming an article, the method comprising: arranging a plurality of foam particles such that the plurality of foam particles comprise a first particle having a first surface in contact with a second surface of an adjacent particle, wherein the plurality of foam particles has a number average particle size of about 0.1 millimeters to about 10 millimeters in the longest dimension; and heating a target area of the plurality of foam particles with a directed energy beam under conditions effective to fuse the first surface of the first particle to the second surface of the adjacent particle, wherein the heating is carried out for at least one iteration.

In a further aspect, the arranging a plurality of foam particles comprises depositing a layer comprising the plurality of foam particles. In some aspects, the layer is essentially planar. The article formed by the disclosed methods can be formed from a single layer. Alternatively, the article formed by the disclosed methods can be formed from at least two layers. In a further aspect, the article is formed from 2 to 50 layers; 2 to 40 layers; 2 to 30 layers; 2 to 25 layers; 2 to 20 layers; 2 to 15 layers; 2 to 10 layers; or 2 to 5 layers. In a still further aspect, the article is formed layer-wise from a plurality of layers.

It is understood that the arranging and heating steps can be repeated on a given layer in order to achieve the desired properties for the layer or for sub-regions within the layer. In an aspect, an iteration of the arranging comprises depositing a layer comprising the plurality of foam particles.

In various aspects, the arranging the plurality of foam particles step in the disclosed method comprises arranging using a roller mechanism, a wiper mechanism, or a blower mechanism. In a further aspect, the arranging the plurality of foam particles comprises arranging using a roller mechanism. The roller mechanism can comprise a smooth roller surface, or alternatively, a textured roller surface. In an aspect, the arranging the plurality of foam particles comprises arranging using a wiper mechanism. It is understood that the arranging the plurality of foam particles can be arranging a layer of a plurality of foam particles.

In various aspects, the directed energy beam is a laser beam. The laser beam can be emitted by a gas dynamic laser, a diode laser, or a lead salt laser. In an aspect, the laser beam is emitted by a carbon dioxide laser. In some aspects, the laser beam is within the infrared spectrum. The laser beam can broadly comprise the all or most of the infrared spectrum, or alternatively, the laser beam can comprise sub-regions of the infrared spectrum such as the far infrared spectrum, the near infrared spectrum, the mid infrared spectrum.

In various aspects, the laser beam comprises a two or more laser beams, wherein each laser beam is directed at the target area. In a further aspect, each of the two or more laser beams can comprise a different portion of the electromagnetic light spectrum. For example, the laser beam can comprise one laser emitting in the near infrared spectrum and a second laser beam emitting in the far infrared spectrum.

In various aspects, the laser beam emits a beam with a wavelength of about 700 nm to about 1 millimeters; about 1 micrometers to about 20 micrometers; about 3 micrometers to about 15 micrometers; about 3 micrometers to about 8 micrometers; about 8 micrometers to about 15 micrometers; or about 9 micrometers to about 11 micrometers.

In various aspects, the laser beam has a beam width of about 0.1 millimeters to about 0.7 millimeters; about 0.2 millimeters to about 0.6 millimeters; about 0.3 millimeters to about 0.5 millimeters; or about 0.3 millimeters to about 0.4 millimeters. In some aspects, the laser beam is defocused.

In various aspects, the laser beam has a scan pattern such that each pass of the laser beam overlaps the adjacent pass of the laser beam by a fractional amount of about 0.1 to 0.5. In a further aspect, the laser beam has a scan pattern such that each pass of the laser beam overlaps the adjacent pass of the laser beam by a fractional amount of about 0.3.

In various aspects, the directed energy beam has a power output of about 25 to about 75 watts; about 35 to about 55 watts; about 45 to about 65 watts; or about 50 to about 60 watts. In a further aspect, the directed energy beam has a power output of about 55 watts.

In various aspects, the processing conditions comprise directing a directed energy beam at a scanning rate across a target area of about 7,500 millimeters per second to about 25,000 millimeters per second, or alternatively, at a scanning rate across a target area of about 10,000 millimeters per second to about 15,000 millimeters per second. In some aspects, the processing conditions comprise directing a directed energy beam at a scanning rate across a target area of about 12,500 millimeters per second.

The heating of a given target area comprising a plurality of foam particles can be carried out for a varied number of iterations, e.g., 1 iterations to 500 iterations; 1 iterations to 10 iterations; 1 iterations to 8 iterations; 1 iterations to 7 iterations; 2 iterations to 10 iterations; 2 iterations to 8 iterations; or 2 iterations to 7 iterations. In some aspects, the heating a target area of the plurality of foam particles is carried out for at least 2 iterations. In some aspects, heating the target area is carried out for 1 iteration, 2 iterations, 3 iterations, 4 iterations, 5 iterations, 6 iterations, or 7 iterations.

In some aspects, the heating of a target area fuses a first foam particle to a second foam particle in the target area, wherein the first foam particle is melted to a depth of about 10 micrometers about 500 micrometers measured from the surface of the first foam particle, and wherein the second foam particle is melted to a depth of about 10 micrometers about 500 micrometers measured from the surface of the second foam particle. In other aspects, the heating of a target area fuses a first foam particle to a second foam particle in the target area, wherein the first foam particle is melted to a depth of about 25 micrometers about 200 micrometers measured from the surface of the first foam particle, and wherein the second foam particle is melted to a depth of about 25 micrometers about 200 micrometers measured from the surface of the second foam particle.

In various aspects, the disclosed methods of forming an article can further comprise providing an additive to a layer. In some aspects, the additive is provided during forming the layer of a plurality of foam particles. Alternatively, in an aspect, the additive is provided after forming the layer of a plurality of foam particles and before directing the energy beam. In a further aspect, the additive is provided at the same or about the same time as directing the energy beam. In a still further aspect, the additive is provided after directing the energy beam. It is understood that providing an additive can comprise spraying, sublimating, brushing, soaking, or other means suitable for bringing an additive in contact with at least one surface of the article.

In a further aspect, the additive is a polyurea or polyurethane coating. In a still further aspect, the polyurea or polyurethane coating is sprayed onto the plurality of foam particles. In yet further aspect, the additive comprises a binder, an adhesive, a lubricant, an anti-oxidant, a colorant, a filler, a laser sensitizing agent, and any combination thereof. In an aspect, the additive is an adhesive. The adhesive, in aspects, can comprise a photocurable elastomeric resin, a heat activated resin, and combinations thereof.

In an aspect, the additive comprises a laser sensitizing agent, such as an infrared absorber. An infrared absorber can be an infrared dye or infrared pigment. In some aspects, the infrared pigment is carbon black.

In various aspects, the target area of the plurality of foam particles has a density of about 0.100 grams per cubic centimeter to about 0.700 grams per cubic centimeter, or alternatively, about 0.300 grams per cubic centimeter to about 0.500 grams per cubic centimeter, after directing the energy beam at the target area.

The disclosed methods of forming an article can further comprise heating a plurality of target areas on the plurality of particles. In some aspects, the article has a border region defined by a subset of the plurality of target areas. In a further aspect, the article comprises a first cross-sectional region of the article comprises a subset of the plurality of target areas, and wherein the first cross-section region is heated. Alternatively, in various aspects, the article comprises a first cross-sectional region of the article comprises a subset of the plurality of target areas, and wherein the first cross-section region is not heated. The heating of the plurality of target areas can be carried out by directing the directed energy beam to each target area using a vector scan method. Alternatively, the heating of the plurality of target areas can be carried out by directing the directed energy beam to each target area using a raster scan method. In some aspects, the plurality of target areas comprise a first plurality of target areas and a second plurality of target areas.

In some aspects, the method further comprises spraying or coating one or more layers of polyurea, polyurethane, or combinations thereof onto an article manufactured using the disclosed methods described herein. For example, an article, e.g., an outsole made using the disclosed methods or shoe comprising same, can be spray coated with one or more layers of a polyurea, a polyurethane, or combinations thereof. Suitable sprayable polyureas or polyurethanes are commercially available, e.g., STS 300 polyurethane, HIGHLINE 200 polyurethane, SUREGRIP polyurea, HIGHLINE 310 polyurea, or HIGHLINE 510 polyurea manufactured by ArmorThane USA, Inc. (Springfield, Mo.). In a further aspect, at least the ground-facing surface of an outsole is coated with a polyurea, a polyurethane, or combinations thereof. In a still further aspect, at least the ground-facing and side-surfaces of an outsole are coated with a polyurea, a polyurethane, or combinations thereof.

In various aspects, the method can further comprise arranging a selective laser sintering powder on a surface of the article, such that the selective laser sintering powder comprises a second thermoplastic elastomer; and heating a target area of the laser sintering powder with a directed energy beam under conditions effective to fuse the laser sintering powder, wherein the heating the target area of the laser sintering powder is carried out for at least one iteration.

The selective laser sintering powder can be a conventional selective laser sintering powder comprising a thermoplastic elastomer. The thermoplastic elastomer, referred to herein immediately above, as the second thermoplastic elastomer, can independently comprise any thermoplastic elastomer, or combinations of thermoplastic elastomers, as disclosed herein, including, but not limited to, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, and any blend thereof. In some aspects, the selective laser sintering powder used can have a particle size of about 0.020 millimeters to about 0.100 millimeters. In a further aspect, the selective laser sintering powder used is substantially a non-foam material.

The arranging the selective laser sintering powder on a surface of the article and the heating the target area of the laser sintering powder can be repeated for multiple iterations. In some cases, an iteration of the arranging comprises depositing a layer comprising the selective laser sintering powder. Multiple iterations of arranging and heating the selective laser sintering powder can be used to form a skin on an article manufactured using the disclosed methods using foam particles. Accordingly, the thickness of the skin can be modulated by the number of iterations of arranging and heating the selective laser sintering powdering that is placed on the surface of the foam article. The heating can be carried out for a period of time at a temperature such that the selective laser sintering powder fuses. In some instances, the heating can be carried out for a period of time at a temperature such that the selective laser sintering powder melts, such that the selective laser sintering powder flows in the melted state. That is, in various aspects, the heating is at a temperature sufficient and a time sufficient to melt the selective laser sintering powder, thereby forming a melted selective laser sintering powder; and such that a portion of the melted selective laser sintering powder is flowable. A selective laser sintering powder can be selected based on the viscosity it will have in the melted state. For example, a more viscous melted selective laser sintering powder may be chosen if it is desired that it not penetrate significantly into the article (i.e., the foamed article prepared using the disclosed methods using foam particles). Alternatively, a selective laser sintering powdering have a low viscosity in the melted state may be desired when that it be capable of flowing more deeply into the foam article.

In some aspects, the arranging the selective laser sintering powder is depositing the selective laser sintering powder on the surface of the article. Alternatively, the arranging the selective laser sintering powder is spraying a suspension of the selective laser sintering powder in a solvent on the surface of the article. The solvent can either be water or an aqueous solution, or alternatively, an organic solvent.

The disclosed methods can further comprise compression molding. That is, the article manufactured using the disclosed methods can be a pre-form used in the manufacture of a component of footwear. It is understood in the art that can be a foamed article which will then be compression molded in a closed mold under heat and pressure. The compression molding process creates an outer skin on the molded article. The outer skin can provide a desirable aesthetics for a component used in the manufacture of footwear, e.g., it can impart a more uniform look with more controlled topography, as well as modify properties of the component, such as its compression set. Conventionally, pre-forms are cut from foam sheetstock or are injection molded and foamed simultaneously. Disclosed herein are methods to manufacture a pre-form using the disclosed additive manufacturing methods using foam particles, and then compression molding the pre-form using compression molding methods known to the skilled artisan. The disclosed methods provide a surprisingly efficient approach to reduce waste typically associated with manufacturing a component used in footwear, e.g., from the unused part of the sheetstock, or the runners from injection molding. The disclosed methods also generally eliminate the need for cutting tools if the pre-form is manufactured from sheetstock, or alternatively, eliminates the significant cost associated with tooling if the pre-form is an injection molded pre-form.

In various aspects, disclosed additive manufacturing methods can further comprise building a fused foam particulate structure, as described herein, directly, and thereby adhered to, an element, such as a textile element, a film element, a molded resin element, and the like. Alternatively or in addition, an element, such as a textile element, a film element, a molded resin element, and the like, can be placed in contact with fused or unfused particulate foam, and more particulates can be then fused on top of and/or around the element. This process can be used to create a layered structure including one or more layered elements between one or more layers of fused foam particulates. Alternatively or in addition, one or more elements can be completely or partially surrounded by fused foam particulates. Optionally, the fused foam particulates can be adhered to the element. For example, the foam particulates can be adhered to the element by a physical bond formed during the fusing process, either by melting or softening and then re-solidifying the foam particulates during the fusing process, or by melting or softening a portion of the element (e.g. a thermoplastic material forming the bulk of the element, or a thermoplastic material forming an outside layer of the element), or by applying an adhesive to at least a portion of the element.

The element onto which the fused foam particulate structure is built can be a flexible element such as a textile element or a film element. For example, the flexible element can be a component of an article of footwear such as a strobel or an upper, and the fused foam particulate structure built on the flexible element can be a cushioning element such as a midsole component or an ankle cushion or a tongue for an article of footwear. Alternatively, the flexible element can be a component of an article of apparel or sporting equipment, and the foam particulate structure built on the flexible element can be a cushioning element or an impact-absorbing element. Using an additive manufacturing process to fuse the foam particulates to form the component allows the fused foam particulate portion of the component to be easily customized based on an individual's measurements, desired layer of cushioning or impact absorption, or both.

In further aspects, the element onto which the fused foam particulate structure is built can be an element comprising a film element, such as, for example, a bladder. The bladder can be a sealed, fluid-filled bladder, or can be a bladder which has not yet been filled with a fluid and sealed. The film portion of the bladder can be a barrier membrane formed from multiple layers of different polymeric materials. For example, the film element can be a component of an article of footwear such as a bladder, and the combination of the fused foam particulate structure and the film element can be a sole structure for an article of footwear, such as a midsole or a component of a midsole for an article of footwear. Alternatively, the film element can be a component of an article of apparel or sporting equipment, and the foam particulate structure built on the film element can be a cushioning element or an impact-absorbing element. Using the disclosed additive manufacturing processes to fuse the foam particulates to form the component allows the fused foam particulate portion of the component to be easily customized based on an individual's measurements, desired layer of cushioning or impact absorption, or both.

In further aspects, the element onto which the fused foam particulate structure is built can be a rigid element such as a molded resin element, including an injection molded or extruded resin element. For example, the rigid element can be a component of an article of footwear such as a midsole component (such as a support or plate structure) or a heel counter, and the fused foam particulate structure built on the rigid element can be a cushioning element such as a midsole component or an ankle cushion for an article of footwear. Alternatively, the rigid element can be a component of an article of apparel or sporting equipment, and the foam particulate structure built on the flexible element can be a cushioning element or an impact-absorbing element. For example, the rigid element can be a component of an article of protective gear, and the fused foam particulate structure can be built directly onto the rigid element to form a cushioning or impact absorbing element for the article of protective gear. Using the disclosed manufacturing process to fuse the foam particulates to form a cushioning or impact absorbing portion of an article allows the fused foam particulate structure to be easily customized based on an individual's measurements, desired layer of cushioning or impact absorption, or both.

In various aspects, disclosed additive manufacturing methods can further comprise fusing the foam particulates, prepared as described herein, directly, and thereby adhered to, into a variety of structures. In one example, the fused foam particulates can be fused to form a structure having an interior surface and an exterior surface. The fused foam particulate structure can be a structure having a plurality of interior surfaces and a plurality of exterior surfaces, such as a honeycomb structure. The fused foam particulate structure can include hollow regions which are sealed or open. Optionally, the hollow regions can be filled with a plurality of unfused foam particulates, or with one or more rigid elements. The fused foam particulate structure can have a cylindrical or polyhedral geometry. In one example, the fused foam particulate structure can be a sealed structure having an interior surface and an exterior surface, and can have a spherical, ellipsoidal, cylindrical, or polyhedral geometry. Using a hollow foam particulate structure can allow for a reduction in the density of the overall structure as compared to a solid structure having the same geometry. The hollow or sealed foam particulate structures can be used to form support elements, such as support columns. In one example, the columns can be designed to buckle in a particular direction or under a particular load based on the degree to which the foam particulates are fused in particular regions of the column structure. A plurality of the hollow or sealed foam particulate structures can be grouped or fused together to form a larger structure, such as a midsole or other cushioning component.

Foam Particles.

In various aspects, the foam particles used in the disclosed methods can be prepared via a suspension or an extrusion process. The term "foam particle" is used herein to refer to foamed polymers in particulate form, i.e., a foamed polymer in a particulate form such that the particulate has gas-filled cells, including an open cell structure, closed cell structure, or combinations thereof, within at least a portion of the interior volume of the foam particle. In some instances, greater than about 50 percent, about 60 percent, about 70 percent, about 80 percent, about 90 percent, or more of the interior volume of the foam particle can be formed from gas-filled cells. In some cases it is desirable that substantially all of the interior volume is formed from gas-filled cells. The foam particle can optionally have a skin covering greater than about 50 percent, about 60 percent, about 70 percent, about 80 percent, about 90 percent, or more of the exterior surface area of the foam particle. In some instances, the optional skin can cover substantially all of the exterior surface area of the foam particle. The foam particles can have a variety of shapes, or comprise a mixture of shapes, such as regularly shaped particles, such as rods, spheroid, ellipsoid, or ovoid shape; or such as irregularly shaped particles. The foam particles can optionally comprise a non-foam skin.

In a suspension process, the thermoplastic elastomer in the form of pellets can be heated with water, with a suspending agent, and with the blowing agent in a closed reactor to above the softening point of the pellets. The pellets are thereby impregnated by the blowing agent. It is then possible either to cool the hot suspension, whereupon the particles solidify with inclusion of the blowing agent, and to depressurize the reactor. The pellets comprising blowing agent and obtained in this way are foamed via heating to give the foam particles. As an alternative, it is possible to depressurize the hot suspension suddenly, without cooling (explosion-expansion process), whereupon the softened beads comprising blowing agent immediately foam to give the foam particles.

In the extrusion process, the thermoplastic elastomer can be mixed, with melting, in an extruder with a blowing agent which is introduced into the extruder. The mixture comprising a blowing agent can be extruded and pelletized under conditions of pressure and temperature such that the thermoplastic elastomer does not foam. For example, a method being used for this purpose being underwater pelletization, which is operated with a water pressure of more than 2 bar to provide expandable beads comprising blowing agent, which are then foamed via subsequent heating to give the foam particles. Alternatively, the mixture can also be extruded and pelletized at atmosphereospheric pressure. In this process, the melt extrudate foams and the product obtained via pelletization comprises the foam particles.

The thermoplastic elastomer can be used in the form of commercially available pellets, powder, granules, or in any other form. It is advantageous to use pellets. An example of a suitable form is what are known as minipellets whose preferred average diameter is from 0.2 to 10 millimeters, in particular from 0.5 to 5 millimeters. These mostly cylindrical or round minipellets are produced via extrusion of the thermoplastic elastomer and, if appropriate, of other additives, discharged from the extruder, and if appropriate cooling, and pelletization. In the case of cylindrical minipellets, the length can be 0.2 to 10 millimeters, or alternatively can be from 0.5 to 5 millimeters. The pellets can also have a lamellar shape. The average diameter of the thermoplastic elastomer comprising blowing agent is preferably from 0.2 to 10 millimeters.

Depending upon the particular process used, the preferred blowing agents can vary if appropriate. In the case of the suspension process, the blowing agent used can comprise organic liquids or inorganic gases, or a mixture thereof. Liquids that can be used comprise halogenated hydrocarbons, but preference is given to saturated, aliphatic hydrocarbons, in particular those having from 3 to 8 carbon atoms. Suitable inorganic gases are nitrogen, air, ammonia, or carbon dioxide.

In various aspects, the blowing agent can be a supercritical fluids. Non-limiting examples of suitable supercritical fluids include carbon dioxide (critical temperature 31.1 degrees Celsius, critical pressure 7.38 MPa), nitrous oxide (critical temperature 36.5 degrees Celsius, critical pressure 7.24 MPa), ethane (critical temperature 32.3 degrees Celsius, critical pressure 4.88 MPa), ethylene (critical temperature 9.3 degrees Celsius, critical pressure 5.12 MPa), nitrogen (critical temperature −147 degrees Celsius, critical pressure 3.39 MPa), and oxygen (critical temperature −118.6 degrees Celsius, critical pressure 5.08 MPa). In a further aspect, the blowing agent is a supercritical fluid selected from supercritical nitrogen, supercritical carbon dioxide, or mixtures thereof Supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 $MPa^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain aspects, from about 0.1 mole percent to about 7 mole percent of the polar fluid is included in the supercritical fluid, based on total fluid, when used to infuse a polyurethane elastomer, polyurea elastomer, or a polyamide elastomer.

Supercritical fluids can be used in combination. In some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

In production of foam particles via an extrusion process, the blowing agent can comprises volatile organic compounds whose boiling point at atmosphereospheric pressure of about 1013 mbar is from −25 degrees Celsius to 150 degrees Celsius In various aspects, the organic compounds can have a boiling point at atmosphereospheric pressure of about 1013 millibar from −10 degrees Celsius to 125 degrees Celsius Hydrocarbons, which in some aspects are preferably halogen-free, have good suitability, in particular $C_{4-10}$-alkanes, for example the isomers of butane, of pentane, of hexane, of heptane, and of octane, particularly preferably sec-pentane. Other suitable blowing agents are bulkier compounds, examples being alcohols, ketones, esters, ethers, and organic carbonates.

It is also possible to use halogenated hydrocarbons, but the blowing agent is preferably halogen-free. Very small proportions of halogen-containing blowing agents in the blowing agent mixture are however not to be excluded. It is, of course, also possible to use mixtures of the blowing agents mentioned.

The amount of blowing agent is preferably from 0.1 to 40 parts by weight, in particular from 0.5 to 35 parts by weight, and particularly preferably from 1 to 30 parts by weight, based on 100 parts by weight of thermoplastic elastomer used.

In the suspension process, operations are generally carried out batchwise in an impregnator, e.g. in a stirred-tank reactor. The thermoplastic elastomer is fed, e.g., in the form of minipellets, into the reactor, as also is water or another suspension medium, and the blowing agent and, if appropriate, a suspending agent. Water-insoluble inorganic stabilizers are suitable as suspending agent, examples being tricalcium phosphate, magnesium pyrophosphate, and metal carbonates; and also polyvinyl alcohol and surfactants, such as sodium dodecylarylsulfonate. The amounts usually used of these are from 0.05 to 10 weight percent, based on the thermoplastic elastomer.

The reactor is then sealed, and the reactor contents are heated to an impregnation temperature which is usually at least 100 degrees Celsius The blowing agent can be added prior to, during, or after heating of the reactor contents. The impregnation temperature should be in the vicinity of the softening point of the thermoplastic elastomer. For example, impregnation temperatures of from about 100 degrees Celsius to about 150 degrees Celsius, or alternatively from about 110 degrees Celsius to about 145 degrees Celsius can be used.

As a function of the amount and nature of the blowing agent, and also of the temperature, a pressure (i.e., an impregnation pressure) becomes established in the sealed reactor and is generally from 2 to 100 bar (absolute). The pressure can, if necessary, be regulated via a pressure-control valve or via introduction of further blowing agent under pressure. At the elevated temperature and superatmosphereospheric pressure provided by the impregnation conditions, blowing agent diffuses into the polymer pellets. The impregnation time can be generally from 0.5 to 10 hours.

In one aspect of the suspension process, cooling of the heated suspension, usually to below a suitable temperature, e.g., about 100 degrees Celsius, takes place after the impregnation process, the result being re-solidification of the thermoplastic and inclusion of the blowing agent. The material is then depressurized. The product is foam particles which finally are conventionally isolated from the suspension. Adherent water is generally removed via drying, e.g., in a pneumatic dryer. Subsequently or previously, if necessary, adherent suspending agent can be removed by treating the beads with a suitable reagent. By way of example, treatmosphereent with an acid, such as nitric acid, hydrochloric acid, or sulfuric acid, can be used in order to remove acid-soluble suspending agents, e.g. metal carbonates or tricalcium phosphate.

In the extrusion process, it may be desirable that the thermoplastic elastomer, the blowing agent and, if appropriate, additives are introduced together (in the form of a mixture) or separately from one another at one or various locations of the extruder. The possibility, but not a requirement, here is to prepare a mixture in advance from the solid components. By way of example, it is possible to begin by mixing the thermoplastic elastomer and, if appropriate, additives, and to introduce the mixture into the extruder, and then introduce the blowing agent into the extruder, so that the extruder mixes the blowing agent into to polymer melt. It is also possible to introduce a mixture of blowing agent and additives into the extruder, i.e. to premix the additives with the blowing agent.

In the extruder, the starting materials mentioned are mixed, with melting of the thermoplastic elastomer. Any of the conventional screw-based machines can be used as extruder, in particular single-screw and twin-screw extruders (e.g. Werner & Pfleiderer ZSK machines), co-kneaders, Kombiplast machines, MPC kneading mixers, FCM mixers, KEX kneading screw extruders, and shear-roll extruders, as known to one skilled in the art. The extruder can be operated at a temperature at which the thermoplastic elastomer is present in the form of a melt, e.g., from about 150 to about 250 degrees Celsius or from about 180 to about 210 degrees Celsius However, the desired temperature will depend upon the melting temperature characteristics of the given thermoplastic elastomer.

The rotation, length, diameter, and design of the extruder screw(s), amounts introduced, and extruder throughput, are selected in a known manner in such a way as to give uniform distribution of the additives in the extruded thermoplastic elastomer.

In one aspect of the extrusion process, foam particles are produced. To prevent premature foaming of the melt comprising blowing agent on discharge from the extruder, the melt extrudate can be discharged from the extruder and pelletized under conditions of temperature and pressure such that essentially no foaming occurs. These conditions can vary as a function of the type and amount of the polymers, of the additives, and in particular of the blowing agent. The ideal conditions can easily be determined via preliminary experiments.

In a further aspect, an attractive method of preparing the foam particles used in the disclosed methods described herein is underwater pelletization in a waterbath whose temperature is below 100 degrees Celsius and which is subject to a pressure of at least 2 bar (absolute). Excessively low temperature should be avoided, because otherwise the melt hardens on the die plate, and excessively high temperature should also be avoided since otherwise the melt expands. As the boiling point of the blowing agent increases and the amount of the blowing agent becomes smaller, the permissible water temperature becomes higher and the permissible water pressure becomes lower. In the case of the particularly preferred blowing agent sec-pentane, the ideal waterbath temperature is from about 30 degrees Celsius to about 60 degrees Celsius and the ideal water pressure is from 8 to 12 bar (absolute). It is also possible to use other suitable coolants instead of water. It is also possible to use water-cooled die-face pelletization. In this process, encapsulation of the cutting chamber is such as to permit operation of the pelletizing apparatus under pressure. The foam particles can then isolated from the water and, if appropriate, dried.

In various aspects, the foam particles used in the disclosed methods can be prepared using a continuous process in which a thermoplastic elastomer is melted in a first stage in a twin-screw extruder, and then the polymer melt is conveyed in a second stage through one or more static and/or dynamic mixing elements, and is impregnated with a blowing agent. The melt loaded impregnated with the blowing agent can then be extruded through an appropriate die and cut to give foam particle material, e.g., using an underwater pelletization system (UWPS). A UWPS can also be used to cut the melt emerging from the die directly to give foam particle material or to give foam particle material with a controlled degree of incipient foaming. Controlled production of foam bead material is therefore possible by setting the appropriate counter-pressure and an appropriate temperature in the water bath of the UWPS.

Underwater pelletization is generally carried out at pressures in the range from 1.5 to 10 bar to produce the expandable polymer bead material. The die plate generally has a plurality of cavity systems with a plurality of holes. A hole diameter in the range from 0.2 to 1 millimeters gives expandable polymer bead material with the preferred average bead diameter in the range from 0.5 to 1.5 millimeters. Expandable polymer bead material with a narrow particle size distribution and with an average particle diameter in the range from 0.6 to 0.8 millimeters leads to better filling of the automatic molding system, where the design of the molding has relatively fine structure. This also gives a better surface on the molding, with smaller volume of interstices.

In various aspects, the foam particles used in the disclosed methods can have a broad range of shapes, including generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. As used herein, "generally" as used to describe a shape is intended to indicate an overall shape that may have imperfections and irregularities, such as bumps, dents, imperfectly aligned edges, corners, or sides, and so on.

In various aspects, the foam particles used in the disclosed methods can be generally spherical or ellipsoidal. In a further aspect, the foam particles used in the disclosed are ellipsoid shaped or generally ellipsoid shaped. In a still further aspect, the foam particles used in the disclosed methods spherical shaped or generally spherical shaped.

In various aspects, the foam particles are irregularly shaped. Alternatively, in aspects, the foam particles are regularly shaped or polyhedral shaped. In the case of non-spherical particles, for example ellipsoidal particles, the aspect ratio is a ratio of the largest major diameter of a cross-section taken perpendicular to the major (longest) axis of the ellipsoid. In a further aspect, foam particles used in the disclosed methods can have an aspect ratio of about 0.1 to about 1.0; about 0.60 to about 0.99; of about 0.89 to about 0.99; or of about 0.92 to about 0.99.

In various aspects, the foam particles used in the disclosed methods can have a number average particle size of about 0.1 millimeters to about 10 millimeters in the longest dimension. In a further aspect, the foam particles used in the disclosed methods can have a number average particle size of about 0.3 millimeters to about 7 millimeters in the longest dimension; about 0.5 millimeters to about 5 millimeters in the longest dimension; about 1 millimeters to about 5 millimeters in the longest dimension; about 1 millimeters to about 4 millimeters in the longest dimension; about 1 millimeters to about 3 millimeters in the longest dimension; about 1 millimeters to about 2 millimeters in the longest dimension; about 1.5 millimeters to about 5 millimeters in the longest dimension; about 1.5 millimeters to about 4 millimeters in the longest dimension; about 1.5 millimeters to about 3 millimeters in the longest dimension; or about 1.5 millimeters to about 2.5 millimeters in the longest dimension. In a still further aspect, the foam particles used in the disclosed methods can have a number average particle size of about 0.10 millimeters; about 0.15 millimeters; about 0.20 millimeters; about 0.25 millimeters; about 0.30 millimeters; about 0.35 millimeters; about 0.40 millimeters; about 0.45 millimeters; about 0.50 millimeters; about 0.55 millimeters; about 0.60 millimeters; about 0.65 millimeters; about 0.70 millimeters; about 0.75 millimeters; about 0.80 millimeters; about 0.85 millimeters; about 0.90 millimeters; about 0.95 millimeters; about 1.0 millimeters; about 1.1 millimeters; about 1.2 millimeters; about 1.3 millimeters; about 1.4 millimeters; about 1.5 millimeters; about 1.6 millimeters; about 1.7 millimeters; about 1.8 millimeters; about 1.9 millimeters; about 2.0 millimeters; about 2.1 millimeters; about 220 millimeters; about 2.3 millimeters; about 2.4 millimeters; about 2.5 millimeters; about 2.6 millimeters; about 2.7 millimeters; about 2.8 millimeters; about 2.9 millimeters; about 3.0 millimeters; about 3.5 millimeters; about 4.0 millimeters; about 4.5 millimeters; about 5.0 millimeters; about 5.5 millimeters; about 6.0 millimeters; about 6.5 millimeters; about 7.0 millimeters; about 7.5 millimeters; about 8.0 millimeters; about 8.5 millimeters; about 9.0 millimeters; about 9.5 millimeters; about 10 millimeters; or any range or any combination of the foregoing values.

In various aspects, the foam particles used in the disclosed methods can have a density of about 0.1 grams per cubic centimeter to about 0.8 grams per cubic centimeter. In a further aspect, the foam particles used in the disclosed methods can have a density of about 0.30 grams per cubic centimeter to about 0.50 grams per cubic centimeter; or about 0.32 grams per cubic centimeter to about 0.48 grams per cubic centimeter. Alternatively, the foam particles used in the disclosed methods can be characterized by their bulk density. Accordingly, in various aspects, the foam particles used in the disclosed methods can have a bulk density of about 80 grams per liter to about 200 grams per liter. In a further aspect, the foam particles used in the disclosed methods can have a bulk density of about 90 grams per liter to about 200 grams per liter; about 90 grams per liter to about 190 grams per liter; about 90 grams per liter to about 180 grams per liter; about 90 grams per liter to about 170 grams per liter; about 90 grams per liter to about 160 grams per liter; about 90 grams per liter to about 150 grams per liter; about 90 grams per liter to about 140 grams per liter; about 90 grams per liter to about 130 grams per liter; about 100 grams per liter to about 200 grams per liter; about 100 grams per liter to about 190 grams per liter; about 100 grams per liter to about 180 grams per liter; about 100 grams per liter to about 170 grams per liter; about 100 grams per liter to about 160 grams per liter; about 100 grams per liter to about 150 grams per liter; about 100 grams per liter to about 140 grams per liter; about 100 grams per liter to about 130 grams per liter; about 110 grams per liter to about 200 grams per liter; about 110 grams per liter to about 190 grams per liter; about 110 grams per liter to about 180 grams per liter; about 110 grams per liter to about 170 grams per liter; about 110 grams per liter to about 160 grams per liter; about 110 grams per liter to about 150 grams per liter; about 110 grams per liter to about 140 grams per liter; or about 110 grams per liter to about 130 grams per liter. In a still further aspect, the foam particles used in the disclosed methods can have a bulk density of about 80 grams per liter; about 85 grams per liter; about 90 grams per liter; about 95 grams per liter; about 100 grams per liter; about 105 grams per liter; about 110 grams per liter; about 115 grams per liter; about 120 grams per liter; about 125 grams per liter; about 130 grams per liter; about 135 grams per liter; about 140 grams per liter; about 145 grams per liter; about 150 grams per liter; about 155 grams per liter; about 160 grams per liter; about 165 grams per liter; about 170 grams per liter; about 175 grams per liter; about 180 grams per liter; about 185 grams per liter; about 190 grams per liter; about 195 grams per liter; about 200 grams per liter; or any range or any combination of the foregoing values.

In various aspects, each individual particle may be, for example, from about 2.5 milligrams to about 50 milligrams in weight.

In various aspects, the foamed particles can have a compact outer skin. As used herein, a "compact skin" means that the foam cells in the outer region of the foamed particles are smaller than those in the interior. In some aspects, the outer region of the foamed particles have no pores.
Additives.

In various aspects, a disclosed foam particle can independent further comprise an additive. The additive can be incorporated directly into the disclosed foam particles, or alternatively, applied thereto. Additives that can be used in the disclosed foam particles include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkylthiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3,5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5- di-tert-butyl-4-hydroxyanisole, 3,5-di-tert-butyl-4-hydroxyphenyl stearate, bis-(3,5-di-tert-butyl-4-hydroxyphenyl) adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2.2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl) propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate,di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethyl benzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1.3,5-triazine, 1,3,5-tris(3,5-dicyclohexyl-4-hydroxybenzyl)isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis (3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethylpiperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a ultraviolet radiation absorber and/or light stabilizer, including, but not limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-(ω)-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethyl piperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, 1,1-bis(1,2,2,6,6-pentamethyl-4-piperidyloxycarbonyl)-2-(4-methoxyphenyl) ethene, N,N'-bis-formyl-N,N'-bis(2.2,6,6-tetramethyl-4-piperidyl)hexamethylenediamine, poly[methylpropyl-3-oxy-4-(2,2,6,6-tetramethyl-4-piperidyl)]siloxane, 1-(2-hydroxy-2-methyl propoxy)-4-octadecanoyloxy-2,2,6,6-tetramethylpiperidine, 1-(2-hydroxy-2-methyl propoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethyl phenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris [2-hydroxy-4-(3-sec-butyloxy-2-hydroxypropyloxy)phenyq-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavyweight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

In some aspects, the additive is a cross-linking agent. There are a variety of cross-linking agents that can be used in the disclosed thermoplastic compositions. For example, a cross-linking agent can be a free-radical initiator. The free radical initiator can generate free radicals through thermo cleavage or ultraviolet radiation. The free-radical initiator can be present in an amount from about 0.001 weight percent to about 1.0 weight percent. A variety of radical initiators can be used as the radical sources to make thermoplastic compositions have a crosslinked structure. Suitable radical initiators applied include peroxides, sulfurs, and sulfides. Exemplary peroxides include, but are not limited to, aliphatic peroxides and aromatic peroxides, such as diacetylperoxide, di-tert-butypperoxide, dicumyl peroxide, dibenzoylperoxide, 2,5-dimethyl-2,5-di(benzoylperoxy) hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3, 3,5 tri-methylcyclohexane, and di(2,4-dichloro-benzoyl), or combinations of two or more of the foregoing. colorants can include without limitation dyes, pigments, and the like, and combinations thereof.

In some aspects, the additive is a colorant. The term "colorant," as used herein, means a compound providing color to a substrate, e.g., a disclosed thermoplastic composition. The colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 weight percent and about 5 weight percent relative to the weight of the composition. In a further aspect, the disclosed thermoplastic composition can comprise between about 0.01 weight percent and about 3 weight percent relative to the weight of the composition. In various aspects, the foam particles can comprise one or more colorants.

There are at least two types of metal complex dyes that can be used as colorants. Acid metal complex dyes are soluble in water and therefore dissolved in a water solvent system prior to use. Solvent metal complex dyes are insoluble in water and therefore dissolved in a water/organic solvent system prior to use.

The solvent system used for metal complex dyes should both dissolve the dyes and promote diffusion of dye molecules into the elastomeric substrates under mild conditions. Thus, it was discovered that certain organic solvents not only dissolve dyes that are insoluble in water such as solvent metal complex dyes, but also promote or facilitate dye diffusion into the polymer matrix of both acid metal complex dyes and solvent metal complex dyes.

Suitable organic solvents include ethylene glycol phenyl ether (EGPE) and isopropanol. Generally a relatively smaller amount of organic solvent is needed.

A suitable solvent system for acid metal complex dyes contains, for example, 90 to 100 volume percent water and 0 to 10 volume percent organic solvent. Typical amounts of organic solvents are 0.5 to 7 volume percent or 1 to 5 volume percent.

A suitable solvent system for solvent metal complex dyes contains, besides water and ethylene glycol phenyl ether, a third component, usually an organic solvent, to increase the solubility of dyes. For example, the solvent system may contain 40 to 80 volume percent water and 60 to 20 volume percent organic solvent. Suitable organic solvents include, but are not limited to, alcohols, ethers, esters and ketones. Suitable solvent metal complex dyes include Orasol Yellow 2RLN, Orasol Yellow 2GLN-M, Pylam Solvent Red, Pylam Brilliant Yellow, and Resofast Orange M2Y.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether.

In a two-phase solvent system, a solution is prepared containing a major amount of water and a minor amount of an organic solvent. The organic solvent is either partially miscible with water or nearly insoluble in water such that the water and organic solvent form a two phase system. The two-phase solvent composition allows fast and uniform dyeing, e.g., of foam particles.

The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets.

A two-phase solvent composition can contain 1 to 30 volume percent, for example, 1 to 25 volume percent, organic solvent, and 70 to 99 volume percent, for example, 75 to 99 volume percent, water. These two-phase solvent compositions are particularly suitable for solvent dyes that have high solubility in organic solvents. Generally, dyes suitable for use in this embodiment include those that are highly soluble in organic solvent, but nearly insoluble in water.

When suitable substrates are immersed in the two-phase solvent dye system, droplets of organic solvent and dye are preferentially adsorbed onto the surface of the substrate. This creates a thin layer of organic solvent with a high concentration of dye on the surface of the substrate. In addition, the organic solvent causes the substrate to swell providing an open polymeric structure. The combination of such open structure in the substrate and high concentration of dye facilitates fast diffusion of dye molecules into the substrate.

Thus, the two-phase solvent composition both dissolves dyes and promotes diffusion of dye molecules into flexible substrates under mild conditions. Compared with conventional dyeing systems, the two-phase solvent dye system provides fast dyeing, uses less organic solvent, uses mild dyeing conditions, and provides potential for effective dye recovery/removal from solvent.

In some aspects, a dye can be a metal complex dye such as, but not limited to, Bezanyl Black, Bezanyl Red, Bezanyl Yellow, Orasol Black, Orasol Blue GN, Orasol Red G, Orasol Yellow 2GLN, Isolan Blue, SP-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange, and Resofast Yellow.

In some aspects, the foam particles can be dyed with a nonionic or anionic ("acid") dye by one of: (1) before being infused with the supercritical fluid, (2) during being infused with the supercritical fluid by a nonionic or anionic dye dissolved or dispersed in the supercritical fluid, which optionally comprises a polar liquid, (3) during immersion in the heated fluid, where the heated fluid contains the dye, or (4) after being foamed.

In some aspects, the colorant can be an acid dyes, such as a water-soluble anionic dyes. Acid dyes are available in a wide variety, from dull tones to brilliant shades. Chemically, acid dyes include azo, anthraquinone and triarylmethane compounds.

The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes and nonionic disperse dyes are commercially available from many sources, including Dystar L.P., Charlotte, N.C. under the trademark TELON, Huntsman Corporation, Woodlands, Tex. under the trademarks ERIONYL and TECTILON, BASF SE, Ludwigshafen, Germany under the trademark BASACID, and Bezema AG, Montlingen, Switzerland under the trade name Bemacid.

Nonionic disperse dyes are also commercially available in many colors and include fluorescent dyes.

In some aspects, the foam particles can be dyed before being foamed. The acid or nonionic disperse dye solution in which the pellets or other articles are dyed may include, for example, from about 0.001 to about 5.0 grams per liter, preferably from about 0.01 to about 2 grams per liter of the acid or nonionic disperse dye compound or combination of acid or nonionic disperse dye compounds. The amount of acid or nonionic disperse dye compound use will determine how strong the color is and how quickly the pellets or other articles are dyed, and may be optimized in a straightforward manner; generally, a more concentrated dye solution can provide a stronger (deeper, darker, more intense) dyed color and can more quickly dye the pellets or other articles containing the thermoplastic elastomer.

The dye solution may include a water-soluble organic solvent. Water solubility of a particular organic solvent used in a particular amount in the dye solution is determined at 20 degrees Celsius and 1 atmosphere pressure at the concentration at which the alcohol is to be used in the dye solution; the organic solvent is water soluble if it fully dissolves or is fully miscible in water at 20 degrees Celsius and 1 atmosphere pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50 volume percent, or up to about 25 volume percent, or from about 1 percent to about 50 volume percent, or from about 5 percent to about 40 volume percent, or from about 10 percent to about 30 volume percent, or from about 15 percent to about 25 volume percent of the aqueous medium used to make the dye solution. Whether an organic solvent is used and how much organic solvent is used may be varied according to which dye is used and to the application method for contacting the dye solution with the pellets or other articles.

When the foam particles contain thermoplastic polyurethane elastomers or thermoplastic polyurea elastomers, the anionic dye solution also advantageously includes a quaternary (tetraalkyl) ammonium salt selected from soluble tetrabutylammonium compounds and tetrahexylammonium compounds. Such articles are advantageously dyed in an acid dye solution including an anionic dye compound, a quaternary ammonium salt selected from soluble tetrabutylammonium compounds and tetrahexylammonium compounds, and, optionally, a water-soluble organic solvent.

The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphite, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color for the dyed cover or coating layer. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution used to dye the foam particles when they contain thermoplastic polyurethane elastomers or thermoplastic polyurea elastomers may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the cover or coating layer and may be optimized in a straightforward manner. The process of dyeing the foam particles containing thermoplastic polyurethane elastomers or thermoplastic polyurea elastomers with this dye solution containing the soluble tetraalkylammonium compound can produce strong color intensity in the dyed foam particles.

The pellets may be dyed with a nonionic or anionic dye one of: (1) before being infused with the supercritical fluid. The pellets may also be dyed while being infused with the supercritical fluid by a nonionic or anionic dye dissolved or dispersed in the supercritical fluid, which optionally comprises a polar liquid. The pellets may also be dyed while being immersed in the heated fluid, where the heated fluid contains the dye. In particular, the heated fluid may be a heated aqueous dye solution, which may contain the quaternary ammonium salt and organic solvents as described. Finally, the foam particles can be dyed after being foamed using the dyeing process as already described.

Elastomeric Thermoplastic Polymers.

In various aspects, the foam particles of the present disclosure can be prepared from a suitable thermoplastic elastomer. For example, thermoplastic elastomer can be selected from a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, and any blend thereof.

In various aspects, the thermoplastic elastomer used to prepare the foam particles comprises a thermoplastic copolyetherester elastomer. It is understood that as used herein, "thermoplastic copolyetherester elastomer" can be used interchangeably with "thermoplastic polyether-polyester block copolymers," "thermoplastic polyester/polyether block copolymers," "copolyester elastomer," "poly-etherester block copolymer," "block poly-ether-ester," "polyester elastomer," "thermoplastic poly-ether-ester," "copoly(ether ester)," and "copolyester thermoplastic elastomer." In a further aspect, the thermoplastic copolyetherester elastomer comprises hard (or crystalline) polyester segments dispersed within soft (or amorphous) polyether segments. In a further aspect, the thermoplastic copolyetherester elastomer is a block copolymer. In a still further aspect, the thermoplastic copolyetherester elastomer is a segmented block copolymer. In some aspects, the thermoplastic copolyetherester elastomer is a block copolymer comprising segments or blocks of polyester and segments or blocks of polyether.

In various aspects, the thermoplastic copolyetherester elastomer used to prepare the foam particles comprise polyesters segments, produced by the reaction of dicarboxylic derivative (such as terephthalate) and diols (such as butanediol) and polyether segments (such as polyalkylene (ether) glycol or polyol).

In various aspects, the polyester segments comprise polybutylene terephthalate (PBT). In a further aspect, the polyester segments have a segment molecular of about 3000 Daltons to about 9000 Daltons. In a still further aspect, the polyester segments have a segment molecular of about 5000 Daltons to about 7000 Daltons.

In various aspects, the polyether segments comprise long-chain polyols. In a further aspect, polyethylene glycol (PEG), polypropylene glycol (PPG) or polypropylene ether glycol (PPEG), polytetramethylene glycol (PTMG or PTHF) polytetramethylene ether glycol, and combinations thereof. In a further aspect, the polyether segments have a segment molecular of about 200 Daltons to about 4000 Daltons. In a still further aspect, the polyether segments have a segment molecular of about 1000 Daltons to about 3000 Daltons.

In various aspects, the thermoplastic copolyetherester elastomer comprises a polytetramethylene ether terephthalate soft segment and a polybutylene terephthalate hard segment. Thermoplastic copolyetherester elastomers are commercially available, and non-limiting examples are available under the tradenames HYTREL (DuPont Company, Wilmington, Del.), ARNITEL (DSM Engineering Plastics, Evansville, Ind.), and PELPRENE (Toyobo Co., Ltd., Osaka, Japan).

In various aspects, the thermoplastic copolyetherester elastomer polymers comprise a polyether segment obtained by polymerization of tetrahydrofuran (i.e. poly(tetramethylene ether)) and a polyester segment obtained by polymerization of tetramethylene glycol and phthalic acid (i.e. 1,4-butylene terephthalate). The more polyether units incorporated into the copolyetherester, the softer the polymer. The poly(tetramethylene ether) glycol used to make the copolyetherester can have a molecular weight of from about 500 Daltons to about 3500 Daltons, or about 800 Daltons to about 2500 Daltons.

In various aspects, the thermoplastic copolyetherester elastomer polymers comprise repeat units derived from 30 to 70 weight percent of 1,4-butylene terephthalate and from 10 to 70 weight percent of poly(tetramethylene ether) terephthalate. In a further aspect, e thermoplastic copolyetherester elastomer polymers comprise repeat units derived from 55 to 60 weight percent of 1,4-butylene terephthalate, from 23 to 27 weight percent of 1,4-butylene isophthalate, from 10 to 15 weight percent of poly(tetramethylene ether) terephthalate, and from 3 to 7 weight percent of poly(tetramethylene ether) isophthalate. The poly(tetramethylene ether) glycol used to make the copolyetherester may have a molecular weight of from about 800 to about 1200.

In various aspects, the thermoplastic copolyetherester elastomer polymers comprise repeat units derived from 30 to 40 weight percent 1,4-butylene terephthalate, and from 60 to 70 weight percent poly(tetramethylene ether) terephthalate. The poly(tetramethylene ether) glycol used to make the copolyetherester preferably has a molecular weight of from 1500 to about 2500.

In various aspects, the thermoplastic copolyetherester elastomer is a block copolymer of short-chain diol terephthalate and long-chain polyether diol terephthalate, comprising about 60 weight percent of hard segments of polybutylene terephthalate and about 40 weight percent of soft segments of polytetramethylene ether terephthalate, has a Durometer hardness (ASTM D-2240) of Shore 55D, a melting point (ASTM D-2117) of 211° C.; a Vicat Softening Point (ASTM D1525) of 180° C. and flexural modulus (ASTM D790) of 207 megapascals (MPa). A suitable material with the foregoing characteristics is available under the tradename HYTRELO 5556 (DuPont Company, Wilmington, Del.).

In various aspects, the thermoplastic copolyetherester elastomer is a block copolymer of short-chain diol terephthalate and long-chain polyether diol terephthalate, comprising about 42 weight percent of hard segments of polybutylene terephthalate and about 58 weight percent of soft segments of polytetramethylene ether terephthalate, has a Durometer hardness of 92A/40D; a melting point of 168 degrees Celsius; a Vicat Softening Point of 112 degrees Celsius and flexural modulus of 48.3 megapascals. A suitable material with the foregoing characteristics is available under the tradename HYTREL 4056 (DuPont Company, Wilmington, Del.).

In various aspects, the thermoplastic copolyetherester elastomer is a block copolymer of short-chain diol terephthalate and long-chain polyether diol terephthalate, comprising about 80 weight percent of hard segments of polybutylene terephthalate and about 20 weight percent of soft segments of polytetramethylene ether terephthalate, has a Durometer hardness of about 72D; a melting point of 219 degrees Celsius; a Vicat Softening Point of 207 degrees Celsius and a flexural modulus of 585 megapascals. A suitable material with the foregoing characteristics is available under the tradename HYTRELO 7246 (DuPont Company, Wilmington, Del.).

In various aspects, the thermoplastic copolyetherester elastomer comprises long-chain ester units of formula I:

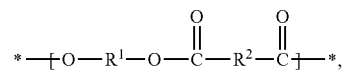

and short-chain ester units of formula II:

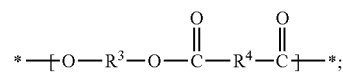

wherein $R^1$ comprises a divalent radical remaining after removal of terminal hydroxyl groups from poly(alkylene ether) having a carbon-to-oxygen ratio from about 2.0 to about 4.3 and a number average molecular weight from about 400 Daltons to about 6000 Daltons; wherein $R^2$ comprises a divalent radical remaining after removal of carboxyl groups from a dicarboxylic acid having a molecular weight less than about 300 Daltons; wherein $R^3$ comprises a divalent radical remaining after removal of hydroxyl groups from a low molecular weight diol having a molecular weight less than about 250 Daltons; wherein $R^4$ comprises a divalent radical remaining after removal of carboxyl groups from a dicarboxylic acid having a molecular weight less than about 300 Daltons; wherein the long-chain ester units represented by formula I comprise about 5 weight percent to about 95 weight percent of the thermoplastic copolyetherester elastomer; and wherein the short-chain ester units represented by formula II comprise about 95 weight percent to about 5 weight percent of the thermoplastic copolyetherester elastomer.

In a further aspect, $R^1$ comprises a divalent radical remaining after removal of terminal hydroxyl groups from poly(tetramethylene ether). In a still further aspect, $R^1$ has a number average molecular weight from about 500 Daltons to about 3500 Daltons; about 600 Daltons to about 3000 Daltons; about 800 Daltons to about 1200 Daltons; about 800 Daltons to about 2000 Daltons; about 800 Daltons to about 2500 Daltons; about 800 Daltons to about 3000 Daltons; about 800 Daltons to about 3500 Daltons; about 800 Daltons to about 4000 Daltons; about 1000 Daltons to about 3000 Daltons; or about 1500 Daltons to about 2500 Daltons.

In a further aspect, $R^2$ comprises a divalent radical remaining after removal of carboxyl groups from an aromatic dicarboxylic acid. In a still further aspect, $R^2$ comprises a divalent radical remaining after removal of carboxyl groups from 1,4-benzendicarboxylic acid.

In a further aspect, $R^3$ comprises a divalent radical remaining after removal of hydroxyl groups from a C2-C6 alkyl diol. In a still further aspect, $R^3$ comprises a divalent radical remaining after removal of hydroxyl groups from 1,4-butanediol.

In a further aspect, $R^4$ is a divalent radical remaining after removal of carboxyl groups from an aromatic dicarboxylic acid. In a still further aspect, $R^4$ is a divalent radical remaining after removal of carboxyl groups from 1,4-benzendicarboxylic acid.

In a further aspect, the long-chain ester units represented by formula I comprise about 10 weight percent to about 60 weight percent of the thermoplastic copolyetherester elastomer; about 20 weight percent to about 60 weight percent of the thermoplastic copolyetherester elastomer; about 30 weight percent to about 60 weight percent of the thermoplastic copolyetherester elastomer; about 10 weight percent to about 70 weight percent of the thermoplastic copolyetherester elastomer; about 20 weight percent to about 70 weight percent of the thermoplastic copolyetherester elastomer; about 30 weight percent to about 70 weight percent of the thermoplastic copolyetherester elastomer; about 10 weight percent to about 80 weight percent of the thermoplastic copolyetherester elastomer; about 20 weight percent to about 80 weight percent of the thermoplastic copolyetherester elastomer; or about 30 weight percent to about 80 weight percent of the thermoplastic copolyetherester elastomer.

In a further aspect, the short-chain ester units represented by formula II comprise about 20 weight percent to about 90 weight percent of the thermoplastic copolyetherester elastomer; about 40 weight percent to about 90 weight percent of the thermoplastic copolyetherester elastomer; about 20 weight percent to about 80 weight percent of the thermoplastic copolyetherester elastomer; about 40 weight percent to about 80 weight percent of the thermoplastic copolyetherester elastomer; about 20 weight percent to about 70 weight percent of the thermoplastic copolyetherester elastomer; about 40 weight percent to about 70 weight percent of the thermoplastic copolyetherester elastomer; about 40 weight percent to about 60 weight percent of the thermoplastic copolyetherester elastomer; or about 20 weight percent to about 60 weight percent of the thermoplastic copolyetherester elastomer.

In a further aspect, at least about 50 weight percent of the short-chain ester units represented by formula II are identical.

In a further aspect, the thermoplastic copolyetherester elastomer comprises polybutylene terephthalate blocks and poly(tetramethylene ether) terephthalate blocks, wherein the polybutylene terephthalate blocks comprise from about 95 weight percent to about 5 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly (tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 70 weight percent to about 20 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly (tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 80 weight percent to about 30 weight percent of the thermoplastic copolyetherester elastomer, wherein the poly(tetramethylene ether) terephthalate blocks comprise from about 5 weight percent to about 95 weight percent of the thermoplastic copolyetherester elastomer, and wherein the poly (tetramethylene ether) terephthalate blocks have a number average molecular weight from about 200 Daltons to about 6000 Daltons.

In a further aspect, the thermoplastic copolyetherester elastomer comprises polybutylene terephthalate blocks and poly(tetramethylene ether) terephthalate blocks, wherein the polybutylene terephthalate blocks comprise from about 70 weight percent to about 20 weight percent of the thermoplastic copolyetherester elastomer, wherein the poly(tetramethylene ether) terephthalate blocks comprise from about 30 weight percent to about 80 weight percent of the thermoplastic copolyetherester elastomer, and wherein the poly (tetramethylene ether) terephthalate blocks have a number average molecular weight from about 200 Daltons to about 6000 Daltons.

In a further aspect, the poly(tetramethylene ether) terephthalate blocks have a number average molecular weight from about 800 Daltons to about 1200 Daltons; about 1500 Daltons to about 2500 Daltons; or about 1000 Daltons to about 3000 Daltons.

In various aspects, the thermoplastic elastomer used to prepare the foam particles comprises a thermoplastic polyurethane elastomer. In a still further aspect, the thermoplastic polyurethane elastomer is selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof. In a yet further aspect, the thermoplastic polyurethane elastomer is a thermoplastic polyester-polyurethane elastomer. In a still further aspect, the thermoplastic polyurethane elastomer is a thermoplastic polyether-polyurethane elastomer. In a yet further aspect, the thermoplastic polyurethane elastomer is a thermoplastic polycarbonate-polyurethane elastomer.

Thermoplastic polyurethane from which the foam particles are prepared may have a melt index (also called a melt flow index or melt flow rate) of at least about 160 grams/10 minutes (at 190 degrees Celsius, 21.6 kilograms) as measured according to ASTM D1238. In various embodiments, the melt index may be from about 160 to about 250 grams/10 minutes (at 190 degrees Celsius, 21.6 kilograms) or from about 160 to about 220 grams/10 minutes (at 190 degrees Celsius, 21.6 kilograms), in each case as measured according to ASTM D1238.

Thermoplastic polyurethanes can be produced via reaction of (a) diisocyanates with difunctional compounds reactive toward isocyanates. In general, the difunctional compounds have two hydroxyl groups (diols) and may have a molar mass of from 62 Daltons (the molar mass of ethylene glycol) to about 10,000 Daltons, although difunctional compounds having other isocyanate-groups (e.g., secondary amine) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric. In certain aspects, such as when the molded article is an outsole for an article of footwear, the particles may advantageously be prepared using a rigid thermoplastic polyurethane or combination of thermoplastic polyurethanes. In various other aspects, such as when the molded article is a midsole for footwear, the particles may advantageously be prepared using an elastomeric thermoplastic polyurethane or a combination of elastomeric thermoplastic polyurethanes.

Suitable thermoplastic polyurethanes include thermoplastic polyester-polyurethanes, polyether-polyurethanes, and polycarbonate-polyurethanes. Non-limiting, suitable examples of these include, without limitation, polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from ethylene oxide, propylene oxide, or combinations of ethylene oxide and propylene oxide, and polycarbonate diols such as polyhexamethylene carbonate diol and poly(hexamethylene-co-pentamethylene)carbonate diols. The elastomeric thermoplastic polyurethane may be prepared by reaction of one of these polymeric diols (polyester diol, polyether diol, polylactone diol, polytetrahydrofuran diol, or polycarbonate diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., substantially all of the reactants are di-functional).

Non-limiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred aspect, the carboxylic acid includes adipic acid and the diol includes 1,4-butanediol. Typical catalysts for the esterification polymerization are protonic acids, Lewis acids, titanium alkoxides, and dialkyl tin oxides.

Hydroxy carboxylic acid compounds such as 12-hydroxy stearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. In one preferred aspect, the lactone is E-caprolactone. Useful catalysts include those mentioned above for polyester synthesis. Alternatively, the reaction can be initiated by forming a sodium salt of the hydroxyl group on the molecules that will react with the lactone ring.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonates may be prepared by polycondensation of aliphatic diols with dialkyl carbonates, (such as diethyl carbonate), cyclic glycol carbonates (such as cyclic carbonates having five- and six-member rings), or diphenyl carbonate, in the presence of catalysts like alkali metal, tin catalysts, or titanium compounds. or diphenyl carbonate. Another way to make aliphatic polycarbonates is by ring-opening polymerization of cyclic aliphatic carbonates catalyzed by organometallic catalysts. The polycarbonate diols can also be made by copolymerization of epoxides with carbon dioxide. Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols and polyether diols described above, that are used in making an elastomeric thermoplastic polyurethanes synthesis preferably have a number average molecular weight (determined for example by the ASTM D-4274 method) of from about 300 Daltons to about 8,000 Daltons, or from about 300 Daltons to about 5000 Daltons, or from about 300 Daltons to about 3000 Daltons.

The synthesis of a thermoplastic polyurethanes may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4'-biphenylene diisocyanate, 3,3'-dimethyl-4,4'-biphenylene diisocyanate, 1,3-diisocyanatobenzene, 1,4-diisocyanatobenzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. Alcohols and amines are preferred in some aspects. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether; 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenibis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described di-functional extenders, a small amount of tri-functional extenders such as trimethylolpropane, 1,2,6-hexanetriol and glycerol, and/or mono-functional active hydrogen compounds such as butanol or dimethyl amine, may also be present. The amount of tri-functional extenders and/or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethanes. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25 weight percent to about 65 weight percent of the elastomeric thermoplastic polyurethanes, and preferably from about 25 weight percent to about 50 weight percent of the elastomeric thermoplastic polyurethanes.

In various aspects, the thermoplastic polyurethane elastomer used to prepare the foam particles comprises a long-chain polyol. In a still further aspect, the long-chain polyol is selected from a polyether polyol, a polyester polyol, a polycarbonate polyol, a polyolefin polyol, a polyacryl polyol, and any copolymer thereof. In a yet further aspect, the long-chain polyol is a polyether polyol, a polyester polyol, and any copolymer thereof. In an aspect, the long-chain polyol is a polyether polyol. In an aspect, the long-chain polyol is a polyester polyol. In a further aspect, the long-chain polyol has a number-average molecular weight of not less than about 500 Daltons. In a still further aspect, the long-chain polyol has a number-average molecular weight of about 500 Daltons to about 10,000 Daltons; about 600 Daltons to about 6,000 Daltons; or about 800 Daltons to about 4,000 Daltons.

One non-limiting example of commercially available elastomeric thermoplastic polyurethanes having a melt flow index of from about 160 to about 220 grams/10 minutes (at 190 degrees Celsius, 21.6 kilograms) suitable for making thermoplastic polyurethanes foam particles is ELASTOLLAN SP9213 (melt flow index of 200 grams/10 minutes (at 190 degrees Celsius, 21.6 kilograms)), which is available from BASF Polyurethanes GmbH.

A thermoplastic polyurethane that is more rigid may be synthesized in the same way but with a lower content of the polymeric diol segments. A rigid thermoplastic polyurethane may, for example, include from about 0 to about 25 weight percent of the polyester, polyether, or polycarbonate diol segments. Synthesis of rigid polyurethanes is well-known in the art and described in many references. Rigid thermoplastic polyurethane having a melt index of at least about 160 grams/10 minutes (at 190 degrees Celsius, 21.6 kilograms) as measured according to ASTM D 1238 are commercially available and include those sold under the trademark Isoplast® ETPU by Lubrizol Corp., Wickliffe, Ohio.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene)diamines, and poly(tetramethylene ether)diamines. The amine- and hydroxyl-functional extenders already mentioned may be used as well. Generally, as before, trifunctional reactants are limited and may be used in conjunction with monofunctional reactants to prevent crosslinking.

In various aspects, the thermoplastic elastomer comprises a thermoplastic polyamide elastomer. In a further aspect, the thermoplastic polyamide elastomer comprises nylon 6, nylon 12, or combinations thereof.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180 degrees Celsius to about 300 degrees Celsius Specific examples of suitable polyamide blocks include NYLON 6, NYLON 66, NYLON 610, NYLON 11, NYLON 12, copolymerized NYLON, NYLON MXD6, and NYLON 46.

In various aspects, the thermoplastic elastomer comprises at least one thermoplastic polystyrene elastomer. In a further aspect, the thermoplastic polystyrene elastomer is a styrene block copolymer elastomer. In a further aspect, the thermoplastic styrene block copolymer elastomer is a styrene ethylene butylene styrene block copolymer. In a still further aspect, the styrene block copolymer elastomer is a poly(styrene-butadiene-styrene), a poly(styrene-ethylene-co-butylene-styrene), a poly(styrene-isoprene-styrene), any copolymer thereof, and any blend thereof.

In various aspects, the thermoplastic elastomer used to prepare the foam particles is characterized by a broad peak indicating a range of melting temperatures ($T_m$) when determined using differential scanning calorimetry. In a further aspect, the melting temperature is characterized by a melting range of about 15 degrees Celsius to about 200 degrees Celsius or about 50 degrees Celsius to about 90 degrees Celsius. In a still further aspect, the melting temperature is characterized by a melting range of about 30 degrees Celsius to about 150 degrees Celsius from initial onset to a melting temperature peak. In a yet further aspect, the melting temperature is characterized by a melting range of at least about 30 degrees Celsius or by a melting range of at least about 50 degrees Celsius.

Methods of Characterizing the Disclosed Articles.

Several methods of measuring resiliency and/or energy return of foams exist in the art. One method of measuring resiliency of foams is based on ASTM D 2632-92, which is a test for solid rubber materials. For use with foams, the test sample is prepared as described in ASTM D2632-92, but uses a sample of foam in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used. In some aspects, the resiliency and/or energy return are determined using force/displacement behavior determined using methods known to one skilled in the art.

In various aspects, force/displacement behavior for the disclosed articles can be measured using an Instron Electropuls E10000 (Instron, Norwood, Mass., USA) with a stainless steel 4 5 millimeters circular cross section impact geometry. The test foam slabs can be approximately 10 millimeters, although thinner or thicker foam slabs can also be used. Each sample can be evaluated by two different compression cycles: "running" and "walking". A "running" compression cycle consists of samples being compressed under displacement control from 0 Newtons to 300 Newtons and back to 0 Newtons in 180 milliseconds, followed by a pause of 400 milliseconds for a total of ~1.7 Hertz. The "walking" compression cycle consist of samples compressed from 0 Newtons to 144 Newtons and back to 0 Newtons in 600 milliseconds followed by a pause of 400 milliseconds for a total of ~1 Hertz.

Compression can be measured by preparing a sample of a standard thickness (e.g., 10 millimeters) of a foam. Samples having a thickness less than the standard can be stacked to make a sample having the standard thickness. The sample is loaded into a metal compression plate and compressed to a height of 50 percent of the original thickness (e.g., 5 millimeters). The sample is placed in a 50 degrees Celsius oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50 percent compressed thickness from the original sample thickness, (c) dividing (a) by (b), and (d) multiplying the result by 100 to obtain the percent compression set (where all thicknesses are measured in millimeters).

Energy input can be taken as the integral of the force-displacement curve during compression force loading. Hysteresis is taken as the ratio: (energy output)/(energy input), which can also be viewed as the energy efficiency of the foam. Fatigue behavior is judged by changes in the foam displacement at the max load of a cycle. All measured properties: stiffness, hysteresis, and fatigue are measured for multiple cycles for both running and walking compression cycles. Typical characterization using the compression sequence above can be run for 5000 cycles, which simulates approximately ~5-10 miles of walking/running and takes about 45 minutes of testing time on the Instron Electropuls E10000 instrument. Longer runs up to 100,000 compression cycles can be done to simulate accelerated materials response to ~100-200 miles of use.

The tensile strength can be measured on a die cut sample of the article in the shape of a dumbbell of a standard size such as a 2.5 centimeters in width by 11.5 centimeters in length, with a minimum thickness of 3 to 4 millimeters. The dumbbell follows the shape described in ASTM D412, die C. The sample is loaded symmetrically into and tested using a long travel extensometer such as the Instron 2603-080 which allows for a minimum of 1000 percent strain with a gauge length of 25 millimeters and a resolution of at least 0.1 millimeters. The tensile value at the failure point of the sample (the point during testing when the load value initially drops) is recorded.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Definitions

All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, in substance or substantially means at least 50 percent, 60 percent, 75 percent, 90 percent, 95 percent, or more, as determined based on weight or volume.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated plus or minus 10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a filler refers to an amount that is sufficient to achieve the desired improvement in the property modulated by the formulation component, e.g. achieving the desired level of modulus. The specific level in terms of weight percent in a composition required as an effective amount will depend upon a variety of factors including the amount and type of polycarbonate, amount and type of polycarbonate, amount and type of thermally conductive filler, and end use of the article made using the composition.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are based on atmosphereospheric pressure (i.e. one atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "percent by weight", "weight percent," "wt %," and "wt %," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100. Similarly, the terms "percent by volume", "volume percent," "vol %," and "vol. %," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

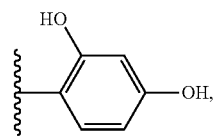 [SMILES: *c1ccc(O)cc1O]

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

As used herein, the terms "number average molecular weight" or "$M_n$" can be used interchangeably, and refer to the statistical average molecular weight of all the polymer chains in the sample and is defined by the formula:

$$M_n = \frac{\Sigma N_i M_i}{\Sigma N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

Aspects.

The following listing of exemplary aspects supports and is supported by the disclosure provided herein.

Aspect 1. A method of forming an article, the method comprising: arranging a plurality of foam particles formed of a first thermoplastic elastomer material; increasing a temperature of at least a portion of the plurality of foam particles with actinic radiation under conditions effective to melt or soften a portion of the first thermoplastic elastomer material of the of the plurality of foam particles; and decreasing the temperature of the melted or softened portion of the first thermoplastic elastomer material, thereby solidifying the melted or softened portion of the first thermoplastic elastomer material and forming a plurality of fused foam particles; wherein the plurality of foam particles has a number average particle size of about 0.04 millimeters to about 10 millimeters in a longest dimension; and wherein the increasing the temperature is carried out for at least one iteration.

Aspect 2. A method of making an article, the method comprising: arranging a plurality of foam particles such that the plurality of foam particles comprise a first foam particle having a first surface formed of a first thermoplastic elastomer material in contact with a second surface of an adjacent foam particle, the second surface of the adjacent foam particle being formed of a second thermoplastic elastomer material; increasing a temperature of at least a portion of the plurality of foam particles with actinic radiation under conditions effective to melt or soften a portion of the first thermoplastic elastomer material of the first surface of the first foam particle, or the second thermoplastic elastomer material of the second surface of the adjacent foam particle, or both; and decreasing the temperature of the melted or softened portion of the first thermoplastic elastomer material, of the second thermoplastic elastomer material, or of both, thereby solidifying the melted or softened portion of the first thermoplastic elastomer material, of the second thermoplastic elastomer material, or of both, and forming a plurality of fused foam particles; wherein the plurality of foam particles has a number average particle size of about 0.04 millimeters to about 10 millimeters in the longest dimension; and wherein the increasing the temperature is carried out for at least one iteration.

Aspect 3. The method according to Aspect 1, wherein the increasing the temperature of at least a portion of the plurality of foam particles with actinic radiation under conditions effective to melt or soften a portion of the first thermoplastic elastomer material of the of the plurality of foam particles further comprises intermingling melted first thermoplastic elastomer material from a first region within the portion of the plurality of foam particles with melted first thermoplastic elastomer material from a second region within the portion of the plurality of foam particles; and wherein the decreasing the temperature of the melted or softened portion of the first thermoplastic elastomer material comprises decreasing the temperature of intermingled melted thermoplastic elastomer material from the first region and the second region, thereby solidifying the intermingled thermoplastic elastomer material and forming the plurality of fused foam particles.

Aspect 4. The method of Aspect 2, wherein the first thermoplastic elastomer material and the second thermoplastic elastomer material comprise similar thermoplastic elastomers.

Aspect 5. The method of Aspect 4, wherein the similar thermoplastic elastomers are substantially similar thermoplastic elastomers.

Aspect 6. The method of Aspect 4, wherein the similar thermoplastic elastomers are essentially identical thermoplastic elastomers.

Aspect 7. The method of any one of Aspects 2 and 4-6, wherein the increasing the temperature of at least a portion of the plurality of foam particles with actinic radiation under conditions effective to melt or soften a portion of the first thermoplastic elastomer material of the first surface of the first foam particle or the second thermoplastic elastomer material of the second surface of the adjacent foam particle further comprises intermingling melted first thermoplastic elastomer material from the first surface of the first foam particle with melted second thermoplastic elastomer material from the second surface of the adjacent foam particle; and wherein the decreasing the temperature of the melted or softened portion of the first thermoplastic elastomer material or the melted or softened portion of the second thermoplastic elastomer comprises decreasing a temperature of the intermingled thermoplastic elastomer material, thereby solidifying the melted portion of the thermoplastic elastomer and forming the plurality of fused foam particles.

Aspect 8. The method according to any one of Aspects 1-7, wherein the arranging a plurality of foam particles comprises depositing a layer comprising the plurality of foam particles.

Aspect 9. The method according to Aspect 8, wherein the layer is essentially planar.

Aspect 10. The method according to any one of Aspects 8-9, wherein the article is formed from a single layer.

Aspect 11. The method according to any one of Aspects 1-7, wherein the increasing the temperature of at least a portion of the plurality of foam particulates comprises increasing the temperature of a target area of the plurality of foam particulates.

Aspect 12. The method according to Aspect 11, wherein the increasing the temperature of at least a portion of the plurality of foam articles with actinic radiation comprises increasing a temperature of at least a portion of the plurality of foam articles with a directed energy beam.

Aspect 13. The method according to Aspect 12, wherein the increasing the temperature of at least a portion of the plurality of foam articles with a directed energy beam comprises heating at least a portion of the plurality of foam articles with a directed energy beam.

Aspect 14. The method according to any one of Aspects 1-7, wherein the arranging and the increasing the temperature are repeated.

Aspect 15. The method according to Aspect 14, wherein an iteration of the arranging comprises depositing a layer comprising the plurality of foam particles.

Aspect 16. The method according to Aspect 15, wherein the article is formed layerwise from a plurality of layers.

Aspect 17. The method according to any one of Aspects 1-16, wherein the plurality of foam particles are irregularly shaped.

Aspect 18. The method according to Aspect 17, wherein the plurality of foam particles has an aspect ratio of about 0.1 to about 1.0.

Aspect 19. The method according to any one of Aspects 1-16, wherein the plurality of foam particles has a number average circularity value of about 0.60 to about 0.99.

Aspect 20. The method according to any one of Aspects 1-16, wherein the plurality of foam particles has a number average circularity value of about 0.89 to about 0.99.

Aspect 21. The method according to any one of Aspects 1-16, wherein the plurality of foam particles has a number average circularity value of about 0.92 to about 0.99.

Aspect 22. The method according to any one of Aspects 1-16, wherein the plurality of foam particles are ellipsoid shaped.

Aspect 23. The method according to any one of Aspects 1-16, wherein the plurality of foam particles are essentially spherical shaped.

Aspect 24. The method according to any one of Aspects 1-23, wherein the plurality of foam particles has a number average particle size of about 0.04 millimeters to about 5 millimeters in the longest dimension.

Aspect 25. The method according to Aspect 24, wherein the plurality of foam particles has a number average particle size of about 0.04 millimeters to about 4 millimeters in the longest dimension.

Aspect 26. The method according to Aspect 24, wherein the plurality of foam particles has a number average particle size of about 0.04 millimeters to about 3 millimeters in the longest dimension.

Aspect 27. The method according to Aspect 24, wherein the plurality of foam particles has a number average particle size of about 0.04 millimeters to about 2 millimeters in the longest dimension.

Aspect 28. The method according to Aspect 24, wherein the plurality of foam particles has a number average particle size of about 0.04 millimeters to about 1 millimeters in the longest dimension.

Aspect 29. The method according to any one of Aspects 1-23, wherein the plurality of foam particles has a number average particle size of about 0.1 millimeters to about 5 millimeters in the longest dimension.

Aspect 30. The method according to Aspect 29, wherein the plurality of foam particles has a number average particle size of about 0.1 millimeters to about 4 millimeters in the longest dimension.

Aspect 31. The method according to Aspect 29, wherein the plurality of foam particles has a number average particle size of about 0.1 millimeters to about 3 millimeters in the longest dimension.

Aspect 32. The method according to Aspect 29, wherein the plurality of foam particles has a number average particle size of about 0.1 millimeters to about 2 millimeters in the longest dimension.

Aspect 33. The method according to Aspect 29, wherein the plurality of foam particles has a number average particle size of about 0.1 millimeters to about 1 millimeters in the longest dimension.

Aspect 34. The method according to any one of Aspects 1-23, wherein the plurality of foam particles has a number average particle size of about 0.3 millimeters to about 7 millimeters in the longest dimension.

Aspect 35. The method according to any one of Aspects 1-23, wherein the plurality of foam particles has a number average particle size of about 0.5 millimeters to about 5 millimeters in the longest dimension.

Aspect 36. The method according to any one of Aspects 1-23, wherein the plurality of foam particles has a number average particle size of about 1 millimeters to about 5 millimeters in the longest dimension.

Aspect 37. The method according to any one of Aspects 1-23, wherein the plurality of foam particles has a number average particle size of about 1 millimeters to about 4 millimeters in the longest dimension.

Aspect 38. The method according to any one of Aspects 1-23, wherein the plurality of foam particles has a number average particle size of about 1 millimeters to about 3 millimeters in the longest dimension.

Aspect 39. The method according to any one of Aspects 1-23, wherein the plurality of foam particles has a number average particle size of about 1 millimeters to about 2 millimeters in the longest dimension.

Aspect 40. The method according to any one of Aspects 1-23, wherein the plurality of foam particles has a number average particle size of about 1.5 millimeters to about 5 millimeters in the longest dimension.

Aspect 41. The method according to any one of Aspects 1-23, wherein the plurality of foam particles has a number average particle size of about 1.5 millimeters to about 4 millimeters in the longest dimension.

Aspect 42. The method according to any one of Aspects 1-23, wherein the plurality of foam particles has a number average particle size of about 1.5 millimeters to about 3 millimeters in the longest dimension.

Aspect 43. The method according to any one of Aspects 1-23, wherein the plurality of foam particles has a number average particle size of about 1.5 millimeters to about 2.5 millimeters in the longest dimension.

Aspect 44. The method according to any one of Aspects 1-43, wherein the foam particle has a density of about 0.1 grams per cubic centimeter to about 0.8 grams per cubic centimeter.

Aspect 45. The method according to Aspect 44, wherein the foam particle has a density of about 0.30 grams per cubic centimeter to about 0.50 grams per cubic centimeter.

Aspect 46. The method according to Aspect 44, wherein the foam particle has a density of about 0.32 grams per cubic centimeter to about 0.48 grams per cubic centimeter.

Aspect 47. The method according to any one of Aspects 1-43, wherein the plurality of foam particles has a bulk density of about 80 grams per liter to about 200 grams per liter.

Aspect 48. The method according to Aspect 47, wherein the plurality of foam particles has a bulk density of about 100 grams per liter to about 150 grams per liter.

Aspect 49. The method according to Aspect 47, wherein the plurality of foam particles has a bulk density of about 110 grams per liter to about 140 grams per liter.

Aspect 50. The method according to any one of Aspects 1-49, wherein the first or second thermoplastic elastomer material comprises a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, or any blend thereof.

Aspect 51. The method according to Aspect 50, wherein the first or second thermoplastic elastomer material comprises a copolymer.

Aspect 52. The method according to Aspect 51, wherein the copolymer is a block copolymer, a random copolymer, or combinations thereof.

Aspect 53. The method according to Aspect 52, wherein the copolymer is a block copolymer.

Aspect 54. The method according to Aspect 53, wherein the block copolymer is a segmented block copolymer.

Aspect 55. The method according to any one of Aspects 50-54, wherein the first or second thermoplastic elastomer material comprises a thermoplastic polyamide elastomer.

Aspect 56. The method according to Aspect 55, wherein the thermoplastic polyamide elastomer comprises nylon 6, nylon 12, or combinations thereof.

Aspect 57. The method according to Aspect 50, wherein the first or second thermoplastic elastomer comprises a thermoplastic styrene block copolymer elastomer.

Aspect 58. The method according to Aspect 57, wherein the thermoplastic styrene block copolymer elastomer is a styrene ethylene butylene styrene block copolymer.

Aspect 59. The method according to any one of Aspects 50-54, wherein the first or second thermoplastic elastomer material comprises a thermoplastic copolyetherester elastomer.

Aspect 60. The method of according to Aspect 59, wherein the thermoplastic copolyetherester elastomer is a block copolymer.

Aspect 61. The method of according to any one of Aspects 59-60, wherein the block copolymer is a segmented block copolymer.

Aspect 62. The method of according to any one of Aspects 59-61, wherein the thermoplastic copolyetherester elastomer comprises long-chain ester units of formula I:

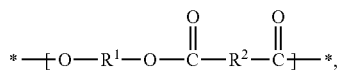

and short-chain ester units of formula II:

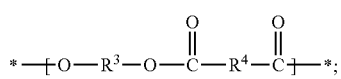

wherein $R^1$ comprises a divalent radical remaining after removal of terminal hydroxyl groups from poly(alkylene ether) having a carbon-to-oxygen ratio from about 2.0 to about 4.3 and a number average molecular weight from about 400 Daltons to about 6000 Daltons; wherein $R^2$ comprises a divalent radical remaining after removal of carboxyl groups from a dicarboxylic acid having a molecular weight less than about 300 Daltons; wherein $R^3$ comprises a divalent radical remaining after removal of hydroxyl groups from a low molecular weight diol having a molecular weight less than about 250 Daltons; wherein $R^4$ comprises a divalent radical remaining after removal of carboxyl groups from a dicarboxylic acid having a molecular weight less than about 300 Daltons; wherein the long-chain ester units represented by formula I comprise about 5 weight percent to about 95 weight percent of thermoplastic copolyetherester elastomer; and wherein the short-chain ester units represented by formula II comprise about 95 weight percent to about 5 weight percent of thermoplastic copolyetherester elastomer.

Aspect 63. The method according to Aspect 62, wherein $R^1$ comprises a divalent radical remaining after removal of terminal hydroxyl groups from poly(tetramethylene ether).

Aspect 64. The method according to any one of Aspects 62-63, wherein $R^1$ has a number average molecular weight from about 500 Daltons to about 3500 Daltons.

Aspect 65. The method according to any one of Aspects 62-63, wherein $R^1$ has a number average molecular weight from about 600 Daltons to about 3000 Daltons.

Aspect 66. The method according to any one of Aspects 62-63, wherein $R^1$ has a number average molecular weight from about 800 Daltons to about 1200 Daltons.

Aspect 67. The method according to any one of Aspects 62-63, wherein $R^1$ has a number average molecular weight from about 800 Daltons to about 2000 Daltons.

Aspect 68. The method according to any one of Aspects 62-63, wherein $R^1$ has a number average molecular weight from about 800 Daltons to about 2500 Daltons.

Aspect 69. The method according to any one of Aspects 62-63, wherein $R^1$ has a number average molecular weight from about 800 Daltons to about 3000 Daltons.

Aspect 70. The method according to any one of Aspects 62-63, wherein $R^1$ has a number average molecular weight from about 800 Daltons to about 3500 Daltons.

Aspect 71. The method according to any one of Aspects 62-63, wherein $R^1$ has a number average molecular weight from about 800 Daltons to about 4000 Daltons.

Aspect 72. The method according to any one of Aspects 62-63, wherein $R^1$ has a number average molecular weight from about 1000 Daltons to about 3000 Daltons.

Aspect 73. The method according to any one of Aspects 62-63, wherein $R^1$ has a number average molecular weight from about 1500 Daltons to about 2500 Daltons.

Aspect 74. The method according to any one of Aspects 62-73, wherein $R^2$ comprises a divalent radical remaining after removal of carboxyl groups from an aromatic dicarboxylic acid.

Aspect 75. The method according to Aspect 74, wherein the aromatic dicarboxylic acid is 1,4-benzendicarboxylic acid.

Aspect 76. The method according to any one of Aspects 62-74, wherein $R^3$ is comprises a divalent radical remaining after removal of hydroxyl groups from a C2-C6 alkyl diol.

Aspect 77. The method according to Aspect 76, wherein the C2-C6 alkyl diol is 1,4-butanediol.

Aspect 78. The method according to any one of Aspects 62-77, wherein $R^4$ is a divalent radical remaining after removal of carboxyl groups from an aromatic dicarboxylic acid.

Aspect 79. The method according to Aspect 78, wherein the aromatic dicarboxylic acid is 1,4-benzendicarboxylic acid.

Aspect 80. The method according to any one of Aspects 62-79, wherein the long-chain ester units represented by formula I comprise about 10 weight percent to about 60 weight percent of thermoplastic copolyetherester elastomer.

Aspect 81. The method according to any one of Aspects 62-79, wherein the long-chain ester units represented by formula I comprise about 20 weight percent to about 60 weight percent of thermoplastic copolyetherester elastomer.

Aspect 82. The method according to any one of Aspects 62-79, wherein the long-chain ester units represented by formula I comprise about 30 weight percent to about 60 weight percent of thermoplastic copolyetherester elastomer.

Aspect 83. The method according to any one of Aspects 62-79, wherein the long-chain ester units represented by formula I comprise about 10 weight percent to about 70 weight percent of thermoplastic copolyetherester elastomer.

Aspect 84. The method according to any one of Aspects 62-79, wherein the long-chain ester units represented by formula I comprise about 20 weight percent to about 70 weight percent of thermoplastic copolyetherester elastomer.

Aspect 85. The method according to any one of Aspects 62-79, wherein the long-chain ester units represented by formula I comprise about 30 weight percent to about 70 weight percent of thermoplastic copolyetherester elastomer.

Aspect 86. The method according to any one of Aspects 62-79, wherein the long-chain ester units represented by formula I comprise about 10 weight percent to about 80 weight percent of thermoplastic copolyetherester elastomer.

Aspect 87. The method according to any one of Aspects 62-79, wherein the long-chain ester units represented by formula I comprise about 20 weight percent to about 80 weight percent of thermoplastic copolyetherester elastomer.

Aspect 88. The method according to any one of Aspects 62-79, wherein the long-chain ester units represented by formula I comprise about 30 weight percent to about 80 weight percent of thermoplastic copolyetherester elastomer.

Aspect 89. The method according to any one of Aspects 62-88, wherein the short-chain ester units represented by formula II comprise about 20 weight percent to about 90 weight percent of thermoplastic copolyetherester elastomer.

Aspect 90. The method according to any one of Aspects 62-88, wherein the short-chain ester units represented by formula II comprise about 40 weight percent to about 90 weight percent of thermoplastic copolyetherester elastomer.

Aspect 91. The method according to any one of Aspects 62-88, wherein the short-chain ester units represented by formula II comprise about 20 weight percent to about 80 weight percent of thermoplastic copolyetherester elastomer.

Aspect 92. The method according to any one of Aspects 62-88, wherein the short-chain ester units represented by formula II comprise about 40 weight percent to about 80 weight percent of thermoplastic copolyetherester elastomer.

Aspect 93. The method according to any one of Aspects 62-88, wherein the short-chain ester units represented by formula II comprise about 20 weight percent to about 70 weight percent of thermoplastic copolyetherester elastomer.

Aspect 94. The method according to any one of Aspects 62-88, wherein the short-chain ester units represented by formula II comprise about 40 weight percent to about 70 weight percent of thermoplastic copolyetherester elastomer.

Aspect 95. The method according to any one of Aspects 62-88, wherein the short-chain ester units represented by formula II comprise about 40 weight percent to about 60 weight percent of thermoplastic copolyetherester elastomer.

Aspect 96. The method according to any one of Aspects 62-88, wherein the short-chain ester units represented by formula II comprise about 20 weight percent to about 60 weight percent of thermoplastic copolyetherester elastomer.

Aspect 97. The method according to any one of Aspects 62-96, wherein at least about 50 weight percent of the short-chain ester units represented by formula II are identical.

Aspect 98. The method of according to any one of Aspects 59-61, wherein the thermoplastic copolyetherester elastomer comprises polybutylene terephthalate blocks, poly(tetramethylene ether) terephthalate blocks, or combinations thereof.

Aspect 99. The method of according to Aspect 98, wherein the thermoplastic copolyetherester elastomer comprises polybutylene terephthalate blocks and poly(tetramethylene ether) terephthalate blocks, wherein the polybutylene terephthalate blocks comprise from about 95 weight percent to about 5 weight percent of thermoplastic copolyetherester elastomer, wherein the poly(tetramethylene ether) terephthalate blocks comprise from about 5 weight percent to about 95 weight percent of thermoplastic copolyetherester elastomer, and wherein the poly(tetramethylene ether) terephthalate blocks have a number average molecular weight from about 200 Daltons to about 6000 Daltons.

Aspect 100. The method according to Aspect 99, wherein the polybutylene terephthalate blocks comprise from about 20 weight percent to about 70 weight percent of thermoplastic copolyetherester elastomer.

Aspect 101. The method of according to any one of Aspects 99-100, wherein the poly(tetramethylene ether) terephthalate blocks comprise from about 30 weight percent to about 80 weight percent of thermoplastic copolyetherester elastomer.

Aspect 102. The method according to Aspect 99, wherein the polybutylene terephthalate blocks comprise from about 70 weight percent to about 20 weight percent of thermoplastic copolyetherester elastomer, wherein the poly(tetramethylene ether) terephthalate blocks comprise from about 30 weight percent to about 80 weight percent of thermoplastic copolyetherester elastomer.

Aspect 103. The method of according to any one of Aspects 99-102, wherein the poly(tetramethylene ether) terephthalate blocks have a number average molecular weight from about 800 Daltons to about 1200 Daltons.

Aspect 104. The method of according to any one of Aspects 99-102, wherein the poly(tetramethylene ether) terephthalate blocks have a number average molecular weight from about 1500 Daltons to about 2500 Daltons.

Aspect 105. The method of according to any one of Aspects 99-102, wherein the poly(tetramethylene ether) terephthalate blocks have a number average molecular weight from about 1000 Daltons to about 3000 Daltons.

Aspect 106. The method according to any one of Aspects 50-54, wherein the first or second thermoplastic elastomer material comprises a thermoplastic polyurethane elastomer.

Aspect 107. The method according to Aspect 106, wherein the thermoplastic polyurethane elastomer is selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof.

Aspect 108. The method according to Aspect 107, wherein the thermoplastic polyurethane elastomer is a thermoplastic polyester-polyurethane elastomer.

Aspect 109. The method according to Aspect 107, wherein the thermoplastic polyurethane elastomer is a thermoplastic polyether-polyurethane elastomer Aspect 110. The method according to Aspect 107, wherein the thermoplastic polyurethane elastomer is a thermoplastic polycarbonate-polyurethane elastomer.

Aspect 111. The method according to Aspect 107, wherein the thermoplastic polyurethane elastomer comprises a long-chain polyol.

Aspect 112. The method according to Aspect 111, wherein the long-chain polyol is selected from a polyether polyol, a polyester polyol, a polycarbonate polyol, a polyolefin polyol, a polyacryl polyol, and any copolymer thereof.

Aspect 113. The method according to Aspect 111, wherein the long-chain polyol is a polyether polyol, a polyester polyol, and any copolymer thereof.

Aspect 114. The method according to Aspect 111, wherein the long-chain polyol is a polyether polyol.

Aspect 115. The method according to Aspect 111, wherein the long-chain polyol is a polyester polyol.

Aspect 116. The method according to any one of Aspects 111-115, wherein the long-chain polyol has a number-average molecular weight of not less than about 500 Daltons.

Aspect 117. The method according to any one of Aspects 111-115, wherein the long-chain polyol has a number-average molecular weight of about 500 Daltons to about 10,000 Daltons.

Aspect 118. The method according to any one of Aspects 111-115, wherein the long-chain polyol has a number-average molecular weight of about 600 Daltons to about 6,000 Daltons.

Aspect 119. The method according to any one of Aspects 111-115, wherein the long-chain polyol has a number-average molecular weight of about 800 Daltons to about 4,000 Daltons.

Aspect 120. The method according to any one of Aspects 50-54, wherein the first or second thermoplastic elastomer comprises at least one thermoplastic polystyrene elastomer.

Aspect 121. The method according to Aspect 120, wherein the at least one thermoplastic styrene elastomer is a styrene block copolymer elastomer.

Aspect 122. The method according to Aspect 121, where the styrene block copolymer elastomer is a poly(styrene-butadiene-styrene), a poly(styrene-ethylene-co-butylene-styrene), a poly(styrene-isoprene-styrene), any copolymer thereof, and any blend thereof.

Aspect 123. The method according to any one of Aspects 1-122, wherein the first or second thermoplastic elastomer material is characterized by a range of at least 10 degrees Celsius over which the first thermoplastic elastomer material or the second thermoplastic elastomer material exhibits softening and melting behavior as determined using differential scanning calorimetry.

Aspect 124. The method according to Aspect 123, wherein the range over which the first or second thermoplastic elastomer material exhibits softening and melting behavior is at least 35 degrees Celsius.

Aspect 125. The method according to Aspect 124, wherein the range over which the first or second thermoplastic elastomer material exhibits softening and melting behavior is at least 50 degrees Celsius.

Aspect 126. The method according to Aspect 123, wherein a melting temperature of the first or second thermoplastic elastomer ranges from about 15 degrees Celsius to about 200 degrees Celsius.

Aspect 127. The method according to Aspect 126, wherein the melting temperature ranges from about 30 degrees Celsius to about 150 degrees Celsius.

Aspect 128. The method according to Aspect 127, wherein the melting temperature ranges from about 50 degrees Celsius to about 90 degrees Celsius.

Aspect 129. The method according to Aspect 124, wherein a melting temperature of the first or second thermoplastic elastomer is at least about 30 degrees Celsius.

Aspect 130. The method according to Aspect 129, wherein the melting temperature is characterized by a melting range of at least about 50 degrees Celsius.

Aspect 131. The method according to any one of Aspects 1-122, wherein the first and second thermoplastic elastomer materials are characterized by a melting temperature range of at least 10 degrees Celsius over which both the first thermoplastic elastomer material and the second thermoplastic elastomer material exhibit softening and melting behavior as determined using differential scanning calorimetry.

Aspect 132. The method according to Aspect 131, wherein the range over which the first and second thermoplastic elastomer materials exhibits softening and melting behavior is at least 35 degrees Celsius.

Aspect 133. The method according to Aspect 132, wherein the range over which the first and second thermoplastic elastomer materials exhibits softening and melting behavior is at least 50 degrees Celsius.

Aspect 134. The method according to Aspect 131, wherein a melting temperature of first and second thermoplastic elastomer materials ranges from about 15 degrees Celsius to about 200 degrees Celsius.

Aspect 135. The method according to Aspect 134, wherein the melting temperature ranges from about 30 degrees Celsius to about 150 degrees Celsius.

Aspect 136. The method according to Aspect 135, wherein the melting temperature ranges from about 50 degrees Celsius to about 90 degrees Celsius.

Aspect 137. The method according to Aspect 131, wherein a melting temperature of the first and second thermoplastic elastomer materials is at least about 30 degrees Celsius.

Aspect 138. The method according to Aspect 137, wherein a melting temperature of the first and second thermoplastic elastomer materials is at least about 50 degrees Celsius.

Aspect 139. The method according to any one of Aspects 1-138, wherein the arranging the plurality of foam particles comprises arranging using a roller mechanism, a wiper mechanism, or a blower mechanism.

Aspect 140. The method according to Aspect 139, wherein the arranging the plurality of foam particles comprises arranging using a roller mechanism.

Aspect 141. The method according to Aspect 140, wherein the roller mechanism has a smooth roller surface.

Aspect 142. The method according to Aspect 140, wherein the roller mechanism has a textured roller surface.

Aspect 143. The method according to Aspect 139, wherein the arranging the plurality of foam particles comprises arranging using a wiper mechanism.

Aspect 144. The method according to any one of Aspects 1-143, wherein the arranging the plurality of foam particles is arranging a layer of a plurality of foam particles.

Aspect 145. The method according to any one of Aspects 1-144, wherein the directed energy beam is a laser beam.

Aspect 146. The method according to Aspect 145, wherein the laser beam is emitted by a gas dynamic laser, a diode laser, or a lead salt laser.

Aspect 147. The method according to Aspect 145 or 146, wherein the laser beam is emitted by a carbon dioxide laser.

Aspect 148. The method according to Aspect 145 or 146, wherein the laser beam comprises a two or more laser beams, wherein each laser beam is directed at the target area.

Aspect 149. The method according to any one of Aspects 145-148, wherein the laser beam emits a beam within the infrared spectrum.

Aspect 150. The method according to Aspect 149, wherein the laser beam emits a beam within the far infrared spectrum.

Aspect 151. The method according to Aspect 149, wherein the laser beam emits a beam within the near infrared spectrum.

Aspect 152. The method according to Aspect 149, wherein the laser beam emits a beam within the mid infrared spectrum.

Aspect 153. The method according to any one of Aspects 145-148, wherein the laser beam emits a beam with a wavelength of about 700 nanometers to about 1 millimeter.

Aspect 154. The method according to any one of Aspects 145-148, wherein the laser beam emits a beam with a wavelength of about 1 micrometers to about 20 micrometer.

Aspect 155. The method according to any one of Aspects 145-148, wherein the laser beam emits a beam with a wavelength of about 3 micrometers to about 15 micrometer.

Aspect 156. The method according to any one of Aspects 145-148, wherein the laser beam emits a beam with a wavelength of about 3 micrometers to about 8 micrometer.

Aspect 157. The method according to any one of Aspects 145-148, wherein the laser beam emits a beam with a wavelength of about 8 micrometers to about 15 micrometer.

Aspect 158. The method according to any one of Aspects 145-148, wherein the laser beam emits a beam with a wavelength of about 9 micrometers to about 11 micrometer.

Aspect 159. The method according to any one of Aspects 145-158, wherein the laser beam has a beam width of about 0.1 millimeters to about 0.7 millimeter.

Aspect 160. The method according to any one of Aspects 145-158, wherein the laser beam has a beam width of about 0.2 millimeters to about 0.6 millimeter.

Aspect 161. The method according to any one of Aspects 145-158, wherein the laser beam has a beam width of about 0.3 millimeters to about 0.5 millimeter.

Aspect 162. The method according to any one of Aspects 145-158, wherein the laser beam has a beam width of about 0.3 millimeters to about 0.4 millimeter.

Aspect 163. The method according to any one of Aspects 145-162, wherein the laser beam has a scan pattern such that each pass of the laser beam overlaps the adjacent pass of the laser beam by a fractional amount of about 0.1 to 0.5.

Aspect 164. The method according to Aspect 163, wherein the laser beam has a scan pattern such that each pass of the laser beam overlaps the adjacent pass of the laser beam by a fractional amount of about 0.3.

Aspect 165. The method according to any one of Aspects 145-164, wherein the laser beam is de-focused.

Aspect 166. The method according to according to any one of Aspects 1-165, wherein the directed energy beam has a scan pattern such that the directed energy beam is directed in an x-y plane; and wherein the directed energy beam is configured to varying an amount of energy for an amount of time directed to each point in the x-y plane.

Aspect 167. The method according to according to any one of Aspects 1-166, wherein the directed energy beam has a power output of about 25 to about 75 watts.

Aspect 168. The method according to according Aspect 167, wherein the directed energy beam has a power output of about 35 to about 55 watts.

Aspect 169. The method according to according Aspect 167, wherein the directed energy beam has a power output of about 45 to about 65 watts.

Aspect 170. The method according to according Aspect 167, wherein the directed energy beam has a power output of about 50 to about 60 watts.

Aspect 171. The method according to according Aspect 167, wherein the directed energy beam has a power output of about 55 watts.

Aspect 172. The method according to according to any one of Aspects 1-171, wherein the processing conditions comprise directing energy at a scanning rate across a target area of about 7,500 millimeters per second to about 25,000 millimeters per second.

Aspect 173. The method according to according Aspect 172, wherein the processing conditions comprise directing energy at a scanning rate across a target area of about 10,000 millimeters per second to about 15,000 millimeters per second.

Aspect 174. The method according to according Aspect 172, wherein the processing conditions comprise directing energy at a scanning rate across a target area of about 12,500 millimeters per second.

Aspect 175. The method according to according Aspect 172, wherein the heating a target area of the plurality of foam particles is carried out for 1 iterations to 500 iterations.

Aspect 176. The method according to according Aspect 175, wherein the heating a target area of the plurality of foam particles is carried out for 1 iterations to 10 iterations.

Aspect 177. The method according to according Aspect 175, wherein the heating a target area of the plurality of foam particles is carried out for 1 iterations to 8 iterations.

Aspect 178. The method according to according Aspect 175, wherein the heating a target area of the plurality of foam particles is carried out for 1 iterations to 7 iterations.

Aspect 179. The method according to according Aspect 175, wherein the heating a target area of the plurality of foam particles is carried out for 2 iterations to 10 iterations.

Aspect 180. The method according to according Aspect 175, wherein the heating a target area of the plurality of foam particles is carried out for 2 iterations to 8 iterations.

Aspect 181. The method according to according Aspect 175, wherein the heating a target area of the plurality of foam particles is carried out for 2 iterations to 7 iterations.

Aspect 182. The method according to according Aspect 175, wherein the heating a target area of the plurality of foam particles is carried out for at least 2 iterations.

Aspect 183. The method according to according Aspect 175, wherein the heating a target area of the plurality of foam particles is carried out for 1 iteration, 2 iterations, 3 iterations, 4 iterations, 5 iterations, 6 iterations, or 7 iterations.

Aspect 184. The method according to according to any one of Aspects 1-183, wherein the heating of a target area fuses a first foam particle to a second foam particle in the target area, wherein the first foam particle is melted to a depth of about 10 micrometers about 500 micrometers measured from the surface of the first foam particle, and wherein the second foam particle is melted to a depth of about 10 micrometers about 500 micrometers measured from the surface of the second foam particle.

Aspect 185. The method according to according to any one of Aspects 1-183, wherein the heating of a target area fuses a first foam particle to a second foam particle in the target area, wherein the first foam particle is melted to a depth of about 25 micrometers about 200 micrometers measured from the surface of the first foam particle, and wherein the second foam particle is melted to a depth of about 25 micrometers about 200 micrometers measured from the surface of the second foam particle.

Aspect 186. The method according to according to any one of Aspects 1-185, further comprising providing an additive to a layer.

Aspect 187. The method according to Aspect 186, wherein the additive is provided during forming the layer of a plurality of foam particles.

Aspect 188. The method according to Aspect 186, wherein the additive is provided after forming the layer of a plurality of foam particles and before directing the energy beam.

Aspect 189. The method according to Aspect 186, wherein the additive is provided at the same or about the same time as directing the energy beam.

Aspect 190. The method according to Aspect 186, wherein the additive is provided after directing the energy beam.

Aspect 191. The method according to any one of Aspects 186-190, wherein the additive is a polyurea or polyurethane coating.

Aspect 192. The method according to Aspect 191, wherein the polyurea or polyurethane coating is sprayed onto the plurality of foam particles.

Aspect 193. The method according to any one of Aspects 186-190, wherein the additive comprises a binder, an adhesive, a lubricant, an anti-oxidant, a colorant, a filler, a laser sensitizing agent, and any combination thereof.

Aspect 194. The method of Aspect 193, wherein the additive is an adhesive.

Aspect 195. The method of Aspect 194, wherein the adhesive comprises a photocurable elastomeric resin, a heat activated resin, and combinations thereof.

Aspect 196. The method according to any one of Aspects 186-190, wherein the additive comprises a laser sensitizing agent.

Aspect 197. The method according to Aspect 196, wherein the laser sensitizing agent is an infrared absorber.

Aspect 198. The method according to Aspect 197, wherein the Infrared absorber is an infrared dye or infrared pigment.

Aspect 199. The method according to Aspect 198, wherein the infrared pigment is carbon black.

Aspect 200. The method according to any one of Aspects 1-196, wherein the fused plurality of foam particles has a density of about 0.100 grams per cubic centimeter to about 0.700 grams per cubic centimeter after directing the energy beam at the target area.

Aspect 201. The method according to any one of Aspects 1-196, wherein the fused plurality of foam particles has a density of about 0.300 grams per cubic centimeter to about 0.500 grams per cubic centimeter after directing the energy beam at the target area.

Aspect 202. The method according to any one of Aspects 1-200, further comprising heating a plurality of target areas on the plurality of particles.

Aspect 203. The method according to Aspect 202, wherein the article has a border region defined by a subset of the plurality of target areas.

Aspect 204. The method according to any one of Aspects 202-203, wherein a first cross-sectional region of the article comprises a subset of the plurality of target areas, and wherein the first cross-section region is heated.

Aspect 205. The method according to any one of Aspects 202-203, wherein a first cross-sectional region of the article comprises a subset of the plurality of target areas, and wherein the first cross-section region is not heated.

Aspect 206. The method according to any one of Aspects 202-205, wherein the heating of the plurality of target areas is carried out by directing the directed energy beam to each target area using a vector scan method.

Aspect 207. The method according to any one of Aspects 202-205, wherein the heating of the plurality of target areas is carried out by directing the directed energy beam to each target area using a raster scan method.

Aspect 208. The method according to any one of Aspects 202-207, wherein the plurality of target areas comprise a first plurality of target areas and a second plurality of target areas.

Aspect 209. The method according to any one of Aspects 1-208, further comprising arranging a selective laser sintering powder on a surface of the article, wherein the selective laser sintering powder comprises a third thermoplastic elastomer material; and heating a target area of the laser sintering powder with a directed energy beam under conditions effective to fuse the laser sintering powder, wherein the heating the target area of the laser sintering powder is carried out for at least one iteration.

Aspect 210. The method of Aspect 209, wherein the selective laser sintering powder has a particle size of about 0.020 millimeters to about 0.100 millimeter.

Aspect 211. The method according Aspect 209 or 210, wherein the arranging the selective laser sintering powder on a surface of the article and the heating the target area of the laser sintering powder are repeated.

Aspect 212. The method according to Aspect 211, wherein an iteration of the arranging comprises depositing a layer comprising the selective laser sintering powder.

Aspect 213. The method of any one of Aspects 209-212, wherein the heating is at a temperature sufficient and a time sufficient to fuse the selective laser sintering powder.

Aspect 214. The method of any one of Aspects 209-212, wherein the heating is at a temperature sufficient and a time sufficient to melt the selective laser sintering powder, thereby forming a melted selective laser sintering powder; and wherein a portion of the melted selective laser sintering powder is flowable.

Aspect 215. The method of any one of Aspects 209-214, wherein the arranging the selective laser sintering powder is depositing the selective laser sintering powder on the surface of the article.

Aspect 216. The method of any one of Aspects 209-214, wherein the arranging the selective laser sintering powder is spraying a suspension of the selective laser sintering powder in a solvent on the surface of the article.

Aspect 217. The method of Aspect 216, wherein the solvent is water.

Aspect 218. The method of Aspect 216, wherein the solvent is an organic solvent.

Aspect 219. The method of any one of Aspects 209-218, wherein the third thermoplastic elastomer material comprises a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, or any blend thereof.

Aspect 220. The method according to Aspect 219, wherein the third thermoplastic elastomer material is a copolymer.

Aspect 221. The method according to Aspect 220, wherein the copolymer is a block copolymer, a random copolymer, or combinations thereof.

Aspect 222. The method according to Aspect 221, wherein the copolymer is a block copolymer.

Aspect 223. The method according to Aspect 222, wherein the block copolymer is a segmented block copolymer.

Aspect 224. The method according to Aspect 219, wherein the third thermoplastic elastomer material comprises a thermoplastic polyamide elastomer.

Aspect 225. The method according to Aspect 224, wherein the thermoplastic polyamide elastomer comprises nylon 6, nylon 12, or combinations thereof.

Aspect 226. The method according to Aspect 219, wherein the third thermoplastic elastomer material comprises a thermoplastic styrene block copolymer elastomer.

Aspect 227. The method according to Aspect 226, wherein the thermoplastic styrene block copolymer elastomer is a styrene ethylene butylene styrene block copolymer.

Aspect 228. The method according to Aspect 219, wherein the third thermoplastic elastomer material comprises a thermoplastic copolyetherester elastomer.

Aspect 229. The method of according to Aspect 228, wherein the thermoplastic copolyetherester elastomer is a block copolymer.

Aspect 230. The method of according to Aspect 219, wherein the thermoplastic copolyetherester elastomer comprises polybutylene terephthalate blocks, poly(tetramethylene ether) terephthalate blocks, or combinations thereof.

Aspect 231. The method according to Aspect 219, wherein the third thermoplastic elastomer material comprises a thermoplastic polyurethane elastomer.

Aspect 232. The method according to Aspect 231, wherein the thermoplastic polyurethane elastomer is selected from a thermoplastic polyester-polyurethane elastomer, a thermoplastic polyether-polyurethane elastomer, a thermoplastic polycarbonate-polyurethane elastomer, a thermoplastic polyolefin-polyurethane elastomer, any copolymer thereof, and any blend thereof.

Aspect 233. The method according to Aspect 232, wherein the thermoplastic polyurethane elastomer is a thermoplastic polyester-polyurethane elastomer.

Aspect 234. The method according to Aspect 232, wherein the thermoplastic polyurethane elastomer is a thermoplastic polyether-polyurethane elastomer Aspect 235. The method according to Aspect 232, wherein the thermoplastic polyurethane elastomer is a thermoplastic polycarbonate-polyurethane elastomer.

Aspect 236. The method according to Aspect 232, wherein the thermoplastic polyurethane elastomer comprises a long-chain polyol.

Aspect 237. The method according to Aspect 236, wherein the long-chain polyol is selected from a polyether polyol, a polyester polyol, a polycarbonate polyol, a polyolefin polyol, a polyacryl polyol, and any copolymer thereof.

Aspect 238. The method according to Aspect 236, wherein the long-chain polyol is a polyether polyol, a polyester polyol, and any copolymer thereof.

Aspect 239. The method according to Aspect 236, wherein the long-chain polyol is a polyether polyol.

Aspect 240. The method according to Aspect 236, wherein the long-chain polyol is a polyester polyol.

Aspect 241. The method according to Aspect 219, wherein the third thermoplastic elastomer material comprises at least one thermoplastic polystyrene elastomer.

Aspect 242. The method according to Aspect 241, wherein thermoplastic styrene elastomer is a styrene block copolymer elastomer.

Aspect 243. The method according to Aspect 242, where the styrene block copolymer elastomer is a poly(styrene-butadiene-styrene), a poly(styrene-ethylene-co-butylene-styrene), a poly(styrene-isoprene-styrene), any copolymer thereof, and any blend thereof.

Aspect 244. The method according to any one of Aspects 1-243, wherein the article formed is a component used in manufacture of an article of footwear, apparel or sporting equipment.

Aspect 245. The method according to Aspect 244, wherein the component used in manufacture of an article of footwear, apparel or sporting equipment is a pre-form.

Aspect 246. The method according to Aspect 245, further comprising compression molding the pre-form.

Aspect 247. The method according to Aspect 244, wherein the component used in manufacture of an article of footwear, apparel or sporting equipment is a cushioning element or an impact absorbing element.

Aspect 248. The method according to Aspect 247, wherein the component used in manufacture of an article of footwear, apparel or sporting equipment is a cushioning element for an article of footwear.

Aspect 249. The method according to Aspect 248, wherein the cushioning element for an article of footwear is a midsole, an outsole, a combination midsole-outsole unit, a sock-liner, an ankle collar, or a heal-cushioning pad.

Aspect 250. An article made by a method according to any one of Aspects 1-249.

Aspect 251. The article according to Aspect 250, wherein the article is a component used in manufacture of an article of footwear, apparel or sporting equipment.

Aspect 252. The article according to Aspect 251, wherein the component used in manufacture of an article of footwear, apparel or sporting equipment is a cushioning element or an impact absorbing element.

Aspect 253. The article according to Aspect 252, wherein the component used in manufacture of an article of footwear, apparel or sporting equipment is a cushioning element for an article of footwear.

Aspect 254. The article according to Aspect 253, wherein the cushioning element for an article of footwear is a midsole, an outsole, a combination midsole-outsole unit, a sock-liner, an ankle collar, or a heal-cushioning pad.

Aspect 255. The article according to Aspect 251, wherein the component used in manufacture of an article of footwear, apparel or sporting equipment is a pre-form.

Aspect 256. The article according to Aspect 250, wherein the article is a padding component used in manufacture of a sports helmet, a backpack, apparel, sports uniform padding, or combat gear.

Aspect 257. The article according to Aspect 250, wherein the article is a component used in manufacture of an article of tactical equipment.

Aspect 258. The article according to Aspect 257, wherein the article of tactical equipment is a pack, pack frame, gear bag, chest rig, rifle sling, belt, holster, vest, or jacket Aspect 259. The article according to Aspect 257 or Aspect 258, wherein the component used in manufacture of an article of tactical equipment is a padding component.

Aspect 260. The article according to Aspect 250, wherein the article is a component used in manufacture of an article of work safety equipment.

Aspect 261. The article of Aspect 260, wherein the article of work safety equipment is a safety suit, work helmet, work boot, or work glove.

Aspect 262. The article of Aspect 260 or Aspect 261, wherein the component used in manufacture of an article of work safety equipment is a padding component.

Aspect 263. The article according to any one of Aspects 250-262, wherein the article is characterized by a plurality of sub-regions comprising a first sub-region characterized by a first property and a second sub-region characterized by a second property, wherein the first property is not equal to the second property, and wherein the first property and the second property are flexural modulus, stiffness, bulk density, or resilience.

Aspect 264. The article according to Aspect 263, wherein the first property is at least 10 percent greater than the second property.

Aspect 265. The article according to Aspect 263, wherein the article is characterized by a plurality of cross-sectional sub-regions comprising a first sub-region characterized by a first flexural modulus and a second sub-region characterized by a second flexural modulus, wherein the first flexural modulus is not equal to the second flexural modulus.

Aspect 266. The article according to Aspect 263, wherein the article is characterized by a plurality of cross-sectional sub-regions comprising a first sub-region characterized by a first bulk density and a second sub-region characterized by a second bulk density, wherein the first bulk density is not equal to the second bulk density.

Aspect 267. The article according to Aspect 263, wherein the article is characterized by a plurality of cross-sectional sub-regions comprising a first sub-region characterized by a first stiffness and a second sub-region characterized by a second stiffness, wherein the first stiffness is not equal to the second stiffness.

Aspect 268. The article according to Aspect 263, wherein the article is characterized by a plurality of cross-sectional sub-regions comprising a first sub-region characterized by a first resilience and a second sub-region characterized by a second resilience, wherein the first resilience is not equal to the second resilience.

Aspect 269. An article comprising: a structure formed of a plurality of fused foam particles, wherein each individual foam particle of the plurality of fused foam particles is formed of a first thermoplastic elastomer material, and includes one or more fused regions affixing the individual foam particle to one or more adjacent foam particles, the one or more adjacent foam particles comprise the first thermoplastic elastomer material, the fused regions include a portion of the first thermoplastic elastomer material from the individual foam particle intermingled with a portion of the first thermoplastic elastomer material from at least one of the one or more adjacent foam particles, the structure formed of the plurality of fused foam particles includes a plurality of gaps between particles, with the gaps occupying at least 10 percent of a total volume of the structure; wherein, prior to fusing, at least 20 percent of the plurality of foam particles are ellipsoid in shape and have a number average particle size of about 0.04 millimeters to about 10 millimeters in a longest dimension, and at least 20 percent of the ellipsoid foam particles in the structure retain a substantially ellipsoid shape.

Aspect 270. An article comprising: a structure formed of a plurality of fused foam particles, wherein each individual foam particle of the plurality of fused foam particles includes a first surface formed of a first thermoplastic elastomer material, and the first surface also includes one or more fused regions affixing the individual foam particle to a second surface of one or more adjacent foam particles, the second surface of the one or more adjacent foam particles comprises a second thermoplastic elastomer material, the fused regions include a portion of the first thermoplastic elastomer material from the first surface of the individual foam particle intermingled with a portion of the second thermoplastic elastomer material from the second surface of the one or more adjacent foam particles, the structure formed of the plurality of fused foam particles includes a plurality of gaps between particles, with the gaps occupying at least 10 percent of a total volume of the structure; wherein, prior to fusing, at least 20 percent of the plurality of foam particles are ellipsoid in shape and have a number average particle size of about 0.04 millimeters to about 10 millimeters in a longest dimension, and at least 20 percent of the ellipsoid foam particles in the structure retain a substantially ellipsoid shape.

Aspect 271. The article of Aspect 269 or 270, wherein the first thermoplastic elastomer material comprises a thermoplastic elastomer of any one of Aspects 50-138.

Aspect 272. The article of Aspect 270, wherein the second thermoplastic elastomer material comprises a thermoplastic elastomer of any one of Aspects 50-138.

Aspect 273. The article of any one of Aspects 269-272, wherein the foam particles are foam particles according to any one of Aspects 17-49.

Aspect 274. The article of any one of Aspects 269-273, wherein the article is a component used in manufacture of an article of footwear, apparel or sporting equipment.

Aspect 275. The article according to Aspect 274, wherein the component used in manufacture of an article of footwear, apparel or sporting equipment is a cushioning element or an impact absorbing element.

Aspect 276. The article according to Aspect 275, wherein the component used in manufacture of an article of footwear, apparel or sporting equipment is a cushioning element is a cushioning element for an article of footwear.

Aspect 277. The article according to Aspect 276, wherein the cushioning element for an article of footwear is a midsole, an outsole, a combination midsole-outsole unit, a sock-liner, an ankle collar, or a heal-cushioning pad.

Aspect 278. The article according to Aspect 274, wherein the component used in manufacture of an article of footwear, apparel or sporting equipment is a pre-form.

Aspect 279. The article according to any one of Aspects 269-273, wherein the article is a padding component used in manufacture of a sports helmet, a backpack, apparel, sports uniform padding, or combat gear.

Aspect 280. The article of any one of Aspects 269-273, wherein the article is a component used in manufacture of an article of tactical equipment.

Aspect 281. The article according to Aspect 280, wherein the article of tactical equipment is a pack, pack frame, gear bag, chest rig, rifle sling, belt, holster, vest, or jacket Aspect 282. The article according to Aspect 280 or Aspect 281, wherein the component used in manufacture of an article of tactical equipment is a padding component.

Aspect 283. The article of any one of Aspects 269-273, wherein the article is a component used in manufacture of an article of work safety equipment.

Aspect 284. The article of Aspect 283, wherein the article of work safety equipment is a safety suit, work helmet, work boot, or work glove.

Aspect 285. The article of Aspect 283 or Aspect 284, wherein the component used in manufacture of an article of work safety equipment is a padding component.

Aspect 286. The article according to any one of Aspects 269-285, wherein the article is characterized by a plurality of sub-regions comprising a first sub-region characterized by a first property and a second sub-region characterized by a second property, wherein the first property is not equal to the second property, and wherein the first property and the second property are flexural modulus, stiffness, bulk density, or resilience.

Aspect 287. The article according to Aspect 286, wherein the first property is at least 10 percent greater than the second property.

Aspect 288. The article according to Aspect 286, wherein the article is characterized by a plurality of cross-sectional sub-regions comprising a first sub-region characterized by a first flexural modulus and a second sub-region characterized by a second flexural modulus, wherein the first flexural modulus is not equal to the second flexural modulus.

Aspect 289. The article according to Aspect 286, wherein the article is characterized by a plurality of cross-sectional sub-regions comprising a first sub-region characterized by a first bulk density and a second sub-region characterized by a second bulk density, wherein the first bulk density is not equal to the second bulk density.

Aspect 290. The article according to Aspect 286, wherein the article is characterized by a plurality of cross-sectional sub-regions comprising a first sub-region characterized by a first stiffness and a second sub-region characterized by a second stiffness, wherein the first stiffness is not equal to the second stiffness.

Aspect 291. The article according to Aspect 286, wherein the article is characterized by a plurality of cross-sectional sub-regions comprising a first sub-region characterized by a first resilience and a second sub-region characterized by a second resilience, wherein the first resilience is not equal to the second resilience.

Aspect 292. A method of forming an article, the method comprising: arranging a plurality of resin particles formed of a first thermoplastic elastomer material; increasing a temperature of at least a portion of the plurality of resin particles with actinic radiation under conditions effective to melt or soften a portion of the first thermoplastic elastomer material of the of the plurality of resin particles; and decreasing the temperature of the melted or softened portion of the first thermoplastic elastomer material, thereby solidifying the melted or softened portion of the first thermoplastic elastomer material and forming a plurality of fused resin particles; wherein the plurality of resin particles has a number average particle size of about 0.04 millimeter to about 10 millimeters in a longest dimension; and wherein the increasing the temperature is carried out for at least one iteration.

Aspect 293. The method according to Aspect 292, wherein the method further comprises arranging a plurality of foam particles, and the solidifying the melted or softened portion of the first thermoplastic elastomer material also is effective in affixing a portion of the plurality of foam particles to the plurality of fused resin particles.

Aspect 294. The method according to Aspect 293, wherein the foam particles are foam particles as described in any one of Aspects 1 to 291.

Aspect 295. The method according to any one of Aspects 292-294, wherein the method further comprises a step as recited in any one of Aspects 1 to 291.

Aspect 296. The method according to any one of Aspects 292-295, wherein the thermoplastic elastomer of the resin particles is a thermoplastic elastomer according to any one of Aspects 1 to 291.

Aspect 297. The method according to any one of Aspects 293-296, wherein the thermoplastic elastomer of the resin particles and the thermoplastic elastomer of the foam particles are the same.

Aspect 298. The method according to any one of Aspect 292-297, wherein physical dimensions or chemical compositions or both of the resin particles are the same as physical dimensions or chemical compositions or both as described for foam particles according to any preceding Aspect, except that, prior to fusing, the resin particles are substantially free of foamed material.

Aspect 299. An article made by the method of any one of Aspects 292-297.

Aspect 300. The article of Aspect 299, wherein the article is an article as described in any one of Aspects 1 to 291.

Aspect 301. An article comprising: a structure formed of a plurality of fused resin particles, wherein each individual resin particle of the plurality of fused foam particles is formed of a first thermoplastic elastomer material, and includes one or more fused regions affixing the individual resin particle to one or more adjacent resin particles, the one or more adjacent resin particles comprise the first thermoplastic elastomer material, the fused regions include a portion of the first thermoplastic elastomer material from the individual resin particle intermingled with a portion of the first thermoplastic elastomer material from at least one of the one or more adjacent resin particles, the structure formed of the plurality of fused resin particles includes a plurality of gaps between particles, with the gaps occupying at least 10 percent of a total volume of the structure; wherein, prior to fusing, at least 20 percent of the plurality of resin particles are spheroid or ellipsoid in shape and have a number average particle size of about 0.04 millimeters to about 10 millimeters in a longest dimension, and at least 20 percent of the spheroid or ellipsoid resin particles in the structure retain a substantially spheroid or ellipsoid shape.

Aspect 302. An article comprising: a structure formed of a plurality of fused resin particles, wherein each individual resin particle of the plurality of fused foam particles includes a first surface formed of a first thermoplastic elastomer material, and the first surface also includes one or more fused regions affixing the individual resin particle to a second surface of one or more adjacent resin particles, the second surface of the one or more adjacent resin particles comprises a second thermoplastic elastomer material, the fused regions include a portion of the first thermoplastic elastomer material from the first surface of the individual resin particle intermingled with a portion of the second thermoplastic elastomer material from the second surface of the one or more adjacent resin particles, the structure formed of the plurality of fused resin particles or the plurality of fused foam particles or both includes a plurality of gaps between particles, with the gaps occupying at least 10 percent of a total volume of the structure; wherein, prior to fusing, at least 20 percent of the plurality of resin particles are spheroid or ellipsoid in shape and have a number average particle size of about 0.04 millimeters to about 10 millimeters in a longest dimension, and at least 20 percent of the spheroid or ellipsoid resin particles in the structure retain a substantially spheroid or ellipsoid shape.

Aspect 303. An article comprising: a structure formed of a plurality of fused resin particles, wherein each individual resin particle of the plurality of fused foam particles is formed of a first thermoplastic elastomer material, and includes one or more fused regions affixing the individual resin particle to one or more adjacent resin particles or one or more adjacent foam particles or both, the one or more adjacent resin particles comprise the first thermoplastic elastomer material, the fused regions include a portion of the first thermoplastic elastomer material from the individual resin particle intermingled with a portion of the first thermoplastic elastomer material from at least one of the one or more adjacent resin particles or at least one of the one or more adjacent foam particles, the structure formed of the plurality of fused resin particles or fused foam particles includes a plurality of gaps between particles, with the gaps occupying at least 10 percent of a total volume of the structure; wherein, prior to fusing, at least 20 percent of the plurality of resin particles are spheroid or ellipsoid in shape and have a number average particle size of about 0.04 millimeters to about 10 millimeters in a longest dimension, and at least 20 percent of the spheroid or ellipsoid resin particles in the structure retain a substantially spheroid or ellipsoid shape.

Aspect 304. An article comprising: a structure formed of a plurality of fused resin particles, wherein each individual resin particle of the plurality of fused foam particles includes a first surface formed of a first thermoplastic elastomer material, and the first surface also includes one or more fused regions affixing the individual resin particle to a second surface of one or more adjacent resin particles or one or more adjacent foam particles or both, the second surface of the one or more adjacent resin particles or one or more adjacent foam particles comprises a second thermoplastic elastomer material, the fused regions include a portion of the first thermoplastic elastomer material from the first surface of the individual resin particle intermingled with a portion of the second thermoplastic elastomer material from the second surface of the one or more adjacent resin particles or one or more adjacent foam particles or both, the structure formed of the plurality of fused resin particles or the plurality of fused foam particles or both includes a plurality of gaps between particles, with the gaps occupying at least 10 percent of a total volume of the structure; wherein, prior to fusing, at least 20 percent of the plurality of resin particles are spheroid or ellipsoid in shape and have a number average particle size of about 0.04 millimeters to about 10 millimeters in a longest dimension, and at least 20 percent of the spheroid or ellipsoid resin particles in the structure retain a substantially spheroid or ellipsoid shape.

Aspect 305. The article according to any one of Aspects 301-304, wherein the article is an article as described in any one of Aspects 271 to 291.

Aspect 306. A method of manufacturing an article, comprising: affixing a first component and a second component to each other, wherein the first component includes an article comprising of a plurality of affixed resin particles or foam particles or both according to any one of Aspects 250-291 or 301 to 304.

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Preparation and Characterization of Foam Particles.

Foam particles were prepared using a thermoplastic block copolyester comprising crystalline (or hard) segments comprising polybutylene terephthalate and amorphous (or soft) segments comprising polyether (referred to herein as "thermoplastic COPE foam particles"). The foam particles were prepared with nominal diameters of either 1 millimeters or 2 millimeters. Foam particles were also prepared using a thermoplastic polyolefin block copolymer (referred to herein as "TPO foam particles"). Briefly, the foam particles were prepared using physical blowing agent (e.g., a supercritical fluid such as supercritical carbon dioxide or supercritical nitrogen) in an extrusion process comprising a MUCELL process (Trexel, Inc., Wilmington, Mass.) used in combination with an underwater pelletizer with a die plate having appropriately sized circular openings (1 millimeters or 2 millimeters, as required) and cutting blades set to provide particles of the desired size.

Figure 11:
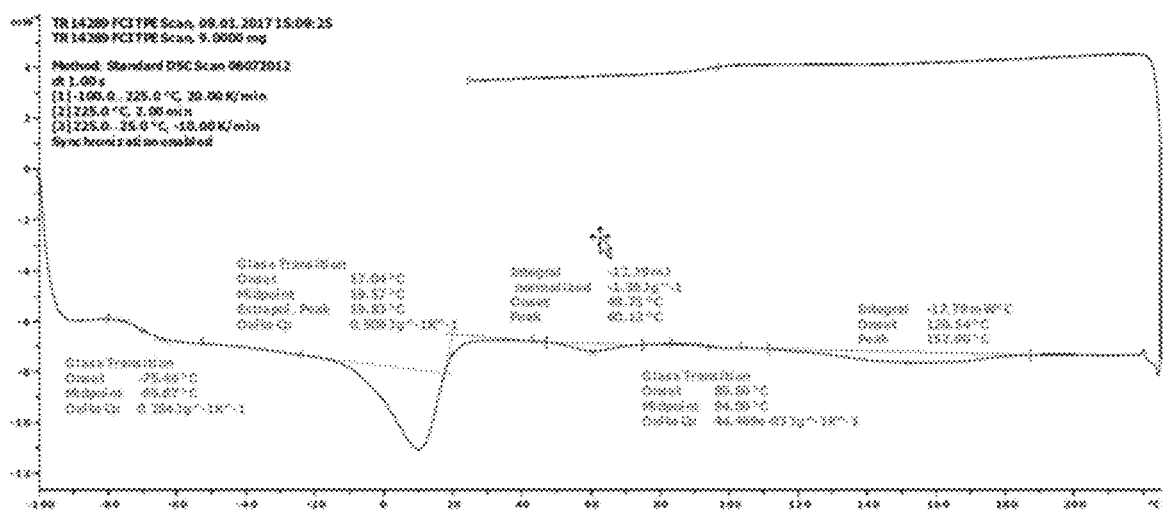
FIG. 11 shows representative differential scanning calorimetry data for representative disclosed thermoplastic elastomer foam particles.

Differential scanning calorimetry ("DSC") was carried out on a representative sample (9 mg) of thermoplastic COPE foam particles and the scan data are shown in FIG. 11. The data show that thermoplastic COPE foam particles are characterized by three glass transition temperatures and a broad melting profile. Melting onset began at about 120.54 degrees Celsius, with a peak at 152.0 degrees Celsius, and an overall melting range from about 120 degrees Celsius to about 180 degrees Celsius In a separate study, a representative sample (4.89 mg) of TPO foam particles was characterized using DSC. These particles were characterized by a sharp melting peak at 122.73 degrees Celsius, with a melting range from about 105 degrees Celsius to about 130 degrees Celsius. There were no apparent glass transition temperature transitions observed for the TPO foam particles.

Figure 12:
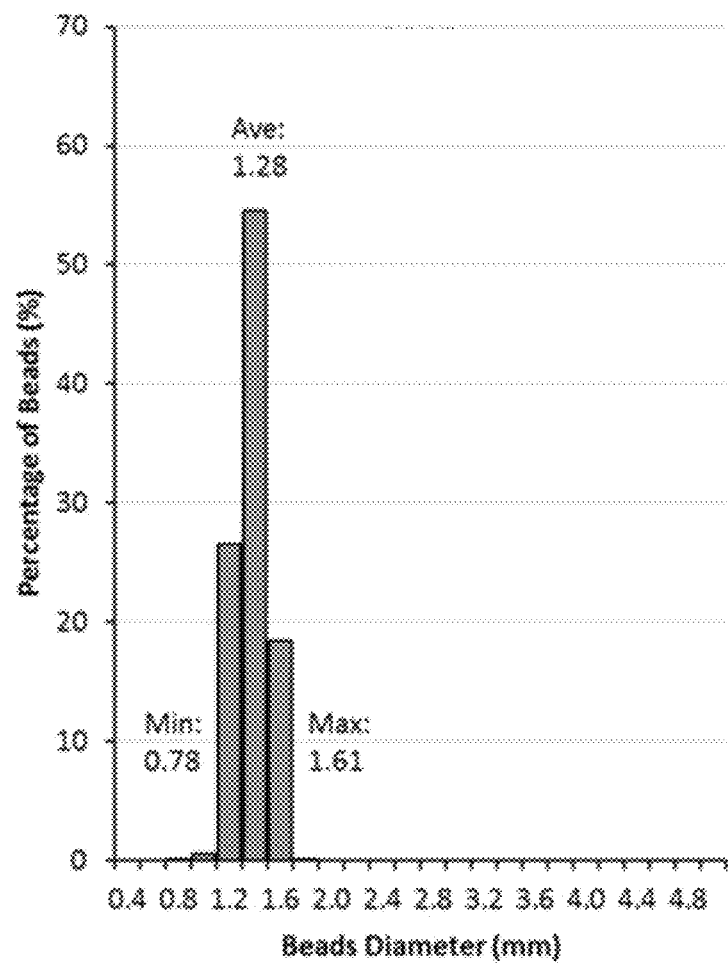
FIG. 12 shows representative particle size distribution data for representative disclosed thermoplastic elastomer foam particles (sample size=2,000 foam particles), for which roundness or circularity distribution data are shown in FIG. 12.
Figure 13:
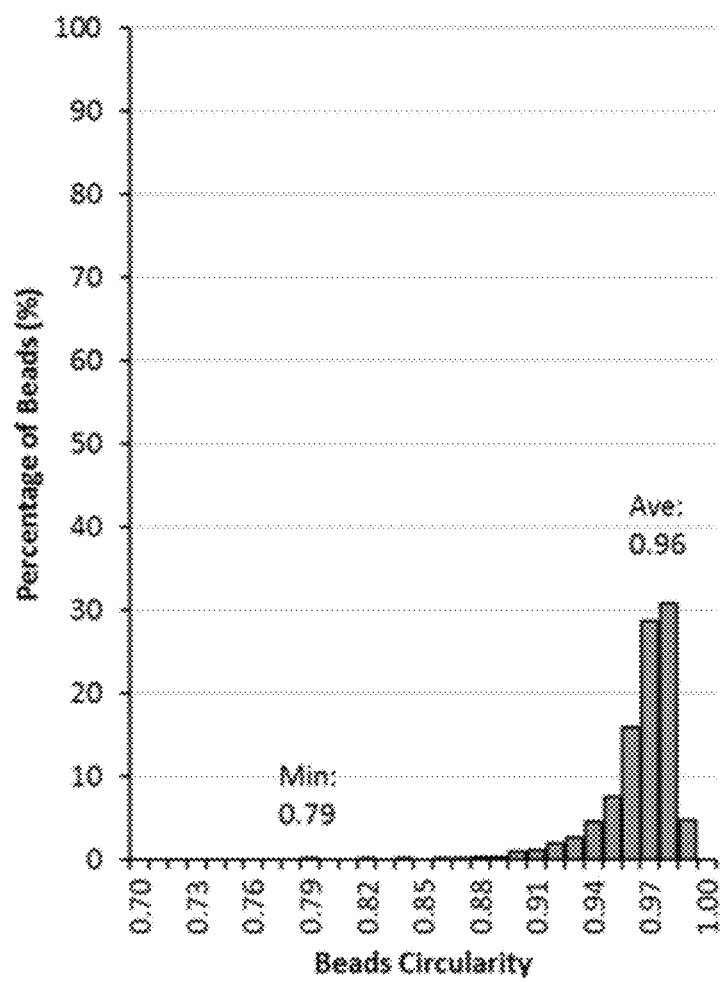
FIG. 13 shows representative roundness or circularity distribution data for the representative disclosed thermoplastic elastomer foam particles (sample size=2,000 foam particles), for which particle size distribution data are shown in FIG. 12.
Figure 18:
FIG. 18 shows an image of a section of the representative midsole shown in FIG. 17 at higher magnification.
Figure 19:
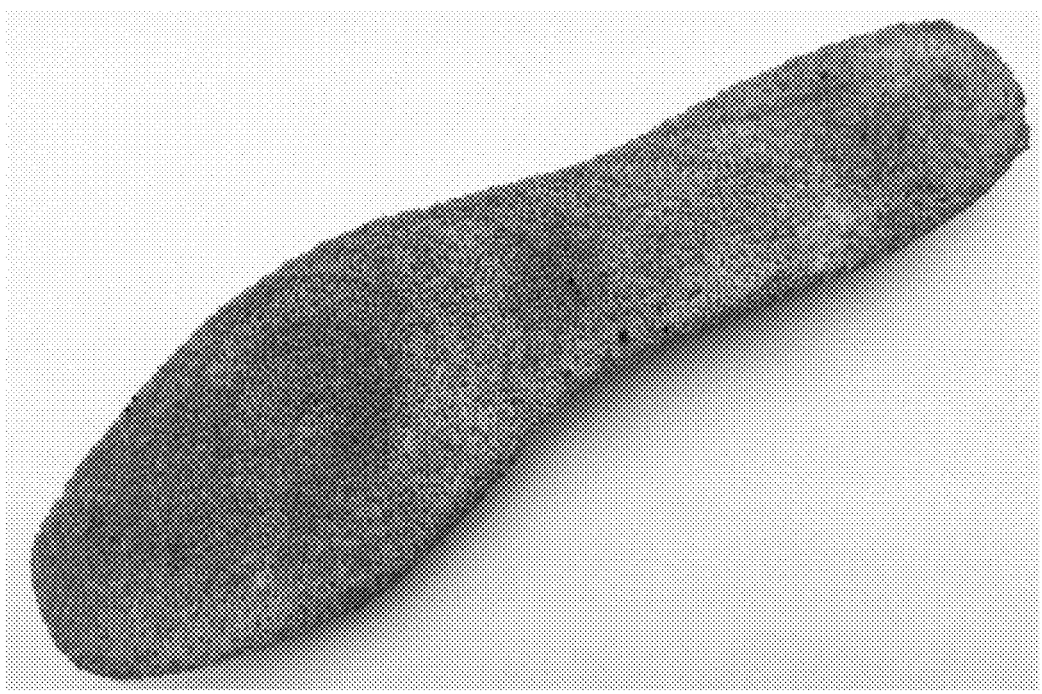
FIG. 19 shows an image of a representative midsole prepared using the disclosed methods. The representative midsole was dyed following fusing of the foam particles by dipping the midsole into an aqueous dye solution comprising one or more of acid dyes and/or reactive dyes in isopropyl alcohol heated to 60 degrees Celsius.

Analysis of particle size distribution and circularity was carried out on samples of thermoplastic COPE foam particles and TPO foam particles. The analysis was carried out using a Microtrac Particle Analyzer 3D machine to count at least 2,000 particles for each sample analysis. Data are shown in FIG. 12 (particle size distribution) and 13 (circularity distribution) for thermoplastic COPE foam particle sample analyzed. The data obtained for both types of sample analyzed are shown below in Table I.

TABLE I

| Sample | Diameter (millimeter) | | | | Circularity | | | |
|---|---|---|---|---|---|---|---|---|
| | Min | Max | Ave | 3σ | Min | Max | Ave | 3σ |
| TPO | 2.23 | 5.74 | 3.15 | 0.63 | 0.73 | 0.99 | 0.98 | 0.02 |
| COPE | 0.78 | 1.61 | 1.28 | 0.36 | 0.79 | 0.99 | 0.96 | 0.06 |

Bulk density of a representative batch of thermoplastic COPE foam particles (1 millimeters nominal diameter) was determined using standard methods to be about 130 grams per liter.

Exemplary Data of Articles Prepared Using Foam Particles.

Articles were prepared using the above-described foam particles using a selective laser sintering instrument (Sinterstation Vanguard manufactured by Integra, LLC, Round Rock, Tex.) to heat and fuse (i.e., sinter) the foam particles. The instrument was modified to allow the roller to accommodate foam particles of 1-2 millimeters diameter in forming a layer. The instrument was set for 2 seconds for post-addition of foam particles or control powder, 7 seconds for the pre-addition of foam particles or control powder, and 10 seconds for the minimum layer time. The heating and laser sintering of foam particles was carried out under an inert atmosphere with radiant heating of the chamber provided by overhead heat lamps. The foam particles used were 1 millimeters or 2 millimeters nominal diameter thermoplastic COPE foam particles. A control article was prepared using a non-foamed thermoplastic polyurethane elastomer powder (TPU-70A, Prodways Group, Les Mureaux, France; thermoplastic polyurethane powder; grain size D90, 88 micrometers; density, natural (20 degrees Celsius), 1020-1150 kilograms per cubic meter).

Time of exposure was determined using a cross-sectional file slice with an XY scan area of 101.6 millimeters×76.2 millimeters as follows:

TABLE II

| Iterations | Elapsed time (sec) |
|---|---|
| 1 | 2.06 |
| 2 | 4.12 |
| 3 | 6.18 |
| 4 | 8.24 |
| 5 | 10.30 |
| 6 | 12.36 |
| 7 | 14.42 |

An infrared laser beam (wavelength of 10.53-10.63 micrometers) was used with a beam width of about 0.3 to about 0.4 millimeters. The scan rate for the laser beam was set at 12,500 millimeters per second. The laser beam fractional overlap was 0.3 (that is the laser beam position was moved, it overlapped the adjacent beam path by 0.3. A laser power output of either 48 watts (for the control TPU powder) or 55 watts (elastomeric COPE foam particles) was.

Scan patterns were defined using 3D CAD files, which were then mathematically sliced into 2D cross-sections to define scan patterns for each layer. In some cases, a scan pattern was executed for more than one iteration (or exposure) as indicated below.

Density of a completed article was determined using standard water displacement methods with a GT-7190 Densicom Tester (GoTech Testing Machines, Inc., Taichung City, Taiwan).

Data are given below in Tables III, IV and V. The data shown in the tables are: (a) articles prepared using 1 millimeters thermoplastic COPE foam particles compared to control material with density as a function of the number of iterations of laser heating (Table III); and (b) articles prepared using 2 millimeters thermoplastic COPE foam particles compared to control material with density as a function of the number of iterations of laser heating (Table IV and V). The articles prepared using the COPE foam particles were characterized by desirable levels of sintering. The articles prepared using the COPE foam particles were characterized by desirable levels of sintering; demonstrated upon visual inspection that the foam particles were fully sintered with no apparent wall structures. The control TPU powder indicated in the tables was the non-foamed thermoplastic polyurethane elastomer powder referenced above (Prodways TPU-70A). Resilience data were obtained according to ASTM D-2632.

The data in Table III surprisingly shows that articles prepared by the method described herein maintain a very low density of about 0.362 to about 0.475 grams per cubic centimeter when carried out using 1 millimeters foam particles when exposed to multiple passes of IR laser energy at 55 watts. In contrast, a TPU powder exposed to only a single iteration or pass of IR laser energy at 48 watts resulted in an article with up to a 2.0 to 2.6-fold greater density (about 0.945 grams per cubic centimeter).

The data in Table IV surprisingly shows that articles prepared by the method described herein maintain a very low density of about 0.336 to about 0.425 grams per cubic centimeter when carried out using 2 millimeters foam particles when exposed to multiple passes of IR laser energy at 55 watts. In contrast, a TPU powder exposed to only a single iteration or pass of IR laser energy at 48 watts resulted in an article with up to a 2.4 to 2.7-fold greater density (about 1.005 grams per cubic centimeter). Moreover, comparable levels of resilience were observed for the articles prepared using foam particles by the method described herein compared to a control article prepared using a TPU powder exposed to a single pass of IR laser energy.

The data in Table V surprisingly shows that articles prepared by the method described herein maintain a very low density of about 0.338 to about 0.397 grams per cubic centimeter when carried out using 2 millimeters foam particles when exposed to multiple passes of IR laser energy at 55 watts. In contrast, a TPU powder exposed to only a single iteration or pass of IR laser energy at 48 watts resulted in an article with up to a 2.4 to 2.9-fold greater density (about 0.971 grams per cubic centimeter). Moreover, comparable levels of resilience were observed for the articles prepared using foam particles by the method described herein compared to a control article prepared using a TPU powder exposed to a single pass of IR laser energy. Thus, the disclosed method is able to provide highly resilient articles that maintain an extremely low density despite multiple exposures or passes of an energy source such as an IR laser beam.

TABLE III

| Sample | Laser Wattage (watts) | Iterations | Density (grams per cubic centimeter) | Resilience |
|---|---|---|---|---|
| Control TPU powder | 48 | 1 | 0.945 | 62-66 |
| COPE foam particles, 1 millimeters | 55 | 2 | 0.362 | nd* |
| COPE foam particles, 1 millimeters | 55 | 3 | 0.348 | nd* |
| COPE foam particles, 1 millimeters | 55 | 4 | 0.381 | nd* |
| COPE foam particles, 1 millimeters | 55 | 5 | 0.421 | nd* |
| COPE foam particles, 1 millimeters | 55 | 6 | 0.448 | nd* |
| COPE foam particles, 1 millimeters | 55 | 7 | 0.475 | nd* |

*"nd"—not determined.

TABLE IV

| Sample | Laser Wattage (watts) | Iterations | Density (grams per cubic centimeter) | Resilience |
|---|---|---|---|---|
| Control TPU powder | 48 | 1 | 1.005 | 62-66 |
| COPE foam particles, 2 millimeters | 55 | 2 | 0.369 | 62 |
| COPE foam particles, 2 millimeters | 55 | 3 | 0.388 | 62 |

TABLE IV-continued

| Sample | Laser Wattage (watts) | Iterations | Density (grams per cubic centimeter) | Resilience |
|---|---|---|---|---|
| COPE foam particles, 2 millimeters | 55 | 4 | 0.407 | 64 |
| COPE foam particles, 2 millimeters | 55 | 5 | 0.417 | 67 |
| COPE foam particles, 2 millimeters | 55 | 6 | 0.425 | 68 |
| COPE foam particles, 2 millimeters | 55 | 7 | 0.425 | 68 |

TABLE V

| Sample | Laser Wattage (watts) | Iterations | Density (grams per cubic centimeter) | Resilience |
|---|---|---|---|---|
| Control TPU powder | 48 | 1 | 0.971 | 62-66 |
| COPE foam particles, 2 millimeters | 55 | 2 | 0.338 | 61 |
| COPE foam particles, 2 millimeters | 55 | 3 | 0.339 | 62 |
| COPE foam particles, 2 millimeters | 55 | 4 | 0.364 | 64 |
| COPE foam particles, 2 millimeters | 55 | 5 | 0.379 | 67 |
| COPE foam particles, 2 millimeters | 55 | 6 | 0.389 | 68 |
| COPE foam particles, 2 millimeters | 55 | 7 | 0.397 | 68 |

The data show that the density of the article prepared using the foam particles increased with the number of iterations or exposures to the laser beam. Moreover, the density of the article prepared using foam particles was significantly less that of an article prepared using a TPU non-foamed powder.

Exemplary Articles

Exemplary articles were made using the methods and materials disclosed herein above (see FIGS. 14-16). FIG. 14 shows an article comprising thermoplastic COPE foam particles which have been provided in a series of layers that were sintered in a manner that resulted in four solid pier structures elevated from a surface of foam particles with a central cavity with highly sintered edges. FIGS. 15 and 16 show a shoe outsole article comprising thermoplastic COPE foam particles. The outsole in FIG. 15 is shown immediately post-production on the sintering platform and surrounded by loose, unsintered foam particles with the outsoles therein. Following removal of the unsintered foam particles, the clean outsoles are shown in FIG. 16.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed:

1. A method of making an article having a plurality of sub-regions comprising differentially fused foam particles, the method comprising:

arranging a plurality of foam particles such that the plurality of foam particles comprise a first foam particle having a first surface formed of a first thermoplastic elastomer material in contact with a second surface of an adjacent foam particle, the second surface of the adjacent foam particle being formed of a second thermoplastic elastomer material;

increasing a temperature of at least a portion of the plurality of foam particles with actinic radiation under conditions effective to melt or soften a portion of the first thermoplastic elastomer material of the first surface of the first foam particle, or the second thermoplastic elastomer material of the second surface of the adjacent foam particle, or both; and decreasing the temperature of the melted or softened portion of the first thermoplastic elastomer material, of the second thermoplastic elastomer material, or of both, thereby solidifying the melted or softened portion of the first thermoplastic elastomer material, of the second thermoplastic elastomer material, or of both, and forming a plurality of fused foam particles;

wherein the plurality of foam particles has a number average particle size of about 0.04 millimeter to about 10 millimeter in the longest dimension;

wherein the arranging and the increasing of the temperature are repeated;

wherein an iteration of the arranging comprises depositing a layer comprising the plurality of foam particles; and wherein the article is formed layerwise from a plurality of layers.

2. The method according to claim 1, wherein the increasing the temperature of at least a portion of the plurality of foam particles with actinic radiation under conditions effective to melt or soften a portion of the first thermoplastic elastomer material of the first surface of the first foam particle or the second thermoplastic elastomer material of the second surface of the adjacent foam particle further comprises intermingling melted first thermoplastic elastomer material from the first surface of the first foam particle with melted second thermoplastic elastomer material from the second surface of the adjacent foam particle; and wherein the decreasing the temperature of the melted or softened portion of the first thermoplastic elastomer material or the melted or softened portion of the second thermoplastic elastomer comprises decreasing a temperature of the intermingled thermoplastic elastomer material, thereby solidifying the melted portion of the thermoplastic elastomer and forming the plurality of fused foam particles.

3. The method according to claim 1, wherein the arranging a plurality of foam particles comprises depositing an essentially planar layer comprising the plurality of foam particles.

4. The method according to claim 1, wherein the plurality of foam particles has a bulk density of about 80 grams per liter to about 200 grams per liter.

5. The method according to claim 1, wherein the first or second thermoplastic elastomer material comprises a thermoplastic polyurethane elastomer, a thermoplastic polyurea elastomer, a thermoplastic polyether elastomer, a thermoplastic copolyetherester elastomer, a thermoplastic polyamide elastomer, a thermoplastic polystyrene elastomer, a thermoplastic polyolefin elastomer, a thermoplastic copolyetheramide elastomer, a thermoplastic styrene diene copolymer elastomer, a thermoplastic styrene block copolymer elastomer, a thermoplastic polyamide elastomer, a thermoplastic polyimide elastomer, any copolymer thereof, or any blend thereof.

6. The method according to claim 1, wherein the first or second thermoplastic elastomer material comprises a thermoplastic polyether block amide copolymer.

7. The method according to claim 1, wherein the first thermoplastic elastomer material and the second thermoplastic elastomer material are characterized by a melting temperature range over which both the first thermoplastic elastomer material and the second thermoplastic elastomer material exhibit melting behavior, and the melting temperature range is at least 10 degrees C. as determined using differential scanning calorimetry.

8. The method according to claim 1, wherein the increasing the temperature of at least a portion of the plurality of foam particles comprises increasing the temperature of a target area of the plurality of foam particles.

9. The method according to claim 8, wherein the increasing the temperature of the target area of the plurality of foam articles comprises increasing the temperature of the target area of the plurality of foam articles with a directed energy beam of actinic radiation.

10. The method according to claim 9, wherein the directed energy beam of actinic radiation is a laser beam.

11. The method according to claim 10, wherein the laser beam has a beam width of about 0.1 millimeter to about 0.7 millimeter.

12. The method according to claim 10, wherein the directed energy beam of actinic radiation has a scan pattern such that the directed energy beam of actinic radiation is directed in an x-y plane; and wherein the directed energy beam of actinic radiation is configured to vary an amount of energy for an amount of time directed to each point in the x-y plane.

13. The method according to claim 1, further comprising applying a coating to the plurality of fused foam particles.

14. The method according to claim 13, wherein the coating is a polyurea coating or a polyurethane coating.

15. The method according to claim 1, wherein the heating of a target area fuses a first foam particle to a second foam particle in the target area, wherein the first foam particle is melted to a depth of about 10 micrometers to about 500 micrometers measured from the surface of the first foam particle, and wherein the second foam particle is melted to a depth of about 10 micrometers to about 500 micrometers measured from the surface of the second foam particle.

16. The method according to claim 1, wherein a target area comprising a plurality of foam particles is heated with a directed energy beam under conditions effective to fuse a portion of the plurality of foam particles comprising one or more thermoplastic elastomers;
  wherein the target area is a portion of a layer of a plurality of foam particles; and
  wherein the actinic radiation is provided via a directed energy beam that is used to increase the temperature of a subset of a plurality of foam particles in certain portions of the layer of the plurality of foam particles.

17. The method according to claim 1, wherein the first thermoplastic elastomer material and the second thermoplastic elastomer material are characterized by a softening temperature range over which both the first thermoplastic elastomer material and the second thermoplastic elastomer material exhibit softening behavior, and the softening temperature range is at least 10 degrees C. as determined using differential scanning calorimetry.

18. The method according to claim 7, wherein the melting temperature range is at least 35 degrees C. as determined using differential scanning calorimetry.

19. The method according to claim 17, wherein the softening temperature range is at least 35 degrees C. as determined using differential scanning calorimetry.

* * * * *